United States Patent
Parvania et al.

(10) Patent No.: US 10,509,374 B2
(45) Date of Patent: Dec. 17, 2019

(54) SYSTEMS AND METHODS FOR MANAGING POWER GENERATION AND STORAGE RESOURCES

(71) Applicant: University of Utah Research Foundation, Salt Lake City, UT (US)

(72) Inventors: Masood Parvania, Salt Lake City, UT (US); Roohallah Khatami, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 134 days.

(21) Appl. No.: 15/925,760

(22) Filed: Mar. 19, 2018

(65) Prior Publication Data

US 2018/0217568 A1    Aug. 2, 2018

Related U.S. Application Data

(63) Continuation-in-part of application No. 15/396,363, filed on Dec. 30, 2016, now Pat. No. 10,282,687.
(Continued)

(51) Int. Cl.

| | |
|---|---|
| *G05B 13/04* | (2006.01) |
| *G06Q 50/06* | (2012.01) |
| *H02J 3/00* | (2006.01) |
| *G05F 1/66* | (2006.01) |
| *G06Q 10/06* | (2012.01) |

(52) U.S. Cl.
CPC ............ *G05B 13/048* (2013.01); *G05F 1/66* (2013.01); *G06Q 10/06312* (2013.01); *G06Q 10/06314* (2013.01); *G06Q 50/06* (2013.01); *H02J 3/008* (2013.01); *H02J 2003/007* (2013.01)

(58) Field of Classification Search
CPC ............... G05F 1/66; G05B 13/026; G05B 2219/40458
See application file for complete search history.

(56) References Cited

U.S. PATENT DOCUMENTS

| | | |
|---|---|---|
| 7,343,360 B1 | 3/2008 | Ristanovic et al. |
| 8,639,392 B2 | 1/2014 | Chassin |

(Continued)

OTHER PUBLICATIONS

Uplift in RTO and ISO Markets, FERC—Federal Energy Regulatory Commission, Staff Analysis of Uplift in RTO and ISO Markets, Aug. 2014, 46 pages.
(Continued)

*Primary Examiner* — Christopher E. Everett
(74) *Attorney, Agent, or Firm* — Workman Nydegger

(57) ABSTRACT

An operating configuration for a power system during a particular time period may be derived from a net load forecast for the power system during the particular time period. The operating configuration may be based on inter-temporal and/or continuous-time characteristics of the net load forecast. A power system manager may schedule power generation and/or energy storage units to satisfy the net load forecast at minimal cost. The power generation and/or energy storage units may be scheduled in accordance with inter-temporal and/or continuous-time characteristics of the net load. The schedule may comply with generation trajectory and/or ramping constraints of the power generating units, power trajectory and/or ramping constraints of the energy storage units, and so on.

18 Claims, 18 Drawing Sheets

Related U.S. Application Data which is a continuation-in-part of application No. 15/289,121, filed on Oct. 7, 2016, now Pat. No. 10,296,030.

(60) Provisional application No. 62/473,093, filed on Mar. 17, 2017, provisional application No. 62/387,664, filed on Dec. 30, 2015, provisional application No. 62/284,765, filed on Oct. 8, 2015, provisional application No. 62/284,756, filed on Oct. 7, 2015.

(56) References Cited

U.S. PATENT DOCUMENTS

| | | |
|---|---|---|
| 8,862,279 B2 | 10/2014 | Darden, II et al. |
| 8,886,362 B2 | 11/2014 | Krok et al. |
| 8,938,320 B2 | 1/2015 | Ooba et al. |
| 9,020,649 B2 | 4/2015 | Sharma et al. |
| 9,159,042 B2 | 10/2015 | Steven et al. |
| 9,300,141 B2 | 3/2016 | Marhoefer |
| 9,312,698 B2 | 4/2016 | Subbotin et al. |
| 9,367,825 B2 | 6/2016 | Steven et al. |
| 9,395,741 B2 | 7/2016 | Shiga et al. |
| 9,509,176 B2 | 11/2016 | Carter et al. |
| 2002/0165816 A1 | 11/2002 | Barz |
| 2004/0181460 A1 | 9/2004 | Bjelogrlic et al. |
| 2004/0215529 A1 | 10/2004 | Foster et al. |
| 2004/0260489 A1 | 12/2004 | Mansingh et al. |
| 2004/0267404 A1 | 12/2004 | Danko |
| 2005/0165948 A1 | 7/2005 | Hatime |
| 2005/0285574 A1 | 12/2005 | Huff et al. |
| 2007/0244604 A1 | 10/2007 | McNally |
| 2009/0062969 A1 | 3/2009 | Chandra et al. |
| 2009/0281876 A1 | 11/2009 | Bullinger et al. |
| 2011/0029141 A1 | 2/2011 | Sun et al. |
| 2011/0035071 A1 | 2/2011 | Sun et al. |
| 2011/0066391 A1 | 3/2011 | Abuali et al. |
| 2011/0071690 A1 | 3/2011 | Sun et al. |
| 2011/0213739 A1 | 9/2011 | Benitez et al. |
| 2012/0101639 A1 | 4/2012 | Carralero et al. |
| 2012/0253532 A1 | 10/2012 | McMullin et al. |
| 2013/0006439 A1 | 1/2013 | Selvaraj et al. |
| 2013/0190938 A1 | 7/2013 | Zadeh et al. |
| 2014/0005852 A1 | 1/2014 | Asghari et al. |
| 2014/0039710 A1 | 2/2014 | Carter et al. |
| 2014/0277797 A1 | 9/2014 | Mokhtari et al. |
| 2015/0051746 A1 | 2/2015 | Mathiesen et al. |
| 2015/0057821 A1 | 2/2015 | Nasle |
| 2015/0127425 A1 | 5/2015 | Greene et al. |
| 2015/0192697 A1 | 7/2015 | Hosking et al. |
| 2015/0206083 A1 | 7/2015 | Chen et al. |
| 2015/0316907 A1 | 11/2015 | Elbsat et al. |
| 2017/0102725 A1 | 4/2017 | Parvania |
| 2017/0109674 A1 | 4/2017 | Parvania |

OTHER PUBLICATIONS

Auroraxmp, et al.,AURORAxmp Comprehensive Power Forecasting, The World Standard for Power Market Simulation, Forecasting and Analysis, brochure, 12 pages.

Parvania, et al.,Continuous-Time Marginal Pricing of Electricity, IEE Transactions on Power Systems, 2016, 10 pages http://dx.doi.org/10.1109/TPWRS.2016.2597288.

Parvania, et al.,Generation Ramping Valuation in Day-Ahead Electricity Markets, 2016 49th Hawaii International Conference on System Sciences, doi 10/1109/HICSS.2016.292, pp. 2335-2344.

U.S. Appl. No. 15/289,121, Jan. 24, 2019, Notice of Allowance.

U.S. Appl. No. 15/396,363, Jan. 9, 2019, Notice of Allowance.

Harvey, et al.,Forecasting Hourly Electricity Demand Using Time-Varying Splines, Journal of the American Statistical Association, Dec. 1993, 88, 424; ProQuest p. 1228-1236.

Mehta, et al.,Industrial Process Automation Systems, Butterworth-Heinemann, Nov. 26, 2014.

Parvania, et al., Office Action dated Jun. 26, 2018 for U.S. Appl. No. 15/289,121.

Parvania, et al., Office Action dated Jun. 26, 2018 for U.S. Appl. No. 15/396,363.

Wang, et al.,Effects of Ramp-Rate Limits on Unit Commitment and Economic Dispatch, In IEEE Transactions on Power Systems, vol. 8, No. 3, pp. 1341-1350, Aug. 1993.

Wang, et al.,Optimal Generation Scheduling with Ramping Costs, Conference Proceedings Power Industry Computer Application Conference, Scottsdale, AZ, 1993, pp. 11-17.

SYSTEMS AND METHODS FOR MANAGING POWER GENERATION AND STORAGE RESOURCES

CROSS-REFERENCE TO RELATED APPLICATIONS

The Application Data Sheet (ADS) filed herewith is incorporated by reference. Any applications claimed on the ADS for priority under 35 U.S.C. § 119, 120, 121, or 365(c), and any and all parent, grandparent, great-grandparent, etc., applications of such applications, are also incorporated by reference, including any priority claims made in those applications and any material incorporated by reference, to the extent such subject matter is not inconsistent with this disclosure. This application claims the benefit of: U.S. Provisional Patent Application No. 62/473,093, filed Mar. 17, 2017; U.S. patent application Ser. No. 15/396,363, filed Dec. 30, 2016; U.S. patent application Ser. No. 15/289,121, filed Oct. 7, 2016; U.S. Provisional Patent Application No. 62/387,664, filed Dec. 30, 2015; U.S. Provisional Patent Application No. 62/284,765, filed Oct. 8, 2015; and U.S. Provisional Patent Application No. 62/284,756, filed Oct. 7, 2015, each of which is hereby incorporated by reference to the extent such subject matter is not inconsistent with this disclosure.

STATEMENT REGARDING FEDERALLY SPONSORED RESEARCH OR DEVELOPMENT

This invention was made with government support under Grant Number 1549924 awarded by the National Science Foundation. The government has certain rights in the invention.

TECHNICAL FIELD

This disclosure relates to systems and methods for managing a power system that comprises, and/or is capable of being operably coupled to, one or more energy storage units.

BACKGROUND

Conventional techniques for managing power system operation may not adequately consider inter-temporal and/or continuous-time characteristics of the net load on the power system. These techniques may also fail to consider inter-temporal and/or continue-time characteristics of power and/or storage resources used to satisfy net load forecasts determined for the power system, which can result in scarcity events during real-time operation. Conventional management techniques may also fail to incorporate energy storage resources available to the power system during operation. Moreover, inadequate consideration of costs associated inter-temporal and/or continuous-time characteristics of generation and/or storage resources can result in the use of inaccurate valuation metrics for such resources. Therefore, what are needed are systems, methods, apparatus, and/or non-transitory computer readable medium for avoiding scarcity power system events by, inter alia, determining a configuration for the power system that satisfies inter-temporal and/or continuous-time characteristics of the net load, subject to inter-temporal and/or continuous-time characteristics of the power generation and/or energy storage resources available to the power system. Also needed are systems, methods, apparatus, and/or non-transitory computer readable medium for determining valuation metrics for power generation and/or energy storage resources in accordance with inter-temporal and/or continuous time characteristics of such resources.

SUMMARY

Disclosed herein are systems and methods for managing a power system. The disclosed systems and methods may comprise determining a net load forecast for a power system, the net load forecast corresponding to a sequence of net load samples, each defining a linear net load forecast for the power system during a respective time interval, wherein determining the net load forecast further comprises, modeling a non-linear variance of the net load on the power system within one or more time intervals of the net load samples. The sequence of net load samples may comprise an hourly day-ahead load forecast for the power system.

In some embodiments, the disclosed systems and methods further comprise formulating a generation trajectory to configure one or more power generation units to satisfy the determined net load forecast for the power system. As used herein, the generation trajectory of a power generating unit refers to an amount of power generated by the unit as a function of time. The generation trajectories may be configured to satisfy the determined net load forecast, including non-linear variance(s) during one or more time intervals. In some embodiments, the disclosed systems and methods further comprise configuring transmission infrastructure of the power system to accept power generated by the one or more power generators during the operating period by, inter alia, configuring the one or more power generators to generate power for the power system according to one or more of: a specified generation trajectory and specified ramping trajectory. The disclosed systems and methods may be configured to model non-linear variance(s) in net load by projecting the net load forecast samples into a cubic spline function space. In some embodiments, formulating the generation trajectory comprises projecting generation trajectories of each of a plurality of power generation units into the cubic spline function space. The disclosed systems and methods may further comprise determining an optimal solution to the unit commitment model, wherein the optimal solution to the unit commitment model determines generation trajectory of the one or more power generation units.

DETAILED DESCRIPTION OF PREFERRED EMBODIMENTS

Figure 1:
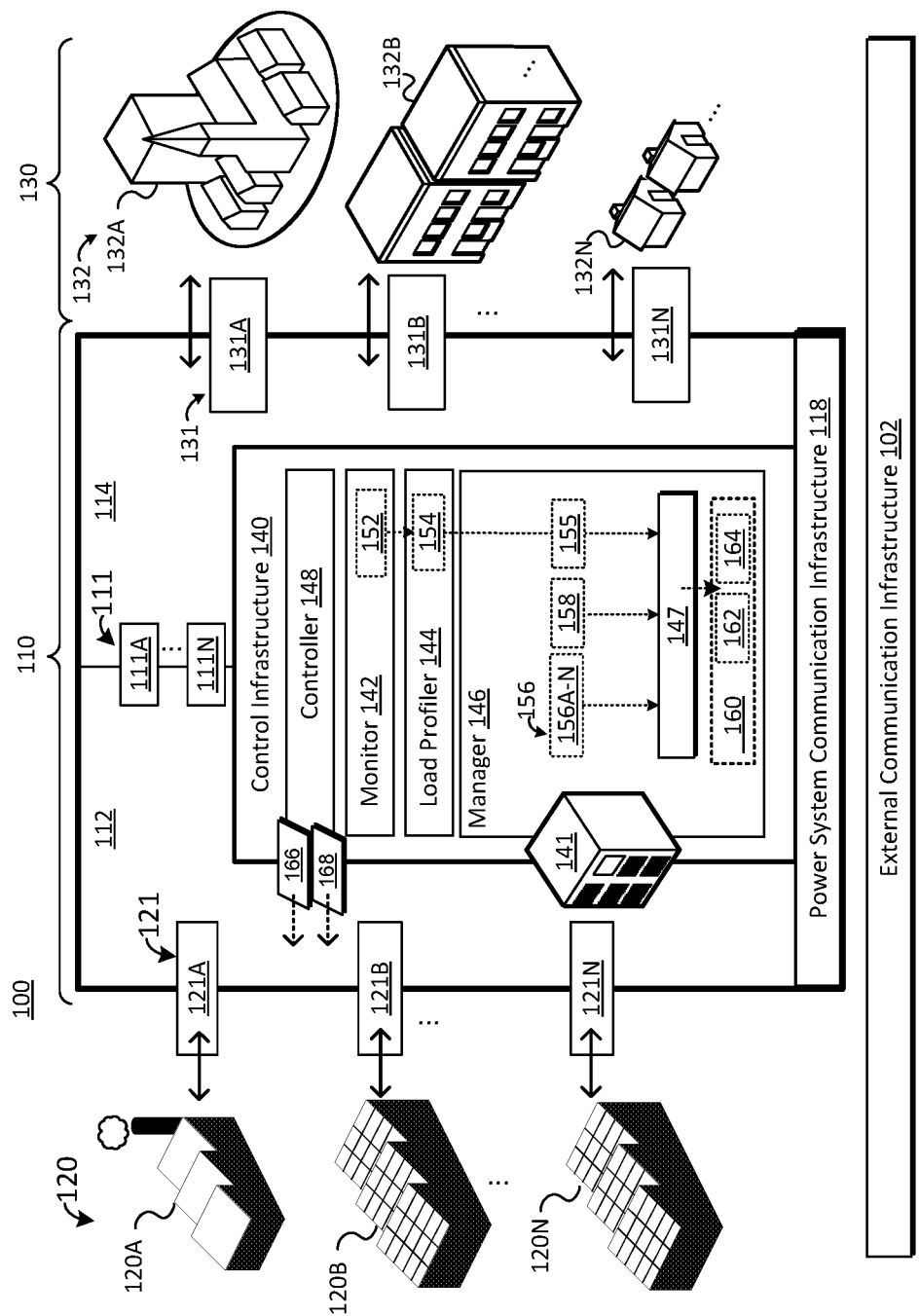
FIG. 1 is a schematic block diagram of one embodiment of a power system comprising management infrastructure configured to control power generation resources.

Disclosed herein are embodiments of systems and methods for managing a power system, which may comprise determining a power system configuration to, inter alia, schedule power system resources to satisfy a net load on the power system. The power system configuration may be configured to satisfy a net load forecast, which may comprise an estimate of the net load on the power system during a particular operating period (e.g., a next day). The power system configuration may comprise scheduling one or more power generating units to satisfy the net load forecast. As used herein, a power generating unit (PGU) refers to any means for generating and/or supplying power to a power system. A PGU may comprise any suitable system, device, and/or entity, including, but not limited to: a fossil-fuel power generator (e.g., a natural gas generator, a coal-fired power plant, or the like), a renewable energy power generator (e.g., a hydroelectric generator, a solar power generator, a wind power generator, or the like), a nuclear power generator, and/or the like.

The power system configuration may further comprise scheduling one or more energy storage units. As used herein, an energy storage unit (ESU) refers to any means for storing and/or supplying stored energy (e.g., means for storing energy drawn from a power system and/or discharging stored power to the power system). An ESU may comprise one or more of a chemical storage system, an electrochemical storage system, a battery storage system, a flow battery storage system, a capacitor storage system, a double-layer capacitor (EDLC) energy storage system, a mechanical storage system, a pumped storage system (a pumped hydroelectric storage system, a compressed air storage system), a flywheel energy storage system, a potential energy storage system (e.g., storing energy by raising the potential energy of a solid mass), thermal energy storage systems, a power to gas energy storage system, a hydrogen energy storage system (e.g., an energy storage system comprising one or more hydrogen fuel cells), a power to liquid energy storage system, and/or the like.

The power system may be configured to provision electrical power to satisfy discrete net load forecast quantities during an operating period (e.g., hourly net load forecasts for a next operating day). A Unit Commitment (UC) model may be used to determine an "optimal" configuration of power generation resources during the operating period that satisfy the net load forecast over the operating period at minimal cost. Conventional techniques may, however, fail to consider inter-temporal and/or continuous-time characteristics of the net load on the power system (and/or net load forecast for the power system), the power generating units and/or energy storage units scheduled to satisfy the net load, and/or the like. Failure to adequately consider these characteristics may result in inadequate scheduling, which can lead to scarcity conditions during real-time operation. Moreover, inadequate consideration of costs associated inter-temporal and/or continuous-time characteristics of power generation and/or storage resources can result in the use of inaccurate valuation metrics for such resources.

As used herein, "inter-temporal" characteristics of a signal corresponding to a series of quantities, such as hourly net load samples, measurements and/or forecast quantities, refers to characteristics of the signal between such measurements, samples, and/or forecasts. As used herein, "continuous-time characteristics of a signal refers to continuous-time and/or pseudo continuous-time characteristics of the signal. The inter-temporal and/or continuous-time (ITCT) characteristics of a signal corresponding to a series of discrete quantities obtained according to a particular monitoring period and/or frequency may refer to characteristics of the signal between respective monitoring periods (and/or at a higher frequency than the monitoring frequency). A ITCT characteristic of a signal may be derived by, inter alia, interpolation, function projection, function fitting, expansion, numerical techniques, and/or the like. By way of non-limiting example, ITCT characteristics of a series of net load quantities, each quantifying a net load measurement obtained at a respective sample time (e.g., according to a particular monitoring frequency and/or period, such as hourly) may comprise characteristics of the net load between the respective sample times. By way of further non-limiting example, ITCT characteristics of a PGU may, inter alia, comprise characteristics pertaining to the generation trajectory of the PGU, ramping characteristics of the PGU, and/or the like. As used herein, the "generation trajectory" of a PGU refers to a function and/or model corresponding to power generated by the PGU as a function of time. The generation trajectory of a PGU may comprise and/or model ITCT characteristics of power supplied by the PGU during an operating period, which may be configured to, inter alia, satisfy an ITCT net load forecast for the power system over the operating period. As used herein, the "ramping characteristics" of a PGU refer to a function and/or model corresponding to a time derivative of the generation trajectory thereof. Ramping characteristics of a PGU may, inter alia, comprise ramping constraints, which may define the rate(s) at which the PGU is capable of changing its generation trajectory (e.g., the rate at which the PGU is capable of ramping up generation, ramping down generation, and/or the like). By way of further non-limiting example, ITCT characteristics of an ESU may, inter alia, comprise characteristics pertaining to the energy and/or power trajectory of the ESU. The energy trajectory of an ESU may comprise and/or model energy stored within an ESU as a function of time (in accordance with the power trajectory of the ESU). The power trajectory of an ESU may be decomposed into: a) charging and charging ramping trajectories, which may correspond to time(s) during which the ESU is drawing power for storage therein, and b) discharging and discharging ramping trajectories, which may correspond to time(s) during which power is being discharged therefrom. The charging trajectory of an ESU may comprise and/or model ITCT characteristics pertaining to ESU charging as a function of time, the charging ramping trajectory may comprise and/or model ITCT characteristics pertaining to the derivative of the charging trajectory, the discharging trajectory may comprise and/or model ITCT characteristics pertaining to ESU discharging as a function of time, and the discharging ramping trajectory may comprise and/or model ITCT characteristics pertaining to the derivative of the discharging trajectory.

Disclosed herein are embodiments of a system, method, apparatus, and/or non-transitory computer-readable storage medium for determining a configuration for operation of a power system during an operation period that is adapted to avoid scarcity events by, inter alia, developing an ITCT net load forecast for the power system, and scheduling resources to satisfy the net load forecast in accordance with ITCT characteristics of power generation and/or storage resources. Disclosed herein are systems, methods, apparatus, and/or non-transitory computer-readable storage medium for determining valuation metrics pertaining to power system resources that, inter alia, incorporate cost metrics associated with PGU ramping and/or incorporate cost metrics associated with use of ESU during power system operation.

FIG. 1 is a schematic diagram of one embodiment of a power system 100. The power system 100 may comprise power system infrastructure 110. The power system infrastructure 110 may comprise a configurable network or grid for receiving, transmitting, and/or distributing electrical power. Power may be supplied to the power system 100 by one or more PGU 120 of a plurality of available PGU 120A-N. As used herein, an available PGU 120 refers to a PGU 120 that is capable of being electrically coupled to the power system infrastructure 110. The power system infrastructure 110 may comprise hardware components configured to receive, transmit, process, and/or distribute electrical power, which may include, but are not limited to: transmission lines (e.g., low-voltage power lines, high-voltage power lines, extra high-voltage power lines, three-phase transmission lines, etc.), transformers, substations, switches, buses, bus bars, power conditioners, and/or the like. The power system infrastructure 110 may comprise transmission infrastructure 112 and/or distribution infrastructure 114. The transmission infrastructure 112 may be configured to, inter alia, receive, process, and/or transmit power supplied by selected PGU 120A-N, and the distribution infrastructure 114 may be configured to process and/or distribute power to a load 130 (and/or respective load regions 132). As used herein, the load 130 of the power system 100 refers to systems, devices, and/or entities configured to consume and/or demand power from the distribution infrastructure 114 of the power system 100. As used herein, a load region 132 refers to a portion of the load 130 of the power system, which may comprise and/or correspond to one or more of a geographical area, a group of one or more power consumers (e.g., large factory, the campus of a business organization), a network, subnetwork, substation, transmission substation, distribution substation, collector substation, switching substation, and/or the like.

The power system 100 may comprise one or more monitoring and/or control devices. As used herein, a monitoring and/or control device (MCD) refers to any means for monitoring and/or controlling a component, element, and/or portion of the power system 100. An MCD may comprise and/or be communicatively coupled to a computing device and, as such, may comprise hardware computing resources, such as processing resources, memory resources, non-transitory storage resources, communication resources (e.g., interfaces to communicatively couple the MCD to one or more electronic communication networks), human-machine interface (HMI) components, and/or the like. The processing resources of an MCD may comprise one or more general purpose processors, one or more special purpose processors (e.g., monitoring and/or communications processors), programmable logic (e.g., a field-programmable gate array), and/or the like. The memory resources of an MCD may comprise volatile memory, firmware, and/or the like. The non-transitory storage resources of an MCD may comprise one or more storage devices configured to store data on a non-transitory storage media, such as a hard disk, solid-state storage (flash memory storage), battery-backed memory, and/or the like. The communication resources of an MCD may comprise one or more network interfaces configured to communicatively couple the MCD to one or more electronic communication networks.

The power system 100 may comprise MCD configured to monitor and/or control various portions of the power system infrastructure 110, which may include, but are not limited to: infrastructure monitoring and/or control devices (IMCD) 111, PGU monitoring and/or control devices (PMCD) 121, load monitoring and/or control devices (LMCD) 131, and/or the like, which may comprise and/or be communicatively coupled to one or more measurement and/or control devices, which may include, but are not limited to: current sensors, current regulators, voltage sensors, voltage regulators, power sensors, phase sensors (current and/or voltage phase measurement devices), phasor measurement unit (PMU) devices, PMU measurement and/or control devices, synchrophasor measurement devices, synchrophasor and/or control measurement devices, temperature sensors, fault detection devices (e.g., over-current detectors, over-voltage detectors, arc flash detectors, etc.), fault recorders, relay devices, solid-state relay devices, protective relay devices, circuit breakers, fail-over devices, buses, bus bars, switches, relays, protective relays, power processing devices (e.g., power conditioners, power line conditioners, filters, power filters, and/or the like), transformers, transformer monitoring and/or protection devices, power converters, voltage converters, and/or the like. The IMCD 111 may be configured to monitor and/or control portions of the transmission infrastructure 112, distribution infrastructure 114, and/or the like. The IMCD 111 may be configured to monitor and/or control power transmission and/or distribution within the power system 100. The IMCD 111 may be further configured to monitor power consumption and/or loss within the power system infrastructure 110 (e.g., power consumed and/or lost in receiving, processing, transmitting, and distributing power to the load 130). The PMCD 121 may be configured to monitor and/or control power being generated by respective PGU 120 (e.g., PMCD 121A-N may be configured to monitor and/or control power supplied by PGU 120A-N, respectively). The PMCD 121 may be configured to monitor respective PGU 120, which may include, but is not limited to monitoring: power being generated by respective PGU 120A-N, the generation and/or ramping characteristics of respective PGUs 120A-N (as disclosed in further detail herein), and/or the like. The PMCD 121A-N may be further configured to selectively couple PGU 120A-N to the power system infrastructure 110. In some embodiments, the PMCD 121 may be configured to interface with one or more PGU 120, which may comprise configuring selected PGU 120 to supply specified amount(s) of power to the power system 100. The LMCD 131 may be configured to monitor and/or control the load 130. The power system 100 may comprise a plurality of LMCD 131A-N, each configured to monitor and/or control a respective load region 132A-N. The LMCD 131 may be configured to monitor any suitable aspect and/or characteristic of the load 130 (and/or load region 132) including, but not limited to: power consumed by the load 130 on the power system 100, power demand of the load 130, power consumed by and/or within respective load regions 132A-N, power demand of respective load regions 132A-N, and/or the like. The LMCD 131 may be further configured to selectively coupled and/or decouple portions of the load 130 from the power system 100 (e.g., in response to scarcity and/or fault conditions).

The power system infrastructure 110 may comprise power system communication infrastructure 118, which may be configured to communicatively couple monitoring and/or control devices of the power system 100. The power system communication infrastructure 118 may comprise any suitable electronic networking infrastructure including, but not limited to: an electronic communication network, a private electronic communication network, a local area network, a wide-area network, a wireless network, a cellular data network, a wide area control system (WACS), a Supervisory Control and Data Acquisition (SCADA) system, and/or the like. Portions of the power system communication infrastructure 118 and/or computing devices deployed within the power system infrastructure 110 may be communicatively coupled to an external communication infrastructure 102, which may comprise one or more public and/or private electronic communication networks, such as the Internet, a private network of one or more of the PGUs 120A-N, and/or the like.

The power system infrastructure 110 may further comprise management infrastructure 140, which may be configured to monitor, manage, and/or configure the power system 100. The management infrastructure 140 may be communicatively coupled to the power system 100 (and/or MCD, such as IMCD 111, PMCD 121, and/or LMCD 131) by, inter alia, the power system communication infrastructure 118 (and/or external communication infrastructure 102). The management infrastructure 140 may comprise one or more of a: power system controller 148, monitor 142, load profiler 144, and configuration manager 146, which are described in further detail herein. The management infrastructure 140 may comprise hardware components, such as a computing device 141, and MCD, and/or the like. The computing device 141 may comprise processing resources, memory resources, non-transitory storage resources, HMI components, communication resources, and/or the like (not depicted in FIG. 1 to avoid obscuring details of the illustrated embodiments). The computing device 141 may be communicatively coupled to the power system communication infrastructure 118 and/or the external communication infrastructure 102. Portions of the management infrastructure 140 (e.g., portions of the controller 148, monitor 142, load profiler 144, configuration manager 146, and so on) may be embodied as computer-readable instructions stored on a non-transitory storage medium. The instructions may be configured to cause a processor of a computing device (e.g., a processor of the computing device 141) to perform operations and/or processing steps for monitoring, managing, and/or configuring the power system 100, as disclosed herein. Alternatively, or in addition, portions of the management infrastructure 140 may be embodied as hardware components and/or devices, firmware, hardware configuration data, and/or the like.

The power system controller (controller 148) may be configured to control real-time operation of the power system 100 by use of, inter alia, one or more of the MCD of power system 100 (e.g., IMCD 111, PMCD 121, and/or LMCD 131). The controller 148 may configure the PGUs 120A-N to supply power sufficient to satisfy a net load on the power system 100. As used herein, the "net load" on a power system, such as power system 100, refers to an amount of power required to satisfy power consumption and/or demand of the load 130, which may include, but is not limited to: power consumed and/or demanded by the load 130 (e.g., power consumed and/or demanded by respective load regions 132A-N), power consumed and/or lost while receiving, transmitting, processing, and/or distributing power to the load 130 and/or respective load regions 132A-N (e.g., power consumed and/or lost within the power system infrastructure 110), and/or the like. The controller 148 may be configured to determine the current, real-time net load on the power system 100 and/or power being supplied to the power system 100 by respective PGU 120A-N by use of, inter alia, the monitor 142.

The monitor 142 may be configured to monitor portions of the power system 100 (e.g., monitor one or more of the PGUs 120A-N, the power system infrastructure 110, the distribution infrastructure 114, the load 130, and so on). The monitor 142 may be configured to determine, derive, and/or maintain monitoring data 152 pertaining to the power system 100 from measurement and/or control data acquired from respective MCD. The monitor 142 may be configured to display portions of the monitoring data 152 on HMI components of an MCD (e.g., computing device 141) and/or transmit portions of the monitoring data 152 on an electronic communication network (by use of the communication resources of the MCD). The monitor 142 may be further configured to communicate portions of the monitoring data 152 within the management infrastructure 140. The monitor 142 may be configured to determine and/or monitor a current and/or real-time net load on the power system 100, which may comprise an amount of power being consumed within the power system 100 (e.g., power consumed by the load 130 and/or power system infrastructure 110, as disclosed herein). The controller 148 may use the monitoring data 152 acquired by the monitor 142 to, inter alia, manage real-time operation of the power system 100, which may comprise configuring PGU 120 supply power sufficient to satisfy the current, real-time net load on the power system 100 (by use of one or more PMCD 121), receive, transmit, and/or distribute the power to the load 130 and/or respective load regions 132 (by use of one or more IMCD 111 and/or LMCD 131).

In some embodiments, the controller 148 may be configured to operate the power system 100 during an operating period in accordance with a pre-determined power system configuration 160. The power system configuration 160 may be determined prior to the operating period (e.g., the power system configuration 160 may comprise and/or correspond to a UC model, or the like). The power system configuration 160 may be based on, inter alia, a net load forecast for the operating period. As used herein, a "net load forecast" refers to a forecast and/or estimate of the net load on a power system during a specified operating period (e.g., may forecast the net load on the power system 100 at respective time(s) during the specified operating period). The power system configuration 160 may comprise a PGU configuration 162 adapted to schedule selected PGU 120 to supply power to the power system 100 during the operating period in accordance with the net load forecast (such that the power scheduled to be supplied to the power system 100 satisfies the net load forecast). The power system configuration 160 may further comprise an infrastructure configuration 164 adapted to, inter alia, configure the power system infrastructure 110 to receive, transmit, and/or distribute power during the operating period in accordance with the PGU schedule 162 (e.g., couple the power system 100 to PGU 120 scheduled to supply power during the operating period).

The manager 146 may be configured to determine power system configuration(s) 160 for the power system 100 in accordance with a load profile 154 produced by, inter alia, the load profiler 1444. The load profiler 144 may be configured to determine a net load forecast for upcoming operating period(s) of the power system 100 based on, inter alia, the monitoring data 152 acquired by the monitor 142 (e.g., the net load forecast may be based on, inter alia, monitoring data 152 pertaining to the net load on the power system 100 acquired during one or more previous operating periods). The manager 146 may use the net load forecast to determine a suitable power system configuration 160 for the operating period.

In some embodiments, the manager 146 may be configured to formulate the power system configuration 160 in accordance with a day-ahead Unit Commitment (UC) model. The manager 146 may be configured to formulate a UC model based on the load profile 154 determined for the power system 100, which may comprise discrete net load forecast values (e.g., a series of hourly net load forecast quantities). The PGU configuration 162 determined by the manager 146 may be adapted to balance an amount of power scheduled to be supplied to selected PGUs 120A-N during the operating period with net load forecast. The net load forecast may comprise a series of hourly net load forecast quantities (e.g., N(T . . . 24T)). The PGU configuration 162 may comprise hourly PGU commitment(s), each scheduling respective PGU 120A-N to supply specified amount(s) of power to the power system 100 during respective hours of the operating period. The manager 146 may formulate a model of the scheduled capacity (MSC) of the power system 100, which may comprise a model of an amount of power scheduled to be generated by PGUs 120A-N at respective times T (e.g., $MSC(T)=E_N G_n(T)$, where $G_n(T)$ models an amount of power scheduled to be supplied by respective PGU 120A-N during a particular time interval T (e.g., an hour). The manager 146 may adapt the power configuration 160 to schedule PGUs 120A-N such that, for each time interval T, the model of the scheduled capacity MSC(T) satisfies the corresponding net load forecast (e.g., $MSC(T)=E_N G_n(T) \geq N(T)$ for T through 247).

In some embodiments, the manager 146 may determine the power system configuration 160 by use of a UC model of the power system 100. The manager 146 may formulate the UC model as an instance of Mixed-Integer Linear Programming (MILP) in which a generation cost function and operating constraints (as defined in PGU metadata 156 and/or power system metadata 158, disclosed in further detail herein) are linear with respect to the decision variables (e.g., the PGU configuration 164). The manager 146 may determine the power system configuration 160 by, inter alia, determining an optimal solution for the UC model in accordance with a particular optimization criterion (e.g., optimization and/or cost function). The manager 146 may, for example, be configured to determine a power system configuration 160 that satisfies the load profile 154 at minimal cost (e.g., schedule PGUs 120A-N in accordance with cost characteristics of the respective PGUs 120A-N, subject to $MSC(T)=\Sigma_N G_n(T) \geq N(T)$ and/or other constraints).

Satisfying the discrete net load forecast quantities of the load profile 154 by use of a UC model (or other technique) may comprise configuring the power system 100 to satisfy constant and/or piecewise linear net load forecasts (e.g., hourly forecast quantities N(T)), which may not adequately reflect ITCT variations in the net load during real-time operation of the power system 100. Furthermore, UC model may assume that PGU 120A-N follow discrete or piecewise linear generation trajectories, which may not accurately reflect actual generation trajectories of the PGU 120A-N. As used herein, the generation trajectory of a PGU 120 refers to power generated by the PGU 120 as a function of time. The rate at which a PGU 120 ramps up to higher output levels (and/or ramps down to lower output levels) may differ from conventional discrete and/or piecewise models (e.g., PGM (T) may not accurately reflect ITCT characteristics the generation and/or ramping trajectories of the PGU 120A-N). Accordingly, a power system configuration 160 formulated to satisfy such discrete and/or piecewise linear net load quantities (based on discrete and/or piecewise linear generation models) may not accurately reflect real-time operation of the power system 100, which may reduce the ability of the power system 100 to respond to load fluctuations and/or render the power system 100 susceptible to scarcity events, such as ramping scarcity events as PGUs 120A-N are brought online in the power system 100.

Figure 2:
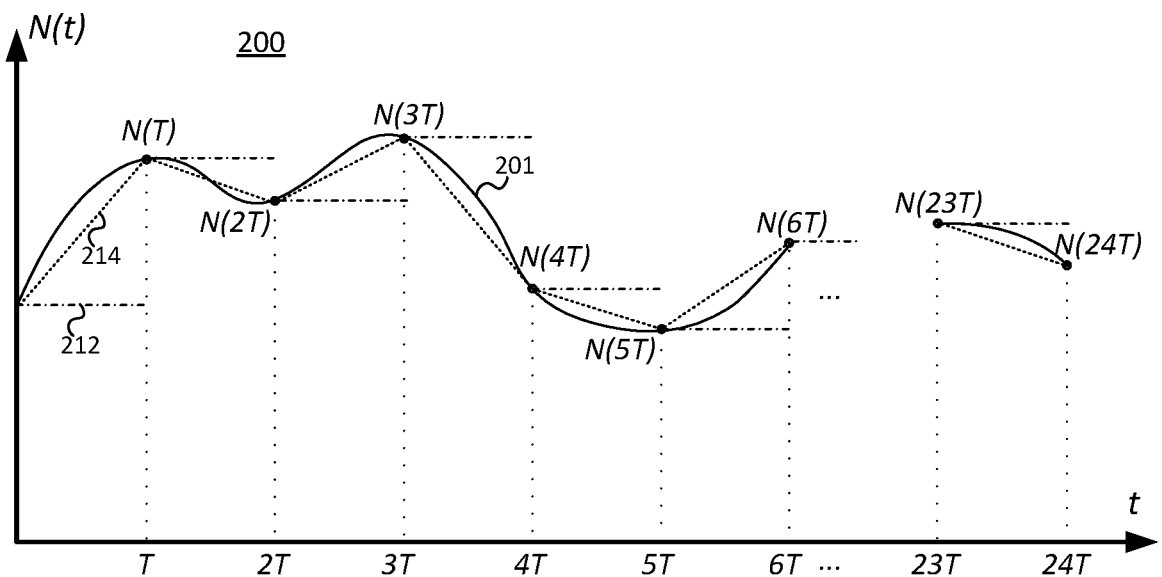
FIG. 2 depicts a plot illustrating net load forecast quantities, scheduled power generation, and real-time net load.

FIG. 2 is a plot 200 depicting an exemplary, real-time net load on a power system 100 (plot line 201). FIG. 2 further depicts discrete net load forecast quantities N(T) corresponding to the net load which, as illustrated, accurately reflect the actual, real-time load at respective times T. The net load forecast may comprise an hourly forecast (e.g., may comprise 24 net load forecast quantities T through 247). Plot line 212 depicts an exemplary constant piecewise generation trajectory corresponding to the discrete net load values N(T)–N(24T). Plot line 212 may correspond to a discrete model of the scheduled capacity MSC(T), which may model an amount of power scheduled to be supplied to the power system 100 by respective PGU 120A-N at each time T, such that MSC(T)=N(T) for T through 24T In FIG. 2, the real-time load 201 may be divided into a portion that was "scheduled" in accordance with the power system configuration 160 (MSC(T), per plot line 212), and a portion that needs to be supplied by other available resources due to shortfalls in the scheduled capacity (e.g., where real-time net load exceeds scheduled capacity). Deviation between the real-time net load 201 and the "scheduled" load (e.g., 212) may be due to, inter alia, inaccuracies in the UC modeling and/or formulation techniques for determining the power system configuration 160, as disclosed herein. As illustrated in FIG. 2, however, N(T) fails to consider ITCT characteristics of the net load such that, although MSC(T) may satisfy respective net load forecasts N(T) at discrete times T, MSC(T) may not satisfy the actual, real-time net load on the power system during the operating period. Similarly, the model for the "scheduled" capacity provided by the PGUs 120A-N(MSC(T)) may differ from actual, real-time power generation characteristics of the PGU 120A-N due to, inter alia, inadequate modeling of ITCT generation and/or ramping characteristics of the PGUs 120A-N. For example, at time T, the PGU 120A-N are modeled as transitioning to a higher generation outputs virtually instantaneously, which may not reflect ramping capabilities of the PGU 120A-N. Although some UC modeling techniques attempt to model piecewise linear transitions, such smoothing may be performed after formulation of the PGU configuration 162 and, as such, may not be reflected in the formulation of the power system configuration 160 itself. Alternatively, the manager 146 may formulate the power system configuration 160 such that the generation trajectory of the PGUs 120A-N is interpreted as being consistent with ramping of the discrete net-load forecasts N(T . . . 24T) (e.g., the hourly intervals between respective net load forecast values, per plot line 214). However, these approximations may still fail to adequately model actual generation and/or ramping characteristics of respective PGU 120A-N. As such, a power system configuration 160 formulated using such techniques may still be susceptible to inaccuracy and result in scarcity conditions during real-time operation.

Figure 3:
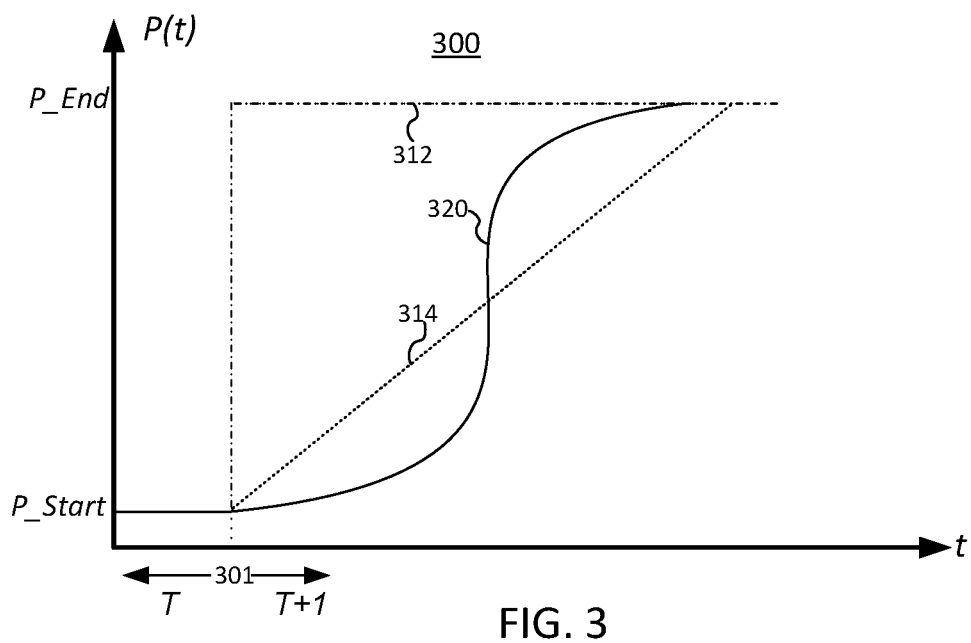
FIG. 3 is a plot depicting embodiments of generation trajectory models.

FIG. 3 is a plot 300 depicting models for a generation trajectory of a PGU 120A-N. The plot 300 may correspond to a PGU configuration 162 in which a PGU 120 is scheduled to provide a particular amount of power during interval T (P_Start), and to transition to generating an increased amount of power (P_End) at during a next interval T+1 (301). As mentioned above, the manager 146 may schedule power from PGUs 120A-N as if the PGUs 120A-N are capable of transitioning from P_Start to P_End substantially instantaneously, as depicted by plot line 312 (and/or plot line 212 of FIG. 2). Alternatively, the UC model may model the generation trajectory of the PGU 120A-N as a linear ramp, as depicted by plot line 314 (and/or plot line 214 of FIG. 2). As shown in FIG. 3, the discrete and/or piecewise linear UC models may not accurately reflect the actual generation trajectory 320 of the PGU 120 during real-time operation. Therefore, power generation models that do not consider ITCT characteristics of respective PGU 120A-N may not reflect actual, real-time operation and, as such, scheduled power generation determined using such models may not satisfy net load on the power system 100 as expected (e.g., the power system 100 may be subject to ramping scarcity events as PGUs 120A-N ramp up power generation).

As disclosed above, configuring the power system 100 to satisfy discrete and/or linear net load forecasts (and inadequate consideration of actual generation trajectory characteristics of the PGUs 120A-N) may result in deviations between scheduled capacity and real-time load conditions, which may require the power system 100 to acquire additional capacity (at increased cost), decrease the availability of the power system 100 to respond to load fluctuations, render the power system 100 susceptible to scarcity conditions, and/or result in ramping scarcity events.

Referring back to FIG. 1, in some embodiments, the power system configuration manager 146 is configured improve the power system configuration 160 (e.g., reduce deviation between scheduled capacity and real-time net load) by, inter alia, identifying and/or modeling ITCT variations in the net load forecast for the power system 100 and/or modeling ITCT characteristics of respective PGU 120A-N. More specifically, the manager 146 may be configured to determine an ITCT load profile 155 that models inter-temporal, inter-interval, and/or inter-sample variations in the net load forecast for the power system 100. The ITCT load profile 155 may comprise and/or correspond to an inter-temporal, inter-sample, continuous-time and/or pseudo continuous-time model of the net load forecast for the power system 100 over the operating period.

As disclosed above, the load profile 154 may comprise a plurality of net load forecasts, each comprising a respective forecast and/or estimate of the net load at a particular time and/or during a particular time interval of the operating period The net load forecast quantities may, therefore, comprise discrete and/or piecewise linear net load forecasts at respective sample times and/or during respective time intervals (e.g., hourly net load forecasts). The manager 146 may formulate an ITCT load profile 155 to model inter-temporal, inter-sample, inter-measurement, continuous-time, and/or pseudo continuous-time variations between respective net load quantities (e.g., between respective sample times and/or intervals of respective net load forecast quantities, such as inter-hour variation in an hourly day-ahead forecast).

In some embodiments, the manager 146 may configure the monitor 142 and/or load profiler 144 to obtain net load forecast data according to selected monitoring scheme, which may include, but is not limited to: a periodic monitoring scheme, a discrete monitoring scheme (e.g., monitoring at discrete intervals and/or periods), a synchronized monitoring scheme (e.g., monitoring at designated time(s) and/or time offsets), an asynchronous monitoring scheme (e.g., using time stamps and/or other information to correlate measurement and/or control data obtained from respective MCD), a continuous-time monitoring scheme (e.g., monitoring real-time power consumption), a pseudo continuous-time monitoring scheme (e.g., interpolating and/or modeling periodic and/or discrete measurements as piecewise continuous measurements), and/or the like. Alternatively, or in addition, the monitor 142 may be configured to obtain more granular net load measurements (e.g., may determine and/or record net load measurements at a higher frequency and/or a shorter measurement intervals). In some embodiments, the monitor 142 may be configured to obtain pseudo continuous-time and/or continuous-time measurements of the net load on the power system 100, which may be used to determine net load forecasts at higher levels of granularity (and/or reflect ITCT characteristics of the net load).

In some embodiments, the manager 146 is configured to determine the ITCT load profile 155 by use of, inter alia, numerical techniques such as interpolation, function projection, expansion, and/or the like. In some embodiments, the manager 146 may determine the ITCT load profile 155 by expressing the net load samples in continuous-time and/or by use of higher-order function space (e.g., higher order than 1 per the constant and/or piecewise linear view of respective net load forecast quantities). The ITCT load profile 155 may comprise a polynomial, exponential, and/or other type of model of the net load quantities. In some embodiments, and as disclosed in further detail herein, the manager 146 may be configured to model the net load quantities as cubic splines, which may comprise projecting the net load quantities of the load profile 154 into a higher-order function space (e.g., Hermite function space). The ITCT load profile 155 may, therefore, comprise expanding a constant and/or piecewise linear sequence of net load quantities into a higher-order model of net load. The ITCT load profile 155 may be configured to reflect non-linear variations between respective sample periods and/or time intervals of the net load quantities (e.g., within respective time intervals of the load profile 154).

The manager 146 may be further configured to generate a power system configuration 160 adapted to satisfy the ITCT load profile 155, which may comprise selecting, scheduling, and/or configuring one or more PGUs 120A-N to satisfy inter-temporal variations in the net load as defined in the ITCT load profile 155 (e.g., variations within particular hours of a day-ahead load forecast). The power system configuration 160 may be configured in accordance with characteristics of the power system 100 and/or respective PGU 120. Characteristics of the power system may be maintained within, inter alia, power system metadata 158, which may model and/or define characteristics, constraints, and/or properties of the power system 100 which may include, but are not limited to: operating constraints, transmission constraints (e.g., capacity of various portions of the transmission infrastructure 112 and/or distribution infrastructure 114), DC power flow constraints, topology (e.g., bus locations at which respective PGUs 120A-N are capable of being electrically coupled to the transmission infrastructure 112), and so on.

Characteristics of respective PGU 120 may be maintained within, inter alia, PGU metadata 156 (e.g., PGU metadata 156A-N pertaining to PGU 120A-N). As used herein, a "characteristic" of a PGU 120 (or "PGU characteristic") may refer to any suitable information pertaining to a PGU 120, operation of the PGU 120, capabilities of the PGU 120, and/or the like. PGU characteristics may include, but are not limited to: interface characteristics, generation characteristics, ramping characteristics, cost characteristics, and/or the like. The interface characteristics of a PGU 120 may comprise information pertaining to the interface(s) at which the PGU 120 is capable of being electrically coupled to the power system 100. The interface characteristics of a PGU 120 may define, inter alia, constraints of respective interfaces (e.g., interface constraints), such as a maximum amount of power, voltage, and/or current capable of being transferred to the power system through the respective interfaces. The generation characteristics of a PGU 120 may comprise information pertaining to power generation capabilities of the PGU 120. The generation characteristics of a PGU 120 may define, inter alia, generation constraints, such as the maximum amount of power capable of being generated by the PGU 120 at specified time(s) and/or under designated conditions, the minimum amount of power that can be provisioned from the PGU 120, and/or the like. The ramping characteristics of a PGU 120 may pertain to the rate at which the PGU is capable of changing the generation trajectory thereof. The ramping characteristics of a PGU 120 may define, inter alia, inter-temporal and/or continuous-time characteristics of the generation trajectory, such as the rate at which the PGU 120 is capable of ramping up power generation, capable of ramping down power generation, and/or the like. The cost characteristics of a PGU 120 may define, inter alia, cost metrics pertaining to power generated by the PGU 120 (as a function of time, operating period, demand, and/or the like). The cost characteristics of a PGU 120 may be expressed as $C^G(G_n(t), I_n(t))$, where $G_n(t)$ is the generation trajectory of the PGU 120, $I_n(t)$ is the commitment status, and $C^G$ is a generation cost. The cost characteristics of a PGU 120 may further comprise ramping cost metrics, which may quantify costs associated with changing the amount of power being generated by the PGU 120 (e.g., costs associated with ramping up power generation, ramping down power generation, and/or the like).

As disclosed above, the PGU configuration 162 determined by the manager 146 may be based on, inter alia, a model of scheduled generation capacity (MSC). In some embodiments, the scheduled capacity be based on discrete or piecewise linear models of PGU generation trajectory, which may not accurately reflect actual, inter-temporal and/or continuous time generation and/or ramping characteristics of the PGUs 120A-N. In the FIG. 1, embodiment, the manager 146 may schedule PGU 120A-N in accordance with the inter-temporal and/or continuous-time generation and/or ramping characteristics thereof. The manager 146 may maintain generation and/or ramping characteristics of respective PGUs 120A-N in the PGU metadata 156, as disclosed herein. The manager 146 may be further configured to determine generation and/or ramping characteristics of a PGU 120 by, inter alia, monitoring power generated by the PGU 120 during real-time operation (e.g., by use of one or more PMCD 121). The manager 146 may obtain discrete measurements of a generation trajectory of the PGM 120 in response to respective commands (e.g., while ramping up or down) and may determine corresponding generation trajectory and/or ramping characteristics of the PGU 120 therefrom. Alternatively, or in addition, the manager 146 may determine generation trajectory and/or ramping characteristics of respective PGU 120A-N based on, inter alia, properties and/or characteristics of the PGUs 120A-N(e.g., the type, size, mechanical, electrical, and/or chemical characteristics of respective PGUs 120A-N), and/or the like. In some embodiments, the manager 146 may receive information pertaining to the generation and/or ramping characteristics of a PGM 120 from the PGU 120 itself (e.g., through a management and/or communication interface of the PGU 120).

The manager 146 may use the generation and/or ramping characteristics of the PGUs 120A-N(as maintained within PGU metadata 156) to model inter-temporal, continuous-time generation trajectories of respective PGUs 120A-N (e.g., determine generation trajectories for respective PGU 120A-N in accordance with the generation and/or ramping characteristics thereof). As disclosed herein, the generation trajectory of a PGU 120 refers to power generation by the PGU 120 as a function of time. Generation and/or ramping characteristics of a PGU 120 may be used to, inter alia, model non-linear, inter-temporal and/or continuous-time characteristics of the generation trajectory of respective PGU 120 (e.g., may consider ramping constraints that define, inter alia, the rate at which the generation trajectory of a PGU 120 ramps up to higher generation levels, ramps down to lower generation levels, and/or the like). The manager 146 may be configured to model power generated by selected PGUs 120A-N(PGM(t)) in accordance with the generation and/or ramping characteristics. The manager 146 may model the scheduled capacity PGM(t) as a sum of non-linear, inter-temporal, and/or continuous-time generation trajectories of respective PGU 120A-N over the operating period.

In some embodiments, the manager 146 comprises a power system modeler 147 configured to, inter alia, use the ITCT load profile 155 pertaining to a specified operating period, and generation and/or ramping characteristics of respective PGU 120A-N to, inter alia, determine a power system configuration 160 adapted to satisfy the inter-temporal and/or continuous time net load forecast, N(t)). The modeler 147 may be further configured to determine a PGU configuration 164 to select, schedule, and/or configure PGUs 120A-N to satisfy the ITCT load profile 155. The modeler 147 may determine a model of the scheduled capacity (MSC) for the power system 100, which may comprise a model of the power generation capacity scheduled for the power system 100 over the operating period (e.g., power generation capacity scheduled to be supplied by respective PGU 120A-N). The MSC for the power system 100 may comprise ITCT models of the scheduled generation trajectory of each PGU 120A-N, such that $MSC(t) = \Sigma_N G_n(t) \geq N(t)$, where MSC(t) is an inter-temporal and/or continuous-time model of the scheduled capacity of the power system 100 as a function of time, and $G_n(t)$ are inter-temporal and/or continuous-time generation trajectories of respective PGU 120A-N (which may be based on ITCT generation and/or ramping characteristics of the respective PGU 120A-N, as disclosed herein). The PGU configuration 162 may model continuous-time generation trajectories scheduled for respective PGU 120A-N that, inter alia, comply with generation and/or ramping constraints of the respective PGU 120A-N.

In some embodiments, the modeler 147 is configured to: formulate the ITCT load profile 155 and/or the generation/ramping trajectories (and constraints) of the PGUs 120A-N as a UC model, and may determine an optimal solution to the UC model in accordance with selected optimization criterion (e.g., an objective function, such as a cost optimization function and/or the like). The optimal solution to the UC model may correspond to a particular selection, scheduling, and/or configuration of the PGUs 120A-N(e.g., may define an optimal continuous time generation trajectory for each PGU 120A-N), and which may be used to determine an optimal power system configuration 160 for the power system 100 (determine an optimal PGU configuration 162 and/or corresponding infrastructure configuration 164). The optimal solution to the UC model may comprise determining continuous-time generation trajectories for selected PGU 120A-N that: satisfy the continue-time net-load forecast of the ITCT load profile 155 at minimal cost, subject to the generation and/or ramping constraints of the PGU 120A-N (and/or constraints of the power system 100, as defined in the power system metadata 158).

The manager 146 may provide the power system configuration 160 to the power system controller 148 (controller 148). The controller 148 may be configured to manage the real-time operation of the power system 100 during the operating period in accordance with the provided power system configuration 160. The controller 148 may be adapted to configure the PGUs 120A-N to generate power in accordance with the PGU configuration 162 (e.g., following continuous-time generation trajectories of the PGU configuration 162). The controller 148 may be configured to transmit PGU requests 166 to respective PGUs 120A-N through the power system communication infrastructure 118 and/or external communication infrastructure 102. The PGU requests 166 may be configured to select, schedule, and/or configure PGUs 120A-N to generate and/or supply specified amount(s) of power to the power system 100 during real-time operation. In some embodiments, the controller 148 may interface with PGUs 120A-N through one or more PMCD 121, as disclosed herein. The PMCD 121A-N may be configured to convey the PGU requests 166 (e.g., commitment, scheduling, and/or configuration information) to respective PGUs 120A-N, selectively couple PGUs 120A-N to the power system infrastructure 110, and so on, as disclosed herein. The controller 148 may be further adapted to configure the power system infrastructure 110 in accordance with the infrastructure configuration 164. The controller 148 may adapt the transmission infrastructure 112 to receive power generated by respective PGUs 120A-N and/or transmit the power within the power system 100. The controller 148 may configure the distribution infrastructure 114 to distribute the power to the load 130 (and/or respective load regions 132). The controller 148 may be manage real-time operation of the power system infrastructure 110 by use of the one or more IMCD 111, as disclosed herein. The controller 148 may be configured to generate and/or transmit power system configuration commands 168 (commands 168) adapted to cause respective IMCD 111 to configure the power system infrastructure 110 in accordance with the power system configuration (e.g., interface configuration 164). The commands 168 may be transmitted through an electronic communication network of the power system communication infrastructure 118, external communication infrastructure 102, and/or the like. The commands 168 may be adapted to configure the power system infrastructure 110 to receive, process, and/or distribute power being generated by the PGUs 120A-N in accordance with the PGU configuration 162.

Figure 4:
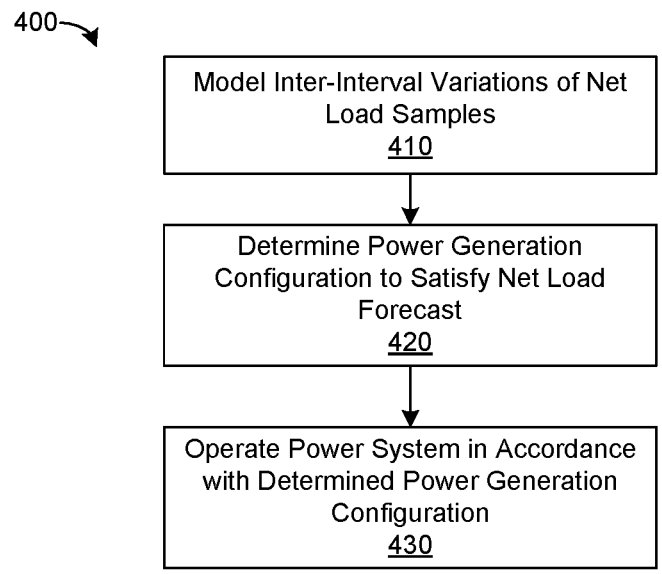
FIG. 4 is a flow diagram of one embodiment of a method for managing a power system.

FIG. 4 is a flow diagram of one embodiment of a method 400 for managing a power system 100. One or more of the steps of the method 400 (and/or the other methods disclosed herein) may be embodied as instructions stored on a non-transitory computer-readable storage medium. The instructions may be configured to cause a computing device, such as an MCD and/or computing device 141, to perform the disclosed processing steps and/or operations. Alternatively, or in addition, one or more of the steps of the method 400 (and/or the other methods disclosed herein) may be embodied and/or implemented by hardware components, such as a circuit, monitoring device, control device, communication device, and/or the like.

Step 410 may comprise determining an inter-interval, inter-temporal, and/or continuous-time net load forecast for the power system 100 during an operating period (e.g., ITCT load profile 155). The ITCT load profile 155 may be based on a plurality of net load forecast quantities, each forecasting a net load on the power system 100 at a respective time and/or during a respective interval. Step 410 may comprise monitoring the power system 100 during a current operating period and/or one or more previous operating periods, maintaining monitoring data 152, determining a load profile 154, and/or the like, as disclosed herein. The monitoring data 152 may comprise a plurality of data samples and/or measurements (e.g., net load measurements). The data samples and/or measurements may correspond to a particular sample period (e.g., every N seconds, every hour, and/or the like). Step 410 may comprise determining net load quantities to forecast the net load on the power system 100 at respective times and/or during respective time intervals, as disclosed herein.

In some embodiments, step 410 comprises determining an ITCT load profile 155 corresponding to a sequence of net load forecast quantities (of the load profile 154), each defining a constant, linear, and/or piecewise linear net load on the power system 100 during a respective time interval. Step 410 may comprise modeling variances to the net load within one or more of the time intervals. Step 410 may comprise modeling non-linear variances in the net load, as disclosed above. In some embodiments, step 410 may comprise modeling, expanding, and/or projecting the samples into a higher-order function space (e.g., cubic splines). In some embodiments, step 410 comprises projecting the net load quantities into a cubic Hermite function space.

Step 420 may comprise determining a PGU configuration 162 for the power system 100. Step 420 may comprise determining the PGU configuration 162 to select, configure, and/or schedule PGUs 120A-N to generate power for the power system 100 during the operating period. The PGU configuration 162 may be adapted to select, configure, and/or schedule PGUs 120A-N to satisfy the net load forecast for the power system 100, which may comprise selecting, configuring, and/or scheduling PGUs 120A-N to satisfy the inter-temporal variations of the net load modeled at step 410.

Step 430 may comprise operating the power system 100 during the operating period in accordance with the PGU configuration 162 determined at step 420. Step 430 may comprise issuing the PGU requests 166 to one or more of the PGUs 120A-N to commit (e.g., schedule) power generation. The PGU requests 166 may further specify an operating configuration of the PGUs 120A-N, such as generation characteristics (e.g., how much power to generate at particular times), ramping characteristics (e.g., how fast to ramp up power generation), and so on. Step 430 may further comprise configuring the power system infrastructure 110 in accordance with the infrastructure configuration 164, as disclosed herein (e.g., by generating and/or issuing power system configuration commands 168 to respective control devices 113A-N deployed within the power system infrastructure 110).

Figure 5:
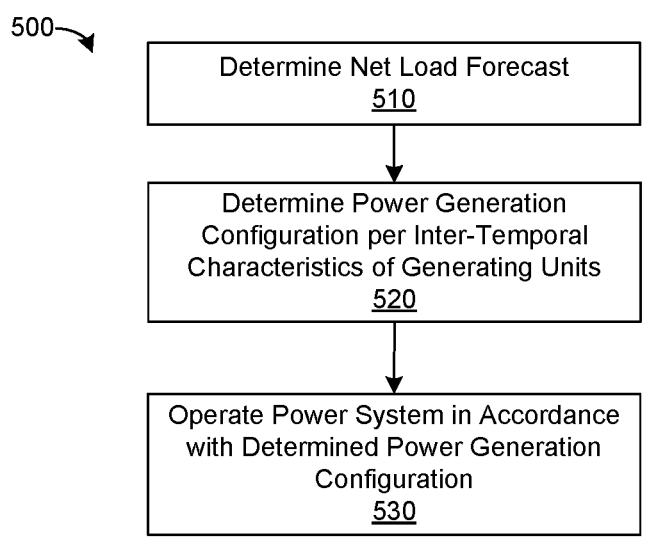
FIG. 5 is a flow diagram of another embodiment of a method for managing a power system.

FIG. 5 is a flow diagram of another embodiment of a method 500 for managing a power system 100. Step 510 may comprise determining a load profile 154 for the power system 100 as disclosed herein. The load profile 154 may comprise a sequence of net load quantities, each forecasting a load on the power system 100 at a particular time and/or during a particular time interval. Step 510 may comprise determining and/or modeling inter-interval variance in the load profile 154, as disclosed herein. The inter-interval variances may comprise non-linear variations of the net load between respective net load quantities. In some embodiments, step 510 may comprise determining an ITCT load profile 155 for the power system 100, as disclosed herein.

Step 520 may comprise determining a PGU configuration 162 to satisfy the load profile 154 (and/or ITCT load profile 155) determined for the power system 100. Step 520 may comprise selecting, scheduling, and/or configuring PGUs 120A-N during the operating period. Step 520 may comprise accessing generation and/or ramping characteristics of the PGUs 120A-N, which may define continuous-time and/or non-linear generation and/or ramping constraints of the respective PGUs 120A-N. Step 520 may comprise selecting, scheduling, and/or configuring the PGUs 120 to generate power for the power system 100 in accordance with the generation and/or ramping characteristics thereof. Step 520 may comprise determining generation trajectories for the PGUs 120A-N that satisfy the generation and/or ramping constraints of the respective PGUs 120A-N and the net load forecast. Step 520 may comprise formulating a UC model comprising a continuous-time net load forecast for the power system 100, generation and/or ramping constraints of the respective PGUs 120A-N, and cost metrics of the respective PGUs 120A-N. Step 520 may further comprise determining an optimal solution of the UC model, which may comprise determining generation trajectories for the PGU 120A-N that satisfy the net load forecast (and comply with generation/ramping constraints thereof) at a minimal cost.

Step 530 may comprise managing real-time operation of the power system 100 in accordance with the PGU configuration 162 of step 520. As disclosed herein, step 530 may comprise issuing the PGU requests 166 to one or more of the PGUs 120A-N to commit (e.g., schedule) power generation, issuing commands 168 to configure the power system infrastructure 110, and so on.

Figure 6:
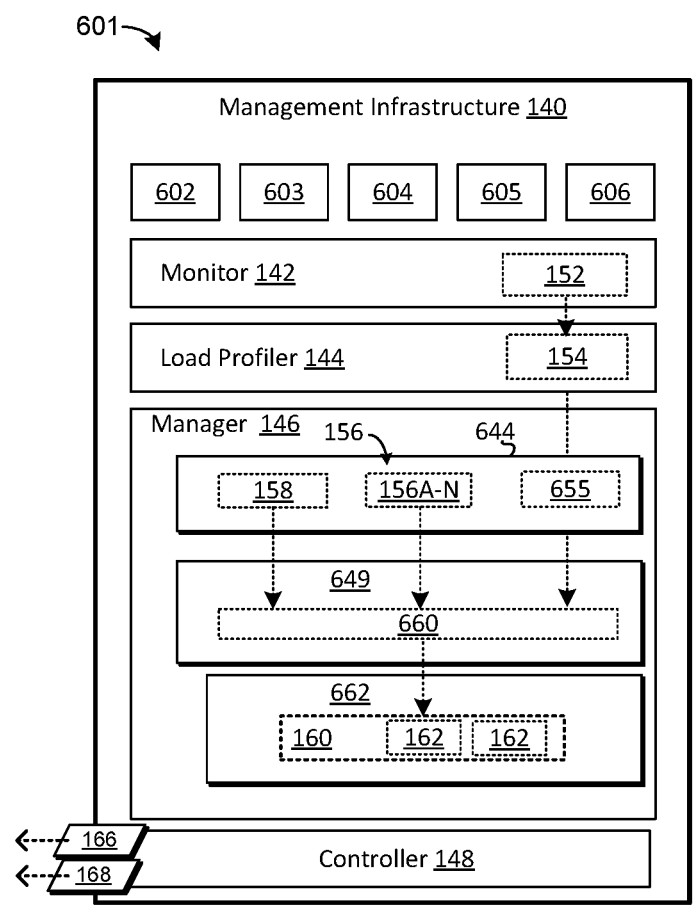
FIG. 6 is a schematic block diagram of one embodiment of an apparatus for managing a power system.

FIG. 6 is a schematic block diagram of another embodiment of management infrastructure 140 of the power system 100. FIG. 6 omits certain components of the power system 100 to avoid obscuring the details of the illustrated embodiments. The management infrastructure 140 may comprise and/or be embodied on an MCD 601, which, as disclosed herein, may comprise processing resources 602, memory resources 603, non-transitory storage resources 604, communication resources 605, HMI components 606, and/the like. In the FIG. 6 embodiment, the management infrastructure 140 may comprise a monitor 142, a load profiler 144, a power system configuration manager (manager 146), and a controller 148. The monitor 142 may be configured to acquire monitoring data 152 pertaining to the power system 100 (e.g., by use of, inter alia, one or more MCD, such as IMCD 111, PMCD 121, and/or LMCD 131, as disclosed herein). The load profiler 144 may be configured to determine a load profile 154 for the power system 100. The load profile 154 may comprise a forecast of the net load on the power system 100 during a particular operating period (e.g., a day-ahead forecast). The load profile 154 may comprise a plurality of net load quantities, each corresponding to a net load forecast for the power system 100 at a particular time and/or during a particular interval (e.g., discrete net load quantities). The net load quantities may correspond to power consumption measurement data captured at particular sampling and/or measurement intervals. The load profiler 144 may derive the load profile 154 (and/or the sample points thereof) from power consumption monitoring data and/or other factors, as disclosed herein.

The power system configuration manager (manager 146) may be configured to determine a power system configuration 160 for an operating period. The power system configuration 160 may comprise a PGU configuration 162 and an infrastructure configuration 164, as disclosed herein. The PGU configuration 162 may select, schedule, and/or configure PGUs 120A-N to generate power during the operating period. The infrastructure configuration 164 may be adapted to configure the power system infrastructure 110 to distribute power generated by the selected PGUs 120A-N to the load 130 (and/or particular load regions 132) during the operating period. The operating controller 148 may be configured to manage real-time operation of the power system 100 in accordance with the determined power system configuration 660, as disclosed herein.

In the FIG. 6 embodiment, the manager 146 may comprise ITCT modeler 644, which may be configured to, inter alia, determine an ITCT net load model 655 for the power system 100 for the operating period. As illustrated, the ITCT modeler 644 may be configured to derive the model 655 from the net load profile 154. Alternatively, or in addition, the ITCT net load modeler 647 may be configured to derive the model 655 from monitoring data 152 acquired by the monitor 152 (e.g., may configure the monitor 152 to acquire monitoring data 152 according to a selected monitoring scheme (e.g., selected monitoring internal and/or period), and may determine the ITCT net load model 655 therefrom. The ITCT modeler 644 may be further configured to, inter alia, determine and/or model ITCT characteristics of respective PGU 120A-N, which may include, but are not limited to: generation trajectory constraints of respective PGU 120A-N, ramping constraints of respective PGU 120A-N, and/or the like (and which may be maintained in, inter alia, PGU metadata 156, as disclosed herein, with PGU metadata 156A-N pertaining to PGU 120A-N, respectively). The ITCT modeler 644 may be configured to determine ITCT characteristics of PGU 120A-N by use of any suitable technique disclosed herein including, but not limited to: monitoring operation of respective PGU 120A-N(e.g., by use of the monitor 142, which may comprise configuring the monitor 142 to obtain monitoring data 152 pertaining to respective PGU 120A-N during real-time operation), analyzing monitoring data 152 pertaining to real-time operation of respective PGU 120A-N during a current operating period, analyzing monitoring data 152 pertaining to respective PGU 120A-N during one or more previous operating periods, and/or the like. Alternatively, or in addition, the ITCT modeler 644 may determine generation trajectory and/or ramping characteristics of respective PGU 120A-N based on, inter alia, properties and/or characteristics of the PGUs 120A-N(e.g., the type, size, mechanical, electrical, and/or chemical characteristics of respective PGUs 120A-N), and/or the like. In some embodiments, the ITCT modeler 644 may receive information pertaining to the generation and/or ramping characteristics of a PGU 120 from the PGU 120 itself (e.g., through a management and/or communication interface of the PGU 120). The net load forecast may comprise a net load trajectory indicating a forecasted and/or estimated net load on the power system as a function of time t (a continuous-time and/or pseudo continuous-time net load trajectory).

The manager 146 may be configured to formulate a PGU configuration 160 for the operating period that satisfies the ITCT net load profile 655 for the operating period in accordance with ITCT generation and/or ramping characteristics of respective PGU 120A-N (e.g., schedule PGU 120A-N such that power scheduled to be supplied by respective PGU 120A-N complies with generation and/or ramping constraints thereof). The manager 146 may be further configured to formulate the power system configuration 160 in accordance with characteristics of the power system 100 (as maintained within power system metadata 158, as disclosed herein). The power system metadata 148 may model and/or define characteristics, constraints, and/or properties of the power system 100 which may include, but are not limited to: operating constraints, transmission constraints (e.g., capacity of various portions of the transmission infrastructure 112 and/or distribution infrastructure 114), DC power flow constraints, topology (e.g., bus locations at which respective PGUs 120A-N are capable of being electrically coupled to the transmission infrastructure 112), and so on.

As disclosed above, approaches to scheduling PGUs 120 on an discrete-time basis (in accordance with hourly net load forecasts) may comprise modeling net load and/or generation trajectory as discrete and/or piecewise linear functions, which may not accurately reflect real-time operation of the power system 100, leading to inaccuracies (and susceptibility to ramping scarcity conditions). In the FIG. 6 embodiment, the manager 146 may be configured to formulate a UC model for the power system 100 as a continuous-time optimization system, as follows:

$$\min \int_\Omega C(G(t),I(t))dt$$

$$\text{s.t. } f(G(t),I(t))=0$$

$$h(G(t),G'(t),I(t)) \leq 0 \quad \text{Eq. 1.}$$

In Eq. 1, C may comprise a cost function, G(t) models power generation of selected PGUs 120A-N as a function of time (e.g., generation trajectory), G'(t) may comprise the time derivative of G(t) (e.g., ramping trajectory), I(t) represents commitment variables for respective PGUs 120A-N (decision variables), and Ω represents the operating period (e.g., scheduling horizon, such as a day-ahead). Solving the UC formulation of Eq. 1 may comprise determining an hourly commitment scheme that minimizes total generation cost during the operating period Ω. The functions $f$ and $h$ may comprise UC equality and inequality constraints, including, but not limited to: a balance constraint, PGU generation capacity, ramping, minimum on/off time, startup and shutdown costs, and so on. The functions $f$ and $h$ may, therefore, be defined by the PGU metadata 156, power system metadata 158, and/or the like, as disclosed herein. It may not be computationally feasible to solve the continuous-time formulation of the UC model. In some discrete-time UC techniques, commitment variables I(t) may be limited to hourly changes of commitment status. The generation trajectory G(t), however, may be adapted to change between consecutive hourly schedules. As illustrated below, the solution to the hourly day-ahead schedule of Eq. 1 lies in a linear function space. Since all polynomial splines of the same order are equivalent (e.g., span the same sub-space), the generation schedule, constraints, and cost function of Eq. 1 may be interpreted as polynomials (e.g., interpreted in terms of shifts of Bernstein polynomials of degree 1).

Bernstein polynomials of degree n may be defined as:

$$B_{k,n}(t) = \binom{n}{k} t^k (1-t)^{n-k} \Pi(t), k \in [0,n], t \in [0,1]. \quad \text{Eq. 2.}$$

In Eq. 2 k refers to a kth PGU 120A-N, m refers to a particular interval (e.g., hour), and n refers to a segment of a linearized cost function. Referring back to FIG. 2, the linear spline approximation of the discrete net load forecast points N(T)–N(24T) may be expressed in each hourly sub-interval m in the function space of two Bernstein polynomials of degree 1. More particularly, as $B_{0,1}(t)=t$ and $B_{1,1}(t)=1-t$, weighted by the value of load at the beginning and end of the hour, as follows:

$$\hat{N}(t) = N_m^{B0} B_{0,1}(t) + N_m^{B1} B_{1,1}(t) t_m \leq t < t_{m+1} \quad \text{Eq. 3}$$

In Eq. 3, $N_m^{B0}=N(t_m)$ and $N_m^{B1}=N(t_{m+1})$ may comprise the coefficients of the net load forecast in the linear function space, defining the vectors:

$$B_1(t)=(B_{0,1}(t);B_{1,1}(t))^T, N_m=(N_m^{B0},N_m^{B1})^T, \quad \text{Eq. 4.}$$

The linear expansion of Eq. 3 may be expressed in matrix form over the day-ahead scheduling horizon Ω as follows:

$$\hat{N}(t) = \sum_{m=0}^{M-1} B_1^T(\tau_m) N_m. \quad \text{Eq. 5}$$

In Eq. 5, the term $\tau_m=(t-t_m)/(t_{m+}-t_m)$ translates and rescales $B_1(t)$ to cover respective periods $t_m \leq t \leq t_{m+1}$. The continuous-tie load model of Eq. 5 may, therefore, represent the piecewise linear load profile depicted by line 214 in FIG. 2 in the 2M-dimensional function space of the Bernstein polynomials of degree 1.

The continuous-time generation trajectory corresponding to the discrete-time schedule of generating units (e.g., PGU configuration 162 comprising hourly scheduling of PGUs 120A-N) may also be an element of the same 2M-dimensional function space spanned by M=24 shifts of the Bernstein polynomials of degree 1, as follows:

$$G_k(t) = \sum_{m=0}^{M-1} B_1^T(\tau_m) G_{k,m}. \quad \text{Eq. 6}$$

In Eq. 6, $G_{k,m} = (G_{k,m}^{B0}, G_{k,m}^{B0})^T$ represents the coefficients of the continuous-time generation trajectory of generating unit k at hourly interval m. The coefficients of the expansion equal to the hourly generation schedules may be expressed as:

$$G_{k,m}^{B0} = G_k(t_m), G_{k,m}^{B1} = G_k(t_{m+1}). \quad \text{Eq. 7}$$

Although the continuous-time generation schedule lies in the 2M-dimensional function space, the number of degrees of freedom is m, due to generation continuity at the intersection of hourly intervals, per Eq. 8 below:

$$G_{k,m-1}^{B1} = G_{k,m}^{B0} = G_k(t_m), \forall m > 1. \quad \text{Eq. 8}$$

The quadratic cost function of generating units may be approximated by a piecewise linear cost function, which may be configured to preserve the linearity of the UC formulation of Eq. 4:

$$C_k(G_k(t), I_k(t)) = C_k(G_k^{min}) I_k(t) + \sum_{n=0}^{N_k-1} \gamma_{k,n}(t) \Gamma_{k,n}(t). \quad \text{Eq. 9}$$

In Eq. 9, the capacity range of generating unit k is divided into $N_k$ sections using intermediate generation points $g_0 = G_k^{min}, g_1, g_2 \ldots g_{Nk} = G_k^{max}$, and $N_k$ number of auxiliary generation variables $\Gamma_{k,n}(t)$ are defined to model the generation schedule in each of the linear sections. The total generation of generating unit k may, therefore, be stated in terms of the auxiliary generation variables $\Gamma_{k,n}(t)$, as follows:

$$G_k(t) = G_k^{min} I_k(t) + \sum_{n=0}^{N_k-1} \Gamma_{k,n}(t). \quad \text{Eq. 10}$$

$$0 \leq \Gamma_{k,n}(t) \leq g_{n+1} - g_n. \quad \text{Eq. 11}$$

The auxiliary generation variables $\Gamma_{k,n}(t)$ may also be expressed in the 2M-dimensional function space spanned by $\{\{B_1^T(\tau_m)\}_{m=0}^{M-1}\}$, as follows:

$$\Gamma_{k,n}(t) = \sum_{m=0}^{M-1} B_1^T(\tau_m) \Gamma_{k,n,m}. \quad \text{Eq. 12}$$

The continuous-time relation in Eq. 10 may be equivalent to the following constraint on the coefficients:

$$G_{k,m} = G_k^{min} I_{k,m} + \sum_{n=0}^{N_k-1} \Gamma_{k,n,m}. \quad \text{Eq. 13}$$

In Eq. 13, $I_{k,m} = (I_k(t_m), I_k(t_{m+1}))^T$, and $G_k^{min}$ may comprise the minimum generation capacity of generating unit k. The cost function coefficients in Eq. 9 are assumed to be constant over each period (hour), such that:

$$\gamma_{k,n}(t) \approx \gamma_{k,n}(t_m) t_m \leq t < t_{m+1}, \quad \text{Eq. 14}$$

This assumption may accurately reflect an hourly market environment in which power generation resources are committed, priced, and/or scheduled according to hourly intervals. The total generation cost of generating unit k over the day-ahead scheduling horizon $\Omega$ may, therefore, be calculated using the function space representation of the auxiliary generation variables $\Gamma_{k,n}(t)$ of Eq. 12, as follows:

$$\int_\Omega C_k(G_k(t), I_k(t)) dt = \quad \text{Eq. 15.}$$
$$\sum_{m=0}^{M-1} \left[ C_k(G_k^{min}) I_k(t_m) + \sum_{n=0}^{N_k-1} \gamma_{k,n}(t_m) \Gamma_{k,n}(t_m) \right].$$

As described above, the linear approximation of net load and/or generation trajectory of Eqs. 1-15 may not accurately mode sub-hourly variations in net load, nor consider non-linear generation and/or ramping trajectories of the PGUs 120A-N. Therefore, in some embodiments, the manager 146 may be configured to formulate the net load projection and/or generation trajectory within a higher-order, non-linear function space. Accordingly, the net load forecast of the load profile 154 and/or generation trajectory (e.g., the scheduled capacity) may be expressed as cubic splines. Cubic splines may interpolate points with minimum curvature while providing additional flexibility to fit continuous-time load variations (which are not reflected in hourly net load and/or generation systems).

The ITCT modeler 644 may be configured to determine the ITCT net load profile 655 for the power system 100, as disclosed herein. In the FIG. 6 embodiment, the ITCT modeler 644 may be configured to derive a cubic spline representation of the net load forecast (e.g., the ITCT net load profile 655 may comprise a cubic spline model of the net load forecast for the operating period). As disclosed in further detail herein, the ITCT net load profile 655 may comprise a projection in cubic Hermite function space. The manager 146 may further comprise a UC modeler 649 to formulate a UC model 660 for a power system 100, and a UC processor 662 to determine an optimal solution to the UC model 660 (which may correspond to a power system configuration 160 for the power system 100).

The ITCT modeler 644 may be configured to project the net load and/or generation trajectory by use of a Hermite basis and/or Bernstein polynomials of degree 3 (by use of the net load modeler 645). The Hermite basis may enable coefficients of the expansion to be defined as samples of generation and generation rate of change (e.g., model ITCT generation and/or ramping trajectory of respective PGU 120A-N). Bernstein polynomials may be useful as a proxy expansion to enforce capacity and ramping constraints for continuous-time generation trajectory. Although particular implementations for projecting the net load and/or generation trajectory into a cubic spline function space are described herein, the disclosure is not limited in this regard and could be adapted to utilize any non-linear and/or higher-order model for net load and/or generation trajectory.

The ITCT modeler 644 may be configured to determine a ITCT model of the net load forecast for the power system 100 in the cubic spline function space. As disclosed above, the load profile 154 may comprise a sequence of sample points (net load projections) which may be distributed into M intervals within the scheduling horizon Ω (e.g., the next 24-hours of operation). The net load projections of the load profile 154 may comprise points $0, t_1, t_2, \ldots t_M$. The Hermite polynomial bases in t [0, 1] are:

$$H_{00}(t)=(2t^3-3t^2+1)\Pi(t)$$

$$H_{01}(t)=(t^3-2t^2+t)\Pi(t)$$

$$H_{10}(t)=(-2t^3-3t^2)\Pi(t)$$

$$H_{11}(t)=(t^3-t^2)\Pi(t)$$

The Hermite polynomial basis may comprise entries of the vector $H(t)=(H_{00}(t),H_{01}(t),H_{10}(t), H_{11}(t))^T$. The coefficients of the cubic Hermite approximation of load over the mth interval may be denoted as the vector $N_m^H=(N_m^{00}, N_m^{01}, N_m^{10}, N_m^{11})^T$, and the Hermite approximation of the day-ahead load profile may be expressed as:

$$\hat{N}(t) = \sum_{m=0}^{M-1} H^T(\tau_m) N_m^H. \qquad \text{Eq. 16}$$

The ITCT modeler 644 may configure Eq. 16 such that the coefficients of the cubic Hermite approximation of the net load (of the ITCT net load profile 655) are uniquely defined by the value of load and the load derivate (e.g., ramp) at the starting and ending point of respective intervals, in accordance with Eqs. 17 and 18 below:

$$N_m^{00}=\hat{N}(t_m), N_m^{10}=\hat{N}(t_{m+1})(t_{m+1}), \qquad \text{Eq. 17.}$$

$$N_m^{01}=\hat{N}'(t_m), N_m^{11}=\hat{N}'(t_{m+1}). \qquad \text{Eq. 18.}$$

As illustrated above, the linear spline expansion only ensured continuity of the net load, but not of its derivative. The C' continuity constraint of Eq. 19 (below) may be imposed on the cubic Hermite approximation of the net load (Eq. 18) to ensure continuity of its derivative:

$$N_m^{00}=N_{m-1}^{10}, N_m^{01}=N_{m-1}^{11} \forall m>0 \qquad \text{Eq. 19.}$$

The constraint of Eq. 19 implies that there are 2M parameters defining $\hat{N}(t)$ in the function space of cubic Hermite splines. The cubic Hermite basis functions may be expressed in terms of Bernstein polynomials of degree 3 as follows:

$$H(t)=WB_3(t) \qquad \text{Eq. 20.}$$

The change of basis matrix W may be defined as:

$$W = \begin{pmatrix} 1 & 1 & 0 & 0 \\ 0 & \frac{1}{3} & 0 & 0 \\ 0 & 0 & 1 & 1 \\ 0 & 0 & -\frac{1}{3} & 0 \end{pmatrix}. \qquad \text{Eq. 21}$$

Using Eq. 20, $\hat{N}(t)$ of Eq. 16 may be expressed in terms of Bernstein polynomials of degree 3 as:

$$\hat{N}(t) = \sum_{m=0}^{M-1} B_3^T(\tau_m) W^T N_m^H = \sum_{m=0}^{M-1} B_3^T(\tau_m) N_m^B. \qquad \text{Eq. 22}$$

In Eq. 22, $N_m^B = W^T N_m^M$ may comprise a vector of the coefficients for Bernstein polynomial approximation of the net load in the mth interval. Correspondingly, the continuous-time generation trajectory of PGUs 120A-N over the day-ahead scheduling horizon Ω may be expressed as:

$$G_k(t) = \sum_{m=0}^{M-1} H^T(\tau_m) G_{k,m}^H = \sum_{m=0}^{M-1} B_3^T(\tau_m) G_{k,m}^B. \qquad \text{Eq. 23}$$

As shown in Eq. 23, the cubic Hermite spline and the Bernstein polynomial of degree 3 comprise two interchangeable bases for modeling generation trajectory (and/or net load) and, as such, may be used interchangeably in order to, inter alia, enforce different constraints and/or conditions. The continuity property $C^1$ may ensure that only the first two cubic Hermit coefficients (i.e., $G_{k,m}^{00}$ and $G_{k,m}^{01}$) are independent in each interval. These coefficients may represent the value of the generation and ramping of a PGU 120A-N at the beginning point of the interval at time $t_m$. The two coefficients (i.e., $G_{k,m}^{10}$ and $G_{k,m}^{11}$) in each interval are not independent and may be respectively equal to the values of the generation and ramping of the PGU at the beginning point of the subsequent interval $(t_{m+1})$.

As mentioned above, the disclosure is not limited to modeling inter-interval variations of net load and/or generation trajectory by use of Hermite splines and/or Bernstein polynomials. However, the use of Bernstein polynomials of degree 3 may provide several advantages. For instance, derivatives of the Bernstein polynomials of degree n may be expressed as the degree of the polynomial, multiplied by the difference of two Bernstein polynomials of degree n−1. For degree 3, a derivative may be expressed as:

$$B'_{k,3}(t)=3(B_{k-1,2}(t)-B_{k,2}(t)) \qquad \text{Eq. 24.}$$

Eq. 24 may be expressed in matrix form as follows:

$$B'_3(t)=KB_2(t) \qquad \text{Eq. 25.}$$

$B_2(t)$ may comprise the vector of Bernstein polynomials of degree 2, and K may comprise a linear matrix relating the derivatives of $B_3(t)$ with $B_2(t)$, as follows:

$$K = \begin{pmatrix} -3 & 0 & 0 \\ 3 & -3 & 0 \\ 0 & 3 & -3 \\ 0 & 0 & 3 \end{pmatrix}. \qquad \text{Eq. 26}$$

The continuous-time ramping trajectory of a PGU 120A-N k may be defined in a space spanned by Bernstein polynomials of degree 2 as follows:

$$G'_k(t) = \sum_{m=0}^{M-1} B_3^T(\tau_m) G'^B_{k,m}. \qquad \text{Eq. 27}$$

In Eq. 27, $G'^B_{k,m}=(G'^{B0}_{k,m},G'^{B1}_{k,m},G'^{B2}_{k,m})^T$ may represent the vector of Bernstein coefficients of the continuous-time ramping trajectory, which can be expressed in terms of cubic Hermite splines as follows:

$$G'^B_{k,m} = K^T G^B_{k,m} = K^T W^T G^H_{k,m} \qquad \text{Eq. 28.}$$

In which:

$$G'^{B0}_{k,m} = 3(G^{B1}_{k,m} - G^{B0}_{k,m}) = G^{01}_{k,m} \qquad \text{Eq. 29}$$

$$G'^{B1}_{k,m} 3(G^{B2}_{k,m} - G^{B1}_{k,m}) = 3(G^{10}_{k,m} - G^{00}_{k,m}) - G^{11}_{k,m} - G^{01}_{k,m} \qquad \text{Eq. 30.}$$

$$G'^{B2}_{k,m} = 3(G^{B3}_{k,m} - G^{B2}_{k,m}) = G^{11}_{k,m}. \qquad \text{Eq. 31.}$$

Bernstein polynomials may also satisfy a "convex hull property," such that the continuous-time trajectories will remain within a convex hull formed by four Bernstein points. Accordingly, the lower and upper bounds of the continuous-time generation and ramping trajectories of PGUs 120A-N(defined in PGUGR metadata 157A-N) within an internal m may be represented by the associated Bernstein coefficients, as follows:

$$\min_{t_m \leq t \leq t_{m+1}} \{B_3^T(\tau_m) G^B_{k,m}\} \geq \min\{G^B_{k,m}\}. \qquad \text{Eq. 32}$$

$$\max_{t_m \leq t \leq t_{m+1}} \{B_3^T(\tau_m) G^B_{k,m}\} \leq \max\{G^B_{k,m}\}. \qquad \text{Eq. 33}$$

$$\min_{t_m \leq t \leq t_{m+1}} \{B_3^T(\tau_m) G'^B_{k,m}\} \geq \min\{G'^B_{k,m}\}. \qquad \text{Eq. 34}$$

$$\max_{t_m \leq t \leq t_{m+1}} \{B_3^T(\tau_m) G'^B_{k,m}\} \leq \max\{G'^B_{k,m}\}. \qquad \text{Eq. 35}$$

Another advantage of the continuous-time model of generation trajectory using cubic Hermite and Bernstein polynomials as disclosed herein (e.g., per Eq. 23) is a corresponding generation cost function (e.g., Eq. 9) may be accurately computed for continuous-time generation trajectory, as opposed to an hourly constant generation schedule. The auxiliary generation variables $\Gamma_{k,n}(t)$ of the linearized cost function of Eq. 9 may be translated into the cubic Hermite function space, as follows:

$$\Gamma_{k,n}(t) = \sum_{m=0}^{M-1} H^T(\tau_m) \Gamma^H_{k,n,m}. \qquad \text{Eq. 36}$$

In Eq. 36, $\Gamma_{k,n,m}$ may comprise a vector of cubic Hermite coefficients, as follows:

$$\Gamma^H_{k,n,m} = (\Gamma^{00}_{k,n,m}, \Gamma^{01}_{k,n,m}, \Gamma^{11}_{k,n,m})^T. \qquad \text{Eq. 37.}$$

In the FIG. 6 embodiment, the net load modeler 647 may be configured to express the net load profile 154 as cubic Hermite polynomials, CSRNL 655 (e.g., in accordance with Eq. 16). The respective coefficients $B_m$ may flow into a UC modeler 649, which may generate a UC model 660 for the power system 100. The continuous-time generation and ramping trajectories of each PGU 120A-N k may be represented by the coefficients $G^H_{k,m}$, $G'^B_{k,m}$ defined over M intervals (e.g., hours) of the scheduling horizon Ω (e.g., day). The continuous-time binary commitment variable (decision variable) of a particular PGU 120A-N k, $I_k(t)$ may be constant in each interval m, and as such, the continuous-time piecewise constant representation of the commitment variable k may be expressed as:

$$I_k(t) = \sum_{m=0}^{M-1} I_k(t_m)[u(t-t_m) - u(t-t_{m+1})]. \qquad \text{Eq. 38}$$

The coefficients $G^H_{k,m}$, $G'^B_{k,m}$ and binary variables $I_k(t_m)$ may act as the decision variables of the UC model 660. The optimal solution to the UC model 660 may be utilized to reconstruct the continuous-time generation and ramping trajectories of the PGUs 120A-N(e.g., reconstructed the model of the scheduled capacity (MSC) for the power system 100, as disclosed herein).

The manager 146 comprises a UC processor 662 configured to determine an "optimal" power system configuration 160 by, inter alia, determining an optimal solution to the UC model 660, as disclosed herein. The optimal solution to the UC model 660 may correspond to an optimization criterion, such as minimizing the total continuous-time generation cost of power generated during the scheduling horizon Ω (e.g., day), including startup and shutdown costs. The continuous-time generation cost function may be defined in terms of the cubic Hermite coefficients of the auxiliary generation variables $\Gamma_{k,n,m}(t)$, by integrating the linearized cost function of Eq. 9, as follows:

$$\int_\Omega \hat{C}_k(G_k(t), I_k(t)) dt = \sum_{m=0}^{M-1} \left[ C_k(G_k^{min}) \int_{t_m}^{t_{m+1}} I_k(t) dt + \sum_{n=0}^{N_k-1} \gamma_{k,n}(t_m)(\Gamma^H_{k,n,m})^T \left[ \int_{t_m}^{t_{m+1}} H(\tau_m) dt \right] \right]. \qquad \text{Eq. 39}$$

In Eq. 39, the cost coefficients $C_k(G_k^{min})$ and $\gamma_{k,n}(t_m)$ may be constant over each interval m. By calculating the integrals per Eq. 39, the objective function of the UC model 660, including the total generation, startup, and shutdown costs, may be expressed as follows:

$$\min \sum_{k=1}^{K} \sum_{M=0}^{M-1} \left[ C_k^{SU}(t_m) + C_k^{SD}(t_m) + T_m \left( C_k(G_k^{min}) I_k(t_m) + \sum_{n=0}^{N_k-1} \gamma_{k,n}(t_m) \left[ \frac{\Gamma^{00}_{k,n,m} + \Gamma^{10}_{k,n,m}}{2} + \frac{\Gamma^{01}_{k,n,m} - \Gamma^{11}_{k,n,m}}{12} \right] \right) \right]. \qquad \text{Eq. 40}$$

The startup and shutdown costs of a PGU 120A-N(per Eq. 40) may be triggered when PGUs 120A-N are committed (scheduled) or shutdown, which are respectively identified by the corresponding changes to the binary commitment variable in Eqs. 41 and 42 below. In addition, the bounds of the auxiliary generation variables of Eq. 11 may be translated into constraints on the associated Bernstein coefficients due to, inter alia, the convex hull property of Bernstein polynomials, as disclosed above.

$$\gamma_k^{SU}[I_k(t_m) - I_k(t_{m-1})] \leq C_k^{SU}(t_m) \forall k, \forall m \qquad \text{Eq. 41.}$$

$$\gamma_k^{SD}[I_k(t_{m-1}) - I_k(t_m)] \leq C_k^{SD}(t_m) \forall k, \forall m \qquad \text{Eq. 42.}$$

$$0 \leq W^T \Gamma^H_{k,n,m} \leq g_{n+1} - g_n \forall n, \forall k, \forall m. \qquad \text{Eq. 43.}$$

The UC processor 662 may be configured to balance generation and load (in the UC model 660) per Eq. 44 below, which may comprise balancing the four cubic Hermite coefficients of the continuous-time load and generation trajectory in each interval m. Therefore, unlike discrete and/or piecewise linear PGU management in which PGUs 120A-N are scheduled to balance hourly samples of net load, the manager 146 is configured to schedule the continuous-time generation trajectory (per Eq. 44) to balance the continuous-time variations and ramping of load within the intervals m, as represented by the cubic Hermite spline model. In addition, the UC processor 662 may enforce the constraints of Eq. 45 (below) to ensure $C^1$ continuity of the generation trajectory over the scheduling horizon $\Omega$. In Eq. 46 (below), the Bernstein coefficient of the continuous-time generation trajectory of generating units is expressed in terms of the coefficients of the auxiliary generation variables, where $I_{k,m} = (I_k(t_m), I_k(t_m), I_k(t_{m+1}), I_k(t_{m+1}))^T$ is the vector of applicable binary variables. In Eq. 46, the first two cubic Hermite coefficients of generation variables may be associated with the commitment status of PGUs 120A-N in interval m, while the last two coefficients are associated with the commitment status of PGUs 120A-N in interval m+1.

$$\sum_{k=1}^{K} G_{k,m}^H = N_m^H \ \forall m. \quad \text{Eq. 44}$$

$$G_{k,m}^{10} = G_{k,m+1}^{00}, G_{k,m}^{11} = G_{k,m+1}^{01} \ \forall k, \forall m. \quad \text{Eq. 45}$$

$$W^T G_{k,m}^H = G_k^{min} I_{k,m} + \sum_{n=0}^{N_k - 1} W^T \Gamma_{k,n,m}^H. \quad \text{Eq. 46}$$

The UC processor 662 may leverage the convex hull property of Bernstein polynomials to enforce generation capacity constrains in continuous-time by capping the four Bernstein coefficients of the generation trajectory as follows:

$$W^T G_{k,m}^H \geq G_k^{min} I_{k,m} \forall k, \forall m \quad \text{Eq. 47}$$

$$W^T G_{k,m}^H \leq G_k^{max} I_{k,m} \forall k, \forall m. \quad \text{Eq. 48}$$

The UC processor 662 may be configured to apply continuous-time ramping constraints in a similar manner by capping the Bernstein coefficients of the continuous-time ramping trajectory of PGUs 120A-N derived in Eqs. 29-31, only two of which are independent in each interval m due to the ramping continuity constraint of Eq. 45. The ramping up and down constraints for the first Bernstein coefficient of generation ramping trajectory (which may also account for the startup and shutdown ramp rates) may be defined as:

$$G'^{B0}_{k,m} \leq R_k^U I_k(t_{m-1}) + R_k^{SU}[I_k(t_m) - I_k(t_{m-1})] + G_k^{max}[1 - I_k(t_m)] \ \forall k, \forall m \quad \text{Eq. 49}$$

$$-G'^{B0}_{k,m} \leq R_k^D I_k(t_m) + R_k^{SD}[I_k(t_{m-1}) I_k(t_m)] + G_k^{max}[1 - I_k(t_{m-1})] \ \forall k, \forall m \quad \text{Eq. 50}$$

In Eqs. 49 and 50, $R_k^U$, $R_k^D$, $R_k^{SU}$, $R_k^{SD}$ may represent ramp up, ramp down, startup ramp, and shutdown ramp limits of a PGU 120A-N k. The ramping up and down constraints for the second Bernstein coefficient of generation ramping trajectory may be defined as:

$$G'^{B1}_{k,m} \leq R_k^U I_k(t_m) \forall k, \forall m = 0 \ldots M-2 - G'^{B1}_{k,m} \leq R_k^D I_k(t_m) + \eta[1 - I_k(t_{m+1})] \quad \text{Eq. 51}$$

$$\forall k, \forall m = 0 \ldots M-2 \quad \text{Eq. 52}$$

In Eqs. 51 and 52, 1 may be a constant equal to the upper bound of $G'^{B1}_{k,m}$ in interval m when the PGU 120A-N k is offline in interval m+1. The second term of Eq. 52 may ensure that the constraint does not prevent the PGU 120A-N from turning off.

The UC processor 662 may be further configured to formulate minimum off time constraints for the UC model 660, as follows:

$$\sum_{m'=m}^{m+T_k^{on}-1} T_{m'} I_k(t_{m'}) \geq T_k^{on}[I_k(t_m) - I_k(t_{m-1})]. \quad \text{Eq. 53}$$

$$\sum_{m'=m}^{m+T_k^{off}-1} T_{m'}[1 - I_k(t_{m'})] \geq T_k^{off}[I_k(t_{m-1}) - I_k(t_m)]. \quad \text{Eq. 54}$$

The UC processor 662 may configure $T_k^{on}$ and $T_k^{off}$ to represent minimum on and off times of a PGU 120A-N k. The manager 146 (by use of the net load modeler 647 and UC modeler 649) may formulate a UC model 660 for the power system 100 according to Eqs. 40-54, which may comprise a UC model with continuous-time generation and ramping constraints. The UC processor 662 may process the UC model 660 according to an optimization criterion (e.g., continuous-time cost characteristics) to determine the optimal power system configuration 160 for the power system 100 during the operating period. As disclosed above, the power system configuration 160 may balance the continuous-time variations and ramping of load within intervals (e.g., inter-interval variations) by, inter alia, modeling net load and ramping characteristics as cubic splines. The increased accuracy of the net load and/or generation trajectory may improve the performance of the power system 100 during real-time operation by, inter alia, more closely scheduling PGUs 120A-N to satisfy real-time load and/or ramping characteristics.

Figure 7:
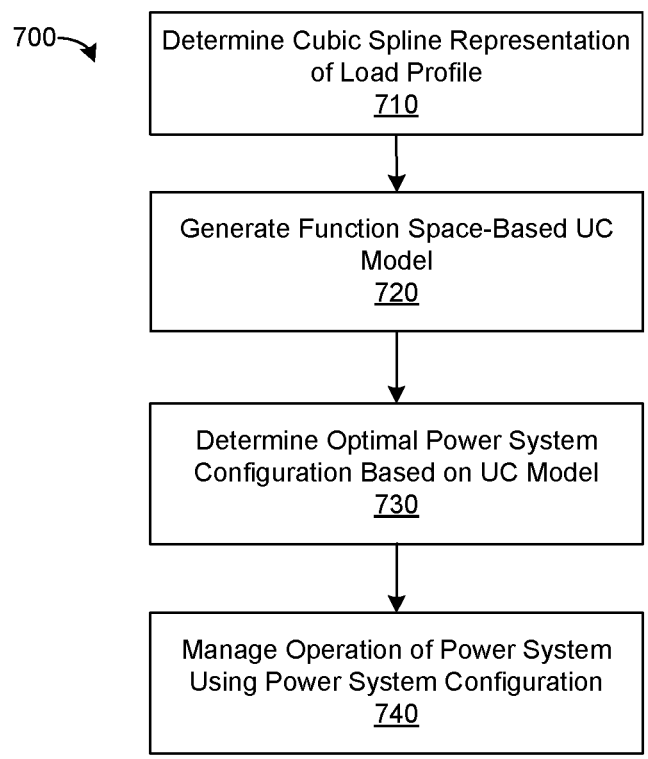
FIG. 7 is a flow diagram of another embodiment of a method for managing a power system.

FIG. 7 is a flow diagram of another embodiment of a method 700 for managing a power system, such as the power system 100. Step 710 may comprise determining a ITCT net load profile 655 for an operating period of the power system 100. Step 710 may comprise determining a cubic spline representation of a load profile 154, as disclosed herein. Alternatively, or in addition, step 710 may comprise determining a cubic spline representation (or other suitable representation) of the net load forecast by use of the monitor 142 and/or monitoring data 152 acquired thereby.

Step 720 may comprise generating a UC model 660 corresponding to the ITCT net load profile 655. Step 720 may comprise incorporating ITCT generation and/or ramping characteristics of respective PGUs 120A-N into the UC model 660, incorporating ITCT cost metrics of respective PGU 120A-N, incorporating power system constraints into the UC model 660 (in accordance with power system metadata 158, and/or the like, as disclosed herein. Step 720 may comprise determining generation and/or ramping characteristics of respective PGU 120A-N, as disclosed herein. Alternatively, or in addition, step 720 may comprise accessing generation and/or ramping characteristics of respective PGU 120A-N maintained within, inter alia, PGU metadata 156A-N. Step 720 may further comprise determining power system constraints and/or accessing power system constraints maintained within, inter alia, power system metadata 158.

Step 730 may comprise determining an optimal power system configuration based on the UC model of step 720, as disclosed herein. Step 730 may comprise determining optimal generation trajectories for the PGU 120A-N that: satisfy the ITCT net load model 655 determined for the power system 110, comply with the generation and/or ramping constraints of the respective PGU 120A-N, and/or minimize costs metric(s) of the respective PGU 120A-N (e.g., satisfy the net load forecast at minimal cost).

Step 740 may comprise managing operation of the power system 100 during real-time operations in accordance with the optimal power system configured determined at step 730.

Figure 8:
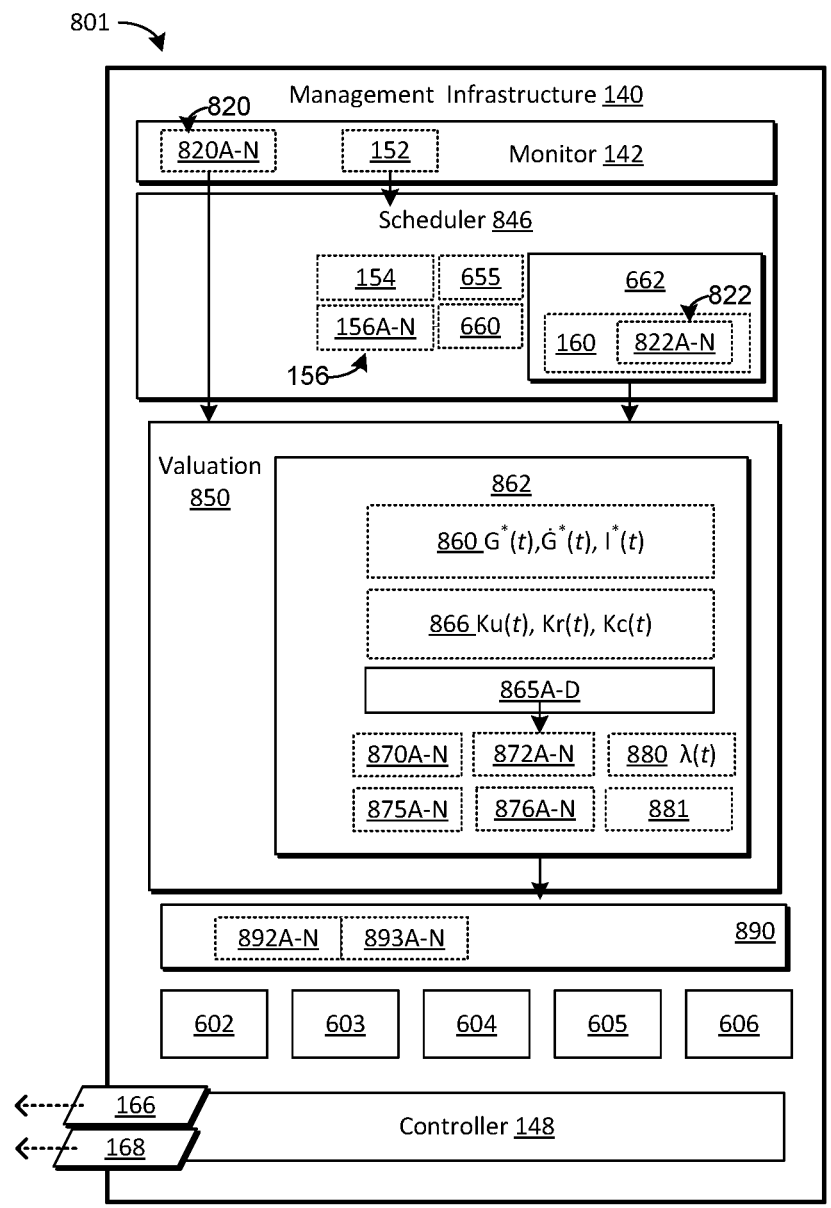
FIG. 8 depicts one embodiment of control infrastructure for comprising a valuation manager configured to determine valuation metrics for power generated for the power system.

FIG. 8 is a schematic block diagram of an embodiment of management infrastructure 140 for a power system 100 and/or PGU 120. The management infrastructure 140 may comprise and/or be embodied within a computing device 801, such as an MCD. The management infrastructure 140 may, therefore, comprise processing resources 602, memory resources 603, non-transitory storage resources 604, communication resources 605, HMI components 606, and so on, as disclosed herein.

The management infrastructure 140 may comprise a valuation manager 850, which may be configured to determine a marginal valuation metric 880 for power generated for the power system 100 by the PGUs 120A-N. The marginal valuation metric 880 may comprise a continuous-time valuation metric 880 quantifying a value of power generated for the power system 100 during an operating interval T. The marginal valuation metric 880 may incorporate costs associated with the ramping trajectories of the PGU 120A-N as opposed to quantifying cost based on an amount of power generated thereby (as in conventional valuation approaches). The valuation manager 850 may be further configured to determine respective incremental generation cost metrics 870A-N and/or incremental ramping cost metrics 872A-N for each PGU 120A-N. In some embodiments, the valuation manager 850 may be embodied within the control infrastructure of a particular PGU 120A-N. The valuation manager 850 may be configured to coordinate with one or more PGU 120A-N and/or power systems 100 to determine valuation for power generation during particular times and/or particular power system configurations 160 (e.g., based on the determined, continuous-time marginal valuation metric). The valuation manager 850 may be further configured to use the determined continuous-time valuation metrics and/or incremental generation and/or ramping cost metrics of the PGUs 120A-N to schedule power generation resources for the power system 100, coordinate with the PGUs 120A-N selected to provide power to the power system 100 during particular time periods (e.g., in accordance with a particular PGU configuration 162), compensate for real-time load variations, and/or the like.

In some embodiments, determining a continuous-time marginal valuation metric comprises assigning an economic value to power generated for the power system 100 (and/or power scheduled to be generated for the power system during a particular operating interval T). The economic value assigned to power generated by the PGUs 120A-N should reflect the actual marginal cost incurred by the PGUs 120A-N. The economic value assigned to power generated by a PGU 120A-N may be used to, inter alia, schedule power system resources for the power system 100, account for the resources and/or costs of power generation by the PGU 120A-N (e.g., assign a price to the power generated by the PGU 120A-N), and so on.

As disclosed above, conventional approaches to power system scheduling and valuation are based on discrete time models (e.g., discrete time UC formulations), which may not be capable of adequately modeling sub-interval characteristics of the power system 100 and, in particular, may not adequately model load and/or generation ramping constraints. As disclosed above, inadequate modeling of ramping constraints may render the power system 100 susceptible to scarcity events, and may lead to inaccuracies in power valuation. Conventional approaches model ramping using discrete-time modeling techniques (e.g., as a finite difference between discrete-time power samples). As illustrated herein, discrete-time approaches cannot adequately model the impact of load ramping, or PGU ramping constraints, resulting in sub-optimal PGU scheduling and valuation. A continuous-time UC model 660 may improve the performance of the power system 100 by, inter alia, a) modeling sub-interval variations in net load on the power system, and b) scheduling PGUs 120 to satisfy the net load in accordance with continuous-time generation and ramping characteristics thereof. As disclosed in further detail herein, the disclosed continuous-time modeling techniques may be used to determine a marginal valuation metric 880 for power generated by the PGUs 120A-N during a particular operating period T (and/or real-time operation). The marginal valuation metric 880 may be configured to model costs associated with ramping (e.g., ramping due to PGU scheduling and/or load variations), rather than quantifying valuation based on generation trajectory alone. As such, the marginal valuation metric 880 disclosed herein may compensate PGUs 120A-N for costs associated with a continuous-time ramping trajectory, which may better reflect real-world costs incurred by the PGUs 120A-N (and reduce or eliminate the need for uplift). Furthermore, the marginal valuation metric 880 disclosed herein may merit PGUs 120A-N based on their ramping capabilities, which may enable the power system 100 to select (and incentivize) PGUs 120A-N to develop ramping capabilities needed to compensate for net-load variations (and reduce the likelihood of scarcity events). In addition, incremental generation and ramping cost metrics 870A-N and 872A-N for the PGUs 120A-N may be determined, which may be used in selecting PGUs 120A-N to satisfy load variations during real-time operations. Furthermore, quantifying the generation and ramping cost metrics of the PGUs 120A-N may enable the power system 100 to optimally select PGUs 120A-N with similar generation cost characteristics based on differences in the ramping costs thereof.

In FIG. 8, the management infrastructure 140 may comprise a scheduler 846, which may be configured to determine an optimal power system configuration 160 for the power system 100, as disclosed herein. The scheduler 846 may be configured to: determine a continuous-time load profile for the power system 100 (CITI net load profile 655), generate a continuous-time UC model 660 for the power system 100 (based on characteristics of the power system infrastructure 110, PGUs 120A-N, and so on), and determine an optimal solution to the UC model 660 (e.g., determine optimal generation and ramping trajectories for the PGUs 120A-N to satisfy the ITCT net load forecast 655 for the power system 100 at minimum cost and subject to generation and/or ramping constraints of the PGU 120A-N), as disclosed herein. The UC model 660 may be a computationally intractable variational problem. As such, the scheduler 846 may determine an optimal solution to the UC model 660 by recasting the UC model 660 as an MILP problem with a finite-dimensional decision space (e.g., utilizing Bernstein polynomials to model the continuous-time generation and/or ramping trajectories of the PGU 120A-N, as disclosed herein). The solution to the MILP problem may comprise a power system configuration 160, which may define an optimal set of continuous-time generation trajectories G*(t), continuous-time ramping trajectories G*(t), and binary commitment values I*(t) for each PGU 120A-N to satisfy the net load forecast for the power system at minimum cost.

The continuous-time ramping trajectory of a PGU 120A-N may comprise a time derivative of the corresponding generation trajectory 822A-N for PGU $G_k$, as follows:

$$\dot{G}_k(t) \triangleq \lim_{\Delta t \to 0} \frac{G_k(t_{n+1}) - G_k(t_n)}{\Delta t} = \frac{dG_k(t)}{dt}. \quad \text{Eq. 55}$$

The valuation manager 850 may use the optimal generation and ramping trajectories determined by the scheduler 846 to determine the marginal valuation metric 880 for the power generated by the PGUs 120A-N. The determined marginal valuation metric 880 may quantify costs incurred by the PGU 120A-N due to both generation trajectory and ramping trajectory (rather than generation alone as in conventional, discrete-time approaches to valuation). In some embodiments, the valuation manager 850 defines a cost function $C_k(G_k(t), \dot{G}_k(t))$ for the PGUs 120A-N that is based on both generation trajectory $G_k(t)$ and ramping trajectory $\dot{G}k(t)$. A PGU 120A-N may, therefore, more accurately reflect the costs associated with a particular PGU schedule. Costs associated with generation and/or ramping of particular PGUs 120A-N may be specified in PGU metadata 156, which may be incorporated into the optimal solution to the UC model 660, as disclosed above. By way of non-limiting example, a particular PGU 120A may incur different ramping costs than other PGUs 120B-N (the ramping costs of each PGU 120A-N may be maintained in respective PGU metadata 156A-N). The different ramping costs may be due to physical characteristics of the PGU 120A, wear characteristics, and/or the like. The valuation manager 850 may adapt the cost function to reflect the particular ramping costs of each PGU 120A-N, including the PGU 120A. The ramping costs may be reflected in the marginal valuation metric 880 as well as the incremental generation and/or ramping cost metrics 870A-N and 872A-N.

The continuous-time UC model 660 disclosed herein may quantify costs associated with the continuous-time generation trajectory $G_k(t)$ and continuous-time ramping trajectory $\dot{G}k(t)$ of each PGUs 120A-N ($G_k$). As disclosed above, the UC model 660 may be formulated as follows:

$$\min_{G(t), I(t)} \int_\tau \left( C(G(t), \dot{G}(t)) + C^I(I(t)) \right) dt, \quad \text{Eq. 56}$$

$$\text{s.t. } f(G(t), I(t)) = 0, (\lambda(t)), t \in \tau, \quad \text{Eq. 57}$$

$$h(G(t), \dot{G}(t), I(t)) \leq 0, (\gamma(t)), t \in \tau, \quad \text{Eq. 58}$$

In Eq. 56, the cost function $C(G(t), \dot{G}(t))$ comprises a sum of the cost function of each PGU 120A-N (e.g., a sum of $C_k(G_k(t), \dot{G}_k(t))$, where k is a PGU 120A-N). The $\lambda(t)$ and $\gamma(t)$ functions comprise continuous-time Lagrange multiplier trajectories associated with the continuous-time equality and inequality constraints of Eqs. 57 and 58, respectively. The UC model 660 formulated in accordance with Eqs. 56-58 may provide for flexibly scheduling PGU 120A-N to balance a continuous-time net-load over an operating period T. However, an optimal solution to the continuous-time UC formulation of Eqs. 56-58 may be difficult to compute (the UC model 660 of Eqs. 56-58 is an infinite dimensional computationally intractable variational problem). In some embodiments, and as disclosed herein, the scheduler 846 may determine an optimal solution to the UC model 660 of Eqs. 56-58 by, inter alia, recasting the system as a MILP problem with a finite-dimensional space (e.g., by use of the spline function space of Bernstein polynomials). In this approach, the coefficients of projecting the continuous-time trajectories in the function space of Bernstein polynomials represent the decision variables of the resulting MILP system. A solution to the optimization problem may, therefore, be calculated to produce, inter alia, a PGU configuration 162 comprising an optimal scheduling for the PGUs 120A-N during the operating period T (e.g., optimal generation, ramping, and commitment, G*(t), $\dot{G}$*(t), I*(t)).

The valuation manager 850 may leverage the solution to the UC model 660 produced by the scheduler 846 to formulate the continuous-time marginal valuation metric 880. In some embodiments, the valuation manager 850 comprises a valuation processor 862, which may be configured to, inter alia, formulate a valuation model 860 corresponding to the power system configuration 160. The valuation processor 862 may formulate the valuation model 860 by fixing the binary variables of the continuous-time UC model 660 to their optimal values (I*(t)), and defining a corresponding optimization problem, as follows:

$$\min_{G(t)} J(G(t)) = \int_\tau C(G(t), \dot{G}(t)) dt, \quad \text{Eq. 59}$$

$$\text{s.t. } 1^T G(t) = D(t), (\lambda(t)), t \in \tau, \quad \text{Eq. 60}$$

$$\underline{G}(t) \leq G(t) \leq \overline{G}(t), (\underline{\upsilon}(t), \overline{\upsilon}(t)), t \in \tau, \quad \text{Eq. 61}$$

$$\underline{\dot{G}}(t) \leq \dot{G}(t) \leq \overline{\dot{G}}(t), (\underline{\mu}(t), \overline{\mu}(t)), t \in \tau, \quad \text{Eq. 62}$$

$$G(0) = G^0. \quad \text{Eq. 63}$$

In Eqs. 59-63, $\underline{G}(t) = (\underline{G}_1(t) I^*_1, \ldots, \underline{G}_K(t) I^*_1(t))^T$ and $\overline{G}(t) = (\overline{G}_1(t) I^*_1, \ldots, \overline{G}_K(t) I^*_1(t))^T$ may comprise continuous-time lower and upper capacity bounds of the PGU 120A-N, with $\underline{G}_k$ and $\overline{G}_k$ representing minimum and maximum capacities of a particular PGU 120A-N ($G_k$). The continuous-time lower and upper ramping bounds may be $\underline{\dot{G}}(t) = (\underline{\dot{G}}_1(t) I^*_1, \ldots, \underline{\dot{G}}_K(t) I^*_1(t))^T$ and $\overline{\dot{G}}(t) = (\overline{\dot{G}}_1(t) I^*_1, \ldots, \overline{\dot{G}}_K(t) I^*_1(t))^T$ of the PGUs 120A-N, with $\underline{\dot{G}}_k$ and $\overline{\dot{G}}_k$ being the lower and upper ramping bounds of a particular PGU 120A-N ($G_k$). Note, since the integer values are fixed in the formulation above, the cost term $C^I(I^*(t))$ of Eq. 56 becomes a constant, and the minimum on/off constraints are rendered redundant and, as such, are not included in the objective function of Eq. 59.

The optimization problem defined in Eqs. 59-63 is a constrained variational problem, where Eq. 59 represents the objective function to be minimized over T. The continuous-time power balance constraint is formulated in Eq. 60, and Eqs. 61 and 62 confine the generation and ramping trajectories between their minimum and maximum limits over the scheduling horizon for the power system 100. The vector of the generation trajectories at time zero (G(0)) may be set to the vector of initial values ($G^0$) in Eq. 63. The valuation processor 862 may configure the constraints of Eqs. 60-63 such that the constraints are enforced in every instant of time over the scheduling horizon T. The constraints of Eqs. 60-63 may, therefore, be referred to as variational constraints. Accordingly, the corresponding Lagrange multipliers $\lambda(t)$, $\underline{\upsilon}(t)$, $\overline{\upsilon}(t)$, $\underline{\mu}(t)$, and $\overline{\mu}(t)$ of Eqs. 60-62 also comprise continuous-time trajectories defined over the scheduling horizon T.

The valuation processor 862 may be further configured to derive a set of optimality conditions 865 for the valuation model 860 of Eqs. 59-63. The optimality conditions 865 may be predicated on characteristics of the power system 100 and/or PGU 120A-N, such as: (1) generation trajectories G(t) of the PGU 120A-N are continuously differentiable functions of t (are $C^1$); (2) the cost functions of the PGUs 120A-N are independent of each other; (3) the cost functions of the PGU 120A-N are $C^1$ and are monotonically increasing convex functions of their arguments; and (4) the cost functions of the PGU 120A-N are not explicit functions of t. The implication of characteristic (1) is that the inertia of physical components of the respective PGUs 120A-N preclude abrupt, discontinuous changes in the generation trajectory thereof (ensuring that the power generation trajectory G(t) is continuous over time). Moreover, the approach to arrive at the optimal solution for G*(t) ensures that these functions are $C^1$ within upper and lower bounds over the operating period T, including startup and shutdown.

The Lagrangian associated with the variational problem of determining an optimal solution to the valuation model 860 (as defined by Eqs. 59-63) may be formed as follows:

$$\mathcal{L}\big(G(t), \dot{G}(t), \lambda(t), \underline{v}(t), \overline{v}(t), \underline{\mu}(t), \overline{\mu}(t)\big) = \quad \text{Eq. 64}$$

$$C\big(G(t), \dot{G}(t)\big) + \lambda(t)(D(t) - 1^T G(t)) + \underline{v}^T(t)(\underline{G}(t) - G(t)) +$$

$$\overline{v}^T(t)(G(t) - \overline{G}(t)) + \underline{\mu}^T(t)\big(\underline{\dot{G}}(t) - \dot{G}(t)\big) + \overline{\mu}^T(t)\big(\dot{G}(t) - \overline{\dot{G}}(t)\big).$$

As disclosed above, the valuation processor 862 may be configured to determine optimality conditions 865 for the valuation model 860. The optimality conditions 865 may comprise Euler-Lagrange conditions 865A. In accordance with the Euler-Lagrange conditions 865A, an optimal solution for the generation trajectories G*(t) (generation trajectories 822A-N) may be required to solve the Euler-Lagrange equation below:

$$\frac{\partial \mathcal{L}}{\partial x(t)} - \frac{d}{dt}\frac{\partial \mathcal{L}}{\partial \dot{x}(t)} = 0. \quad \text{Eq. 65}$$

Solving Eq. 65 may comprise calculating $$\frac{\partial \mathcal{L}}{\partial G(t)} \text{ and } \frac{d}{dt}\frac{\partial \mathcal{L}}{\partial \dot{G}(t)}$$

for Eq. 64 as follows:

$$\frac{\partial \mathcal{L}}{\partial G(t)} = \frac{\partial C\big(G(t), \dot{G}(t)\big)}{\partial G(t)} - \lambda(t)1 - \underline{v}(t) + \overline{v}(t), \quad \text{Eq. 66}$$

$$\frac{d}{dt}\frac{\partial \mathcal{L}}{\partial \dot{G}(t)} = \frac{d}{dt}\left(\frac{\partial C\big(G(t), \dot{G}(t)\big)}{\partial G(t)}\right) - \underline{\mu}(t) + \overline{\mu}(t). \quad \text{Eq. 67}$$

Using Eqs. 66 and 67, the Euler-Lagrange equations may be derived as:

$$\frac{\partial C\big(G(t), \dot{G}(t)\big)}{\partial G(t)} - \frac{d}{dt}\left(\frac{\partial C\big(G(t), \dot{G}(t)\big)}{\partial G(t)}\right) - \quad \text{Eq. 68}$$

$$\lambda(t)1 - \underline{v}(t) + \overline{v}(t) + \underline{\mu}(t) - \overline{\mu}(t) = 0.$$

Eq. 68 of the Euler-Lagrange condition 865A may represent the first-order necessary condition for local optimum of variational problems (e.g., the variational problem of optimizing the valuation model 860 of Eqs. 59-63). The Eq. 68 of the Euler-Lagrange condition 865A may represent a set of K differential equations that are to be solved over the scheduling horizon T in order to calculate optimal generation trajectories G*(t) 822A-N(and the Lagrange multiplier trajectories). A solution for the K Euler-Lagrange Eq. 68 would require 2K boundary values. The first K boundary values may be provided by the initial values for the generation trajectories G(t) in Eq. 63, and the second K boundary values may be set according to the transversality conditions 865B included in the optimality conditions 865 defined by the PGM manager 870.

Generation trajectories G(t) for the PGUs 120A-N of the power system 100 may be free-ended, meaning that there may not be any specific boundary value condition that must be met at the end of the scheduling horizon T. As such, the valuation processor 862 defines transversality conditions 865B, which may comprise requiring the optimal generation trajectories G*(t) to satisfy Eq. 69 below:

$$\left.\frac{\partial \mathcal{L}}{\partial \dot{G}(t)}\right|_{t=T} = 0. \quad \text{Eq. 69}$$

The valuation processor 862 may further specify complimentary slackness conditions 865C for the optimality conditions 865. The inequality constraints of Eqs. 61 and 62 may be configured to satisfy the complimentary slackness conditions 865C, as defined below:

$$\underline{v}_k(t)(\underline{G}_k(t) - G_k(t)) = 0, \underline{v}_k(t) \geq 0, \forall k, \forall t \in \tau, \quad \text{Eq. 70.}$$

$$\overline{v}_k(t)(G_k(t) - \overline{G}_k(t)) = 0, \overline{v}_k(t) \geq 0, \forall k, \forall t \in \tau, \quad \text{Eq. 71.}$$

$$\underline{\mu}_k(t)(\underline{\dot{G}}_k(t) - \dot{G}_k(t)) = 0, \underline{\mu}_k(t) \geq 0, \forall k, \forall t \in \tau, \quad \text{Eq. 72.}$$

$$\overline{\mu}_k(t)(\dot{G}_k(t) - \overline{\dot{G}}_k(t)) = 0, \overline{\mu}_k(t) \geq 0, \forall k, \forall t \in \tau, \quad \text{Eq. 73.}$$

The valuation engine 862 may enforce the complimentary slackness conditions 865C to ensure that the Lagrange multiplier associated with an inequality constraint is either zero (when the constraint is not binding) or is a non-negative number (when the constraint is binding).

The valuation processor 862 may further define original problem constraints 865D for optimization of the valuation model 860. The original problem constraints 865D may require that the optimal trajectories G*(t) and Ġ*(t) (and corresponding binary commitment values I*(t)) satisfy each of the constraints 865A-C. Furthermore, the original problem constraints 865D may provide the sufficient condition that the optimal generation and ramping trajectories comprise a globally optimal solution to Eqs. 59-63.

Based on the foregoing, the valuation processor 862 may be configured to determine the marginal valuation metric 880 for power generated during the operating period T as the rate at which the objective functional is changed due to an incremental change in load at time t (e.g., the optimal Lagrange multiplier trajectory λ(t) of the power balance constraint of Eq. 60).

By way of non-limiting example, assume that G*(t) and J(G*(t)) are the optimal generation trajectories and optimal objective functional values of Eqs. 59-63. The corresponding optimal Lagrange multiplier trajectory λ(t) associated with the variational power balance constraint of Eq. 60 may quantify the rate at which the objective functional J is changed due to an incremental change in load at time t. The optimal Lagrange multiplier trajectory λ(t) may quantify a cost associated with supplying incremental load variations at a time t during the operating interval T of the power system 100. The optimal Lagrange multiplier trajectory λ(t) may, therefore, quantify the marginal value of power generation and, as such, may comprise the marginal valuation metric 880 for the power system 100.

The optimal Lagrange multiplier trajectory λ(t) may be established as a continuous-time marginal valuation metric 880 as set forth below. Let D(t) be incremented by a infinitesimally small and localized $C^1$ trajectory, SD(t), which takes positive values in (τ, τ+δt) and vanishes to zero at t=τ and t=τ+δt, where τ is within the operating interval T. This incremental variation is sufficiently small that an optimal solution still exists and involves the same binding inequality constraints, i.e., the incremental load variation δD(t) results in an incremental change to the optimal trajectories G*(t) and Ġ*(t), the operation costs C(G(t), Ġ(t)), and the total objective functional J. Thus, the optimal value of the objective functional may be expressed as a continuously differentiable function of load trajectory, J*(D(t)). The rate of change to J*=J*(D(t)) due to the load variation δD(t) may be calculated as follows:

$$\Delta J^* = J^*(D(t) + \delta D(t)) - J^*(D(t)) \quad \text{Eq. 74}$$
$$= \frac{\partial J^*(D(t))}{\partial D(t)} \delta D(t) + O(\|\delta D(t)\|)$$

Wherein $\|\delta D(t)\|$ is the $L_\infty$ norm of δD(t), and $O(\|\delta D(t)\|)$ denotes its higher order functions that tend to zero faster than $\|\delta D(t)\|$. This term may be substituted with $$J^*(D(t)) = \int_\tau \mathcal{L} dt,$$

in Eq. 75 below (where the Lagrangian is defined in Eq. 64):

$$\Delta J^* = \quad \text{Eq. 75}$$
$$\int_\tau \left( \frac{\partial C(G(t), \dot{G}(t))}{\partial G(t)} + \lambda(t) - \lambda(t) 1^T \frac{\partial G(t)}{\partial D(t)} + (\overline{v}(t) - \underline{v}(t))^T \frac{\partial G(t)}{\partial D(t)} + \right.$$
$$\left. (\overline{\mu}(t) - \underline{\mu}(t))^T \frac{\partial \dot{G}(t)}{\partial D(t)} \right) \delta D(t) dt.$$

Applying the total derivative to the first term of Eq. 75, and rearranging the terms results in:

$$\Delta J^* = \int_\tau \left( \left[ \frac{\partial C(G(t), \dot{G}(t))}{\partial G(t)} - \lambda(t) + \overline{v}(t) - \underline{v}(t) \right]^T \frac{\partial G(t)}{\partial D(t)} + \right. \quad \text{Eq. 76}$$
$$\left. \left[ \frac{\partial C(G(t), \dot{G}(t))}{\partial G(t)} + \overline{\mu}(t) - \underline{\mu}(t) \right]^T \frac{\partial \dot{G}(t)}{\partial D(t)} + \lambda(t) \right) \delta D(t) dt.$$

The incremental load trajectory δD(t), which takes positive values in (τ, τ+δt) and equals zero in [0, τ] ∪ [i, δt,]. Thus, δD(t) uniformly tends to $\|\delta D(t)\|$ in (τ, τ+δt) when $\|\delta D(t)\|$ is sufficiently small. Using the integration by parts, changing the limits of the integral, and removing $\|\delta D(t)\|$ therefrom, results in:

$$\Delta J^* = \|\delta D(t)\| \int_\tau^{\tau+\delta t} \left( \lambda(t) + \right. \quad \text{Eq. 77}$$
$$\left[ \frac{\partial C(G(t), \dot{G}(t))}{\partial G(t)} - \lambda(t) 1 + \overline{v}(t) - \right.$$
$$\left. \overline{v}(t) - \frac{d}{dt}\left( \frac{\partial C(G(t), \dot{G}(t))}{\partial G(t)} + \right) \right]^T \left[ \frac{\partial G(t)}{\partial D(t)} \right] dt +$$
$$\left. \overline{\mu}(t) - \underline{\mu}(t) \right]$$

$$\left. \left( \frac{\partial C(G(t), \dot{G}(t))}{\partial G(t)} + \right)^T \frac{\partial G(t)}{\partial D(t)} \right|_{t=\tau}^{t=\tau+\delta t} \|\delta D(t)\|.$$
$$\overline{\mu}(t) - \underline{\mu}(t)$$

The second term in the right hand side integral in Eq. 77 repeats the Euler-Lagrange Eq. 67 and thus is zero. The last term also goes to zero when $\|\delta D(t)\|$ tends to zero. Thus, Eq. 77 becomes:

$$\Delta J^* = \|\delta D(t)\| \int_\tau^{\tau+\delta t} \lambda(t) dt = \lambda(\tau) \|\delta D(t)\| \delta t. \quad \text{Eq. 78}$$

Dividing Eq. 78 by the product of $\|\delta D(t)\|$ and δt and taking the limits thereof establishes equivalence with λ(τ), $$\lim_{\substack{\delta t \to 0 \\ \|\delta D(t)\| \to 0}} \frac{\Delta J^*}{\|\delta D(t)\| \delta t} = \lim_{\delta t \to 0} \frac{\delta J^*}{\delta t} = \lambda(\tau),$$

where δJ* is the first variation to the optimal objective function with respect to the incremental variation in load, and $$\delta J^* = \lim_{\|\delta D(t)\| \to 0} \frac{\Delta J^*}{\|\delta D(t)\|}.$$

Based on the foregoing, it is established that the valuation metric 880 (λ(t)) represents a cost metric for supplying the incremental load variation to the power system 100 at time t.

The marginal valuation metric 880 may be calculated based on characteristics of the PGUs 120A-N and/or the optimal generation, ramping, and commitment trajectories of the PGUs 120A-N (as incorporated into the valuation model 860 in Eqs. 59-63), and, in particular, to which PGUs 120A-N are Unconstrained, Ramp-constrained, and/or Capacity constrained at various times during the operating period T, as set forth in further detail below.

Figure 9:
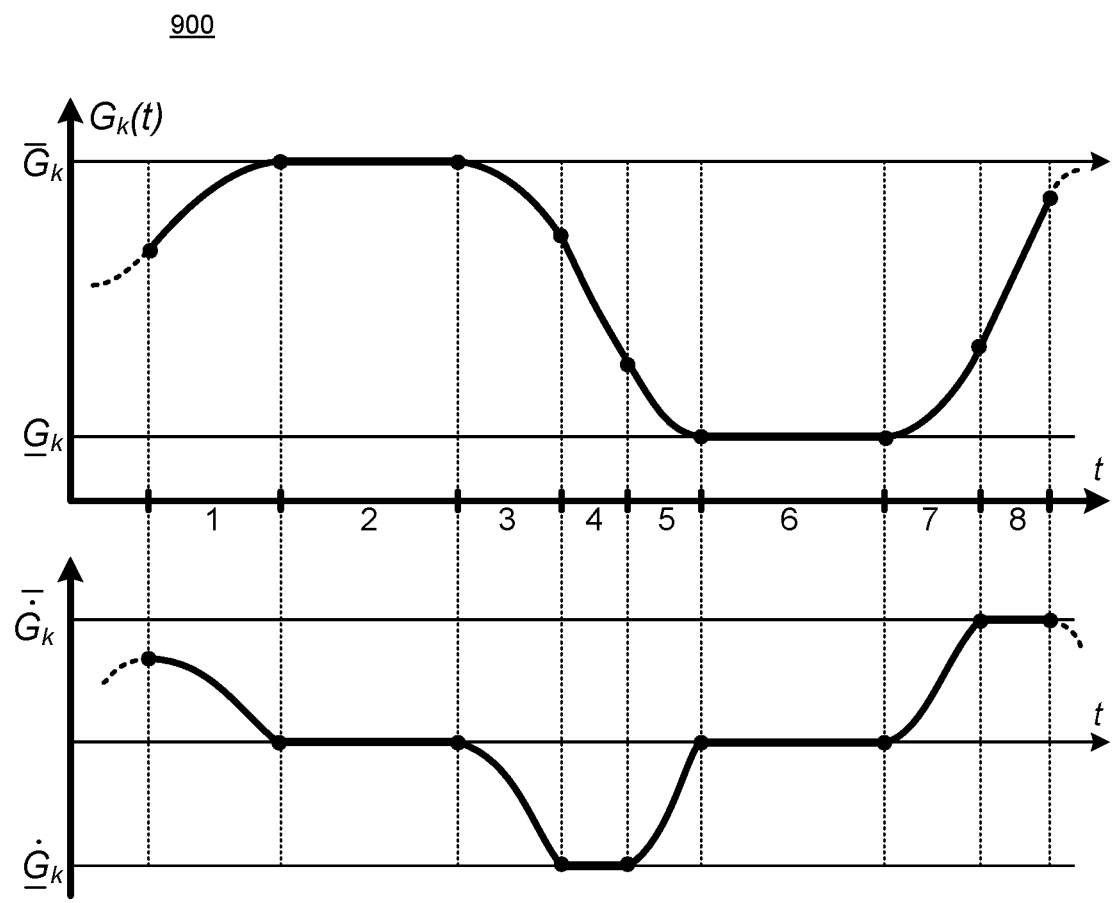
FIG. 9 depicts exemplary plots of a generation and ramping trajectory of a power generating unit.

FIG. 9 is a plot 900 that depicts an exemplary PGU generation trajectory 901 and exemplary PGU ramping trajectory 902. At each time t, the PGUs 120A-N may be classified as one of: (a) Unconstrained, (b) Ramp-constrained, and (c) Capacity constrained. A PGU 120A-N may be classified as Unconstrained at time t if the PGU 120A-N is capable of changing its generation and/or ramping trajectory at time t (e.g., the PGU 120A-N is not operating at its generation and/or ramping capacity). FIG. 9 depicts unconstrained operation of a PGU 120A-N during time periods 1, 3, 5, and 7 (during which the PGU 120A-N is capable of modifying both its generation and ramping trajectory). According to the complimentary slackness conditions 883C (as defined in Eqs. 70-73), the multipliers $\underline{\upsilon}(t)$, $\overline{\upsilon}(t)$, $\underline{\mu}(t)$, and $\overline{\mu}(t)$ are zero for PGU 120A-N that are Unconstrained. The PGUs 120A-N that are classified as being Unconstrained may be included in a time-varying set $K_t^u \equiv K^u(t)$.

A PGU 120A-N may be classified as Ramp-constrained at time t if the PGU 120A-N is subject to binding ramping constraints (either up or down) at time t. A binding ramping constraint refers to a condition in which the PGU 120A-N is capable of changing its generation trajectory at a constant limited down/up ramp rate, but cannot modify its ramping trajectory. FIG. 9 depicts operation of a PGU 120A-N under binding ramping constraints during time periods 4 and 8. According to the complimentary slackness conditions 883C (as defined in Eqs. 70-73), one of more of the multipliers $\underline{\mu}(t)$ and $\overline{\mu}(t)$ are non-negative numbers for PGU 120A-N that are Ramp-constrained. The PGUs 120A-N of the power system 100 that are classified as being Ramp-constrained may be included in a time-varying set $K_t^r \equiv K^r(t)$.

A PGU 120A-N may be classified as Capacity-constrained at time t if the PGU 120A-N is operating under binding maximum/minimum capacity constraints at time t. Binding maximum/minimum capacity constraints may prevent the PGU 120A-N from increasing/decreasing the power being generated thereby. FIG. 9 depicts operation of a PGU 120A-N under binding capacity constraints during time periods 2 and 6. According to the complimentary slackness conditions 883C (as defined in Eqs. 70-73), one or more of the multipliers $\underline{\upsilon}(t)$ and $\overline{\upsilon}(t)$ are non-negative numbers for PGU 120A-N that are Capacity-constrained. The PGUs 120A-N of the power system 100 that are classified as being Capacity-constrained may be included in a time-varying set $K_t^c \equiv K^c(t)$.

As illustrated in FIG. 8, the valuation processor 862 may be configured to determine time-varying sets of PGU 120A-N 866, including sets $K^u(t)$, $K^r(t)$, and $K^c(t)$, each set specifying classifications for the PGUs 120A-N during the operating interval T (each PGU 120A-N being classified as either Unconstrained, Ramp-constrained, or Capacity-constrained). The classifications of the PGUs 120A-N may be based on the optimal generation trajectories G*(t), optimal ramping trajectories Ġ*(t), and projected net load D(t) of the valuation model 860 (and as determined by the optimal solution to the UC model 660). Based on the foregoing PGU classifications 862, the valuation processor 862 may be configured to derive the value of $\lambda(t)$ (the marginal valuation metric 880) by use of Eq. 75, as set forth below. The classifications 866 may indicate the operating state of the PGUs 120A-N throughout the operating interval T. Accordingly, in some embodiments, the classifications 866 may be referred to as "states" of the PGUs 120A-N, "operating states" of the PGUs 120A-N, and/or the like.

As disclosed above, an incremental load variation δD(t) at time t during the operating interval T may be satisfied by use of a) Unconstrained PGU 120A-N and/or b) Ramp-constrained PGU 120A-N available within the power system 100. PGUs 120A-N that are Ramp-constrained may be restricted to increasing generation at a limited, constant rate. PGUs 120A-N that are Capacity-constrained cannot compensate for the incremental load variation. As such, in Eq. 75, $$\frac{\partial G(t)}{\partial D(t)}$$

is zero for the Capacity-constrained PGU 120A-N (e.g., each PGU 120A-N in set $K^c(t)$ 866). Furthermore, the Lagrange multipliers $\underline{\upsilon}(t)$ and $\overline{\upsilon}(t)$ are zero for the Unconstrained and Ramp-constrained PGU 120A-N. Therefore, the term $$(\overline{\upsilon}(t) - \underline{\upsilon}(t))^T \frac{\partial G(t)}{\partial D(t)}$$

of Eq. 75 is uniformly zero over the operation period T. By similar reasoning, the term $$(\overline{\mu}(t) - \underline{\mu}(t))^T \frac{\partial \dot{G}(t)}{\partial D(t)}$$

in Eq. 75 would also be zero throughout this period. The power balance constraint of Eq. 60 requires that $$1^T \frac{\partial G(t)}{\partial D(t)}$$

be equal to 1 in Eq. 75. Applying these substitutions to Eq. 75 (and applying the limits as disclosed above in conjunction with Eq. 78), the resulting closed-form value of $\lambda(t)$ is:

$$\lambda(t) = \left(\frac{\partial C(G(t), \dot{G}(t))}{\partial G(t)}\right)^T \frac{\partial G(t)}{\partial D(t)} + \left(\frac{\partial C(G(t), \dot{G}(t))}{\partial \dot{G}(t)}\right)^T \frac{\partial \dot{G}(t)}{\partial D(t)}. \quad \text{Eq. 79}$$

The quantity $IC_k^G(t)$ may be defined as the incremental generation cost rate of a particular PGU 120A-N ($G_k$), and the quantity IC (t) may be defined as the incremental generation cost rate of the PGU 120A-N ($G_k$), as follows:

$$IC_k^G(t) \frac{\partial C_k(G_k(t), \dot{G}_k(t))}{\partial G_k(t)}, \quad \text{Eq. 80}$$

$$IC_k^{\dot{G}}(t) \frac{\partial C_k(G_k(t), \dot{G}_k(t))}{\partial \dot{G}_k(t)}, \quad \text{Eq. 81}$$

Eq. 79 may be simplified to eliminate zero terms, and to arrange the remaining terms in summations as follows:

$$\lambda(t) = \sum_{k \in K_t^u \cup K_t^r} IC_k^G(t) \frac{\partial G_k(t)}{\partial D(t)} + \sum_{k \in K_t^u} IC_k^{\dot{G}}(t) \frac{\partial \dot{G}_k(t)}{\partial D(t)}, \quad \text{Eq. 82}$$

$$t \in \tau$$

In Eq. 82, the terms $$\frac{\partial G_k(t)}{\partial D(t)} \text{ and } \frac{\partial \dot{G}_k(t)}{\partial D(t)}$$

are the generation and ramping variations of PGU 120A-N ($G_k$) contributing towards balancing the incremental load variation at time t.

The valuation processor 862 may be further configured to calculate incremental generation cost metrics 870A-N and incremental ramping cost metrics 872A-N for each PGU 120A-N in accordance with Eqs. 80 and 81. Similar to the conventional definitions for incremental generation cost rate, the incremental ramping cost metrics 872A-N may quantify a cost of an incremental change in ramping of a PGU 120A-N ($G_k$) at time t. The valuation processor may be further configured to calculate the marginal valuation metric 880 for power generated within the power system 100 in accordance with Eq. 82. The marginal valuation metric 880 may correspond to a weighted average of the incremental generation cost metrics 870A-N of the Unconstrained and Ramp-constrained PGU 120A-N of the power system 100 plus the weighted average of the incremental ramping cost rates of the unconstrained PGU 120A-N The valuation processor 862 may be further configured to calculate incremental generation cost metrics 870A-N and incremental ramping cost metrics 872A-N for each PGU 120A-N in accordance with Eq. 80 and 81. Similar to the conventional definitions for incremental generation cost rate, the incremental ramping cost metrics 872A-N may quantify a cost of an incremental change in ramping of a PGU 120A-N ($G_k$) at time t. The valuation processor may be further configured to calculate the marginal valuation metric 880 for power generated within the power system 100 in accordance with Eq. 82. The marginal valuation metric 880 may correspond to a weighted average of the incremental generation cost metrics 870A-N of the Unconstrained and Ramp-constrained PGU 120A-N of the power system 100 plus the weighted average of the incremental ramping cost metrics 872A-N of the unconstrained PGU 120A-N.

The control infrastructure may further include a coordination engine 890. The coordination engine 890 may be configured to act as an interface between a power system 100 and one or more PGUs 120A-N(and vice versa). The coordination engine 890 may provide the marginal valuation metric 880 to one or more power systems 100 and/or PGUs 120A-N. The coordination engine 890 may utilize the marginal valuation metric 880 to establish an economic price for power generated during a particular operating interval T in accordance with a day-ahead operating profile, such as the power system configuration 160, disclosed above. Alternatively, or in addition, the coordination engine 890 may use to valuation metric 890 to establish an economic price for power provisioned during real-time operation of the power system 100 (e.g. power provisioned to respond to variations in the ITCT net load forecast 655). The coordination engine 890 may use the marginal valuation metric 880 as a basis for compensating PGU 120A-N for power generated thereby. The coordination engine 890 may determine an economic compensation 892A-N for each PGU 120A-N scheduled during the operating interval T. The determined economic compensation 892A-N for each PGU 120A-N may correspond to the utilization of the PGU 120A-N during the operating interval T (based on the generation trajectory $G^*_k(t)$, ramping trajectory $\dot{G}^*_k(t)$ and/or binary commitment value $I^*_k(t)$ of the 120A-N ($G_k$) during the operating interval T). The determined economic compensation 892A-N for a PGU 120A-N may, in one embodiment, comprise integrating the determined marginal valuation metric 880 for power provisioned during the operating interval T as scaled by the utilization of the PGU 120A-N. The marginal valuation metric 880 may provide a continuous-time valuation for power as a function of time t, as such, the determined economic compensation 892A-N may be dependent on the particular times t the particular PGU 120A-N is utilized during the operating interval T.

The marginal valuation metric 880 disclosed herein may enable PGUs 120A-N to be appropriately compensated for ramping costs, and may quantify a value to the ramping capacity provided by the PGUs 120A-N. The contribution of ramping costs and/or ramping capacity in the marginal valuation metric 880 may be established in a transparent and mathematically provable manner, which may enable the PGUs 120A-N to rely on the marginal valuation metric 880 as valuation of ramping costs and/or capacity. As disclosed above, the cost function Ck upon which the marginal valuation metric 880 is based explicitly quantifies costs incurred by respective PGUs 120A-N due to ramping trajectory G (as opposed to only generation trajectory G as in conventional systems). As disclosed above, the marginal valuation metric 880 is predicated on PGU cost functions that are defined in terms of both generation trajectory (and cost) and ramping trajectory (and cost) (e.g., cost function $C_k(G_k, \dot{G}_k)$, which, as disclosed above, may enable each PGU 120A-N ($G_k$) to specify incremental costs incurred due to ramping, and which may be particular to the PGU 120A-N, and differ from ramping costs of other PGU 120A-N). In addition, the marginal valuation metric 880 provides an explicit valuation to PGUs 120A-N having available ramping capacity during the operating period T. By way of non-limiting example, the valuation processor 862 is configured categorize the PGUs 120A-N as Unconstrained, Ramp-constrained, or Capacity-constrained during the operating period T and to use the categorizations (866) to develop the marginal valuation metric 880. Based on the foregoing, it can be shown that the Largrange multiplier trajectory λ(t) from which the marginal valuation metric 880 is derived explicitly embeds the impact of ramping costs (and quantifies the value of ramping capacity) in the resulting marginal valuation metric 880. The marginal valuation metric 880 may, therefore, comprise a mathematically proven approach quantifying a valuation for ramping costs and/or capacity of the PGUs 120A-N. Therefore, the marginal valuation metric 880 may provide an incentive for PGUs 120A-N to develop ramping capability (since the PGUs 120A-N will be provisioned a valuation for such ramping capacity, as opposed to ad-hoc valuations that involve uplift compensation, which may not be equitably provisioned to the PGUs 120A-N).

The additional ramping capacity incentivized by quantifying the valuation of ramping cost and/or capacity in a provable, transparent manner may enable the power system 100 to be better equipped to respond to net load variations and avoid scarcity events (e.g., ramping scarcity events). Providing an explicit valuation of ramping costs (as opposed to relying on ad-hock uplift) may provide an incentive for PGUs 120A-N to develop ramping capacity, based on the assurance that the ramping capacity provided thereby will be valued accordingly (as opposed to being ignored as in conventional approaches to power valuation). As disclosed above, the contribution of ramping costs in the marginal valuation metric 880 may be demonstrated mathematically. Incorporating an explicit valuation for ramping costs and/or capacity may enable PGUs 120A-N to be compensated in accordance with the ramping capacity provided thereby, and may avoid the need for ad-hoc uplift corrections. Moreover, providing an explicit and provable valuation for ramping capacity may enable PGUs 120A-N to develop additional ramping capacity. More specifically, generating the marginal valuation metric 880 that explicitly merits PGUs 120A-N based on ramping trajectory in a transparent, provable manner may provide an basis for the development of additional ramping capacity (based on the assurance that the cost and value of such ramping capacity will be appropriately valued). As disclosed herein, the marginal valuation metric 880 may be used to provision resources to the PGUs 120A-N in exchange for the power generated thereby. Provisioning resources to the PGUs 120A-N may comprise providing economic compensation to the PGUs 120A-N(e.g., 892A-N). The marginal valuation metric 880 may, in some embodiments, comprise a marginal electricity price. By way of non-limiting example, the cost functions Ck for the PGUs 120A-N may quantify the economic costs for power generation and/or ramping, and the resulting marginal valuation metric 880 may comprise the marginal electricity price for the power system 100 (e.g., in terms of dollar per MW in unit of time). The coordination engine 890 may use the marginal valuation metric 880 to determine an economic compensation for the PGUs 120A-N as disclosed herein. Using the marginal valuation metric 880 as a basis for provisioning resources to the PGUs 120A-N may shift resources to PGUs 120A-N on the basis of ramping capacity. Provisioning resources to PGUs 120A-N on the basis of ramping capacity may provide an incentive (and explicit economic basis) that may enable the PGUs 120A-N to develop additional ramping capacity. The power system 110 may leverage the additional ramping capacity provided by the PGUs 120-A-N(as incentivized by the marginal valuation metric 880) to respond to net load variations. Accordingly, the marginal valuation metric 880 disclosed herein may improve the operation of the power system 100 by: a) providing an explicit basis for the development of ramping capacity by the PGUs 120A-N of the power system 100, wherein b) the increased ramping capacity enables the power system 100 to be better equipped to handle real-time net load variations, while avoiding scarcity conditions.

In some embodiments, the valuation processor 862 may be further configured to generate a marginal ramping valuation metric 881. The marginal ramping valuation metric 881 may identify and/or extract the portion of the marginal valuation metric 880 that corresponds to ramping capacity (and/or ramping costs) of the PGUs 120A-N. The marginal ramping valuation metric 881 may provide an explicit indication of the valuation of ramping costs and/or ramping capacity over the operating period T (and/or during real-time operation). The marginal ramping valuation 881 may comprise a component of the continuous-time marginal valuation metric 880 and, as such, may be expressed and/or represented as a continuous-time quantity separate from (and/or in conjunction with) the marginal valuation metric 880. In some embodiments, the marginal ramping valuation metric 881 may comprise a marginal ramping price (e.g., price for PGU ramping in units of time). The marginal ramping valuation metric 881 may be derived from the determined incremental ramping costs 872A-N for the PGUs 120A-N as disclosed above. In some embodiments, the coordination module may be further configured to determine a ramping economic compensation 893A-N for the PGUs 120A-N. The ramping economic compensation 893A-N may indicate an amount of economic compensation provisioned to each PGU 120A-N due to the ramping costs and/or capacity provided thereby. The economic ramping compensation 893A-N may comprise a component and/or portion of the economic compensation 892A-N determined for a particular PGU 120A-N.

The coordination engine 890 may be configured to transmit one or more of the marginal valuation metric 880, marginal ramping valuation metric 881, economic compensation 892A-N, and/or ramping economic compensation 893A-N to PGUs 120A-N by use of, inter alia, the controller 148 and/or communication resources 605. The these quantities may provide explicit, transparent, provable basis for development of additional ramping capacity by the PGUs 120A-N. A PGU 120A-N may use the marginal ramping valuation metric 881 to determine whether to develop additional ramping capacity for the power system 100 (based on the price established for such ramping capacity). A PGU 120A-N may use the ramping economic compensation 893A-N to determine whether the cost function Ck thereof adequately reflects the ramping costs incurred by the PGU 120A-N, which may also be used as a basis for determining whether to develop additional ramping capacity at the PGU 120A-N. As disclosed above, development of additional ramping capacity by the PGUS 120A-N may enable the power system 100 to respond to net load variations while avoiding scarcity conditions.

The coordination engine 890 may be communicatively coupled to the monitor 142. The monitor 142 may detect variations in the net load on the power system 100. In response, the coordination engine 890 may be configured to select one or more PGUs 120A-N to compensate in order to, inter alia, avoid scarcity conditions. The coordination engine 890 may evaluate PGU classifications 862, incremental generation cost metrics 870A-N and/or incremental ramping cost metrics 872A-N of the PGUs 120A-N to select an optimal set of PGUs 120A-n to respond to the net load variation. The PGU classifications 865A-D may identify PGUs 120A-N that are available to provide additional capacity (and distinguish PGUs 120A-N that are unconstrained from PGUs 120A-N that are Ramp-constrained). The coordination engine 890 may evaluate the incremental generation cost metrics 870A-N of the PGUs 120A-N to identify PGUs 120A-N available to satisfy the net load variation at the lowest cost. The coordination engine 890 may be further configured to evaluate the incremental ramping cost metrics 870A-N to distinguish between PGUs 120A-N with similar cost characteristics. In some embodiments, the coordination engine 890 may select a PGU 120A-N with lower ramping costs to satisfy a short-term variation even though the PGU 120A-N may have higher generation costs than other available PGUs 120A-N. The coordination engine 890 may select the PGU 120A-N with the lower ramping costs over a PGU with more favorable generation costs since, in some instances, the ramping costs incurred to ramp up, and back down, for a short term load variation may outweigh the generation costs. The coordination engine 890 may be configured to issue configuration commands 166 and/or 168 to engage the selected PGU 120A-N, and may disengage the PGU 120A-N in response to determining that the net load variation has subsided. In the some embodiments, valuation processor 862 and/or coordination engine 890 may be configured to identify PGU 120A-N to satisfy short-term variations based on, inter alia, real-time generation and/or ramping trajectory data 820 pertaining to respective PGU 120. The monitoring data 820 may comprise measurement(s) of the generation and/or ramping trajectory 822A-N of respective PGU 120A-N during real-time operation (as determined by, inter alia, the monitor 142). The valuation processor 820 and/or coordination engine 890 may classify PGU 120A-N and/or select PGU 120A-N to supply additional power based on, inter alia, the current, real-time measurements of generation and/or ramping trajectories 822A-N of respective PGU 120A-N. The scheduler 846 may be configured to refine generation and/or ramping characteristics of the PGU 120A-N based on, inter alia, the monitoring data 820 pertaining to the real-time generation and/or ramping trajectories 822A-N of respective PGU 120A-N.

As disclosed above, incorporation of explicit ramping costs into the marginal valuation metric 880 may define a new criterion for the marginal generating unit in power system operation, where PGU 120A-N merit the others and become marginal not only for their less incremental ramping cost metric 870A-N, but also for their less incremental ramping cost metric 872A-N. By way of non-limiting example, the power system 100 may include PGU 120A and PGU 120B that have the same incremental generation cost metric 870A and 870B. The power system manager 146 and/or coordination engine 890 may be required to select either PGU 120A or PGU 120B to provide generate additional power for the power system (e.g., due to a load variation). The selection may be based on the lower overall cost, which may be determined by the incremental ramping cost metrics 872A and 872B of the PGUs 120A-B (the PGU 120A-B would be the marginal and set a lower cost for power generation, as established by Eq. 82). By contrast, a conventional approach to power system scheduling that does not consider ramping costs would not distinguish between PGUs 120A and 120B (due to inadequate modeling of the ramping costs of the respective PGUs 120A-B).

As disclosed above, the Lagrange multiplier $\lambda(t)$ of Eq. 60 (of the valuation model 860) may be used to generate the marginal valuation metric 880, which may define an optimal valuation for power generated for the power system 100 in continuous-time and during a particular operating interval T. Other Lagrange multipliers of the valuation model 860 (of Eq. 59-63) may be leveraged to model other aspects and/or characteristics of the power system 100.

In one embodiment, the valuation processor 862 is configured to determine Lagrange multipliers corresponding to capacity constraints of the power system. By way of example, at time t a particular PGU 120K may reach one of its capacity limits. The corresponding non-negative Lagrange multipliers $\underline{\upsilon}_k(t)$ and $\overline{\upsilon}_k(t)$ of the binding capacity constraints may be calculated using the Euler-Lagrange Eq. 67, as follows:

$$\underline{\upsilon}_k(t) = IC_k^G(t) - \frac{d}{dt}(IC_k^G(t)) - \lambda(t),$$ Eq. 83

$$\overline{\upsilon}_k(t) = \lambda(t) - IC_k^G(t) + \frac{d}{dt}(IC_k^G(t)),$$ Eq. 84

In Eqs. 83 and 84, $\lambda(t)$ may be calculated in accordance with Eq. 82. The multipliers $\underline{\upsilon}_k(t)$ and $\overline{\upsilon}_k(t)$ may quantify the sensitivity of the optimal cost functional J* to the incremental changes in the value of minimum and maximum capacities of PGU 120K at time t. In Eq. 83, the positivity of $\underline{\upsilon}_k(t)$ indicates that, when the PGU 120K is scheduled at minimum capacity at time t, the incremental generation cost metric 870K minus the time derivative of the incremental ramping cost 872K is more than the marginal price at that time (t). In addition, positivity of $\overline{\upsilon}_k(t)$ in Eq. 84 indicates that the incremental generation metric 870K generating at maximum capacity minus the time derivative to the incremental ramping metric 872K is less than the marginal price at that time (t). In some embodiments, the valuation processor 862 is configured to calculate the quantities of Eq. 83 and 84 875A-N for one or more of the PGU 120A-N, as disclosed herein.

By way of further example, at time tr the power system 100 may require additional power generation resources at a particular generation capacity at a required ramp rate. A PGU 120K may reach one of its down or up ramping limits at time tr. However, at time tr, the PGU 120K may not have reached any of its capacity constraints. Another, lower cost, PGU 120C may be capable of providing the required generation capacity, but may not be able to satisfy the required ramp rate. In this case, the higher-cost PGU 120K may be selected to provide the additional power generation resources, due to being capable of meeting the required ramp rate. From the perspective of the PGU 120A-N, the selection mechanisms dictated by the ramping constraints of the PGU 120A-N provides an incentive to develop ramping capacity. Having lower cost generation resources does not ensure competitiveness if the lower-cost resources may cannot satisfy the ramping capacity requirements of the power system 100. Selection and/or scheduling of PGU 120A-N on the basis of ramping capacity rather than generation cost alone provides a natural competency to PGU 120A-N with higher ramping constraints.

In some embodiments, the valuation processor 862 is configured to calculate quantities 876A-N configured to quantify the sensitive of the optimal cost function J* to incremental changes in the value of the down/up ramping limits of particular PGU 120A-N ($G_k$), which may quantify the relative importance of ramping capacity with respect to PGU scheduling. The quantities 876A-N may correspond to non-negative Lagrange multipliers $\underline{\mu}_k(t)$ and $\overline{\mu}_k(t)$ per Eqs. 85 and 86 below.

$$\underline{\mu}_k(t) = -IC_k^G(t) - \int_{t_r}^{t}(IC_k^G(t) - \lambda(t))dt,$$ Eq. 85.

$$\overline{\mu}_k(t) = \int_{t_r}^{t}(IC_k^G(t) - \lambda(t))dt - IC_k^G(t),$$ Eq. 86.

In Eqs. 85 and 86, $\lambda(t)$ may be calculated in accordance with Eq. 82. As disclosed above, the multipliers $\underline{\mu}_k(t)$ and $\overline{\mu}_k(t)$ may indicate the sensitivity of the optimal cost functional J* to incremental changes in the value of the down/up ramping limits of particular PGU 120A-N ($G_k$).

Figure 10:
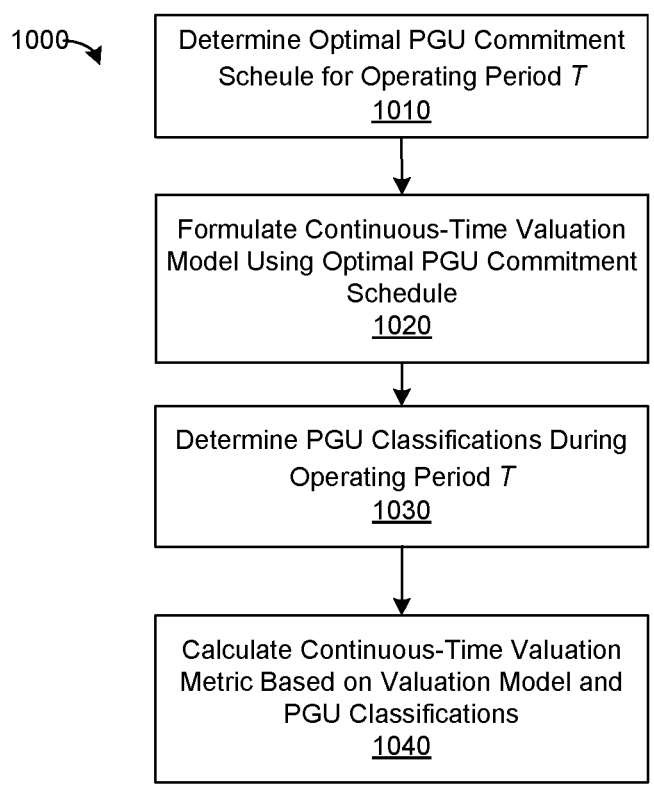
FIG. 10 is a flow diagram of one embodiment of a method for managing power generating units.

FIG. 10 is a flow diagram of one embodiment of a method 1000 for managing a PGU. One or more of the steps of the method 1000 (and/or the other methods disclosed herein) may be embodied as instructions stored on a non-transitory computer-readable storage medium. The instructions may be configured to cause a computing device to perform the disclosed method steps. Alternatively, or in addition, one or more of the steps of the method 1000 (and/or the other methods disclosed herein) may be embodied and/or implemented by hardware components, such as a circuit, monitoring device, control device, communication device, and/or the like.

Step 1010 may comprise determining an optimal PGU commitment schedule for an operating period T. The commitment schedule may be configured to satisfy a net load on the power system 100 during the operating period T. Step 1010 may comprise formulating a continuous-time UC model 660 for the power system 100 by, inter alia: determining a continuous-time net load forecast for the power system 100, determining continuous-time generation and/or ramping constraints of the PGUs 120A-N of the power system, and so on. Step 1010 may further comprise determining an optimal solution for the optimization problem formulated by the UC model 660 by: recasting the UC model 660 as an MILP problem with a finite-dimensional decision space (e.g., utilizing Bernstein polynomials to model the continuous-time generation and/or ramping trajectories of the PGU 120A-N), and determining an optimal solution to the resulting MILP problem, as disclosed herein. The optimal PGU commitment schedule may comprise optimal generation, ramping, and commitment trajectories for each PGU 120A-N of the power system 100 (e.g., $G^*(t)$, $\dot{G}^*(t)$, and $I^*(t)$).

Step 1020 may comprise formulating a continuous-time valuation model using the optimal PGU commitment schedule of step 1000. Step 1020 may comprise deriving a valuation model 860, as disclosed herein, which may comprise, inter alia, fixing the commitment variables to their optimal values in accordance with the continuous time UC model 660, and deriving a corresponding valuation model 860 in accordance with Eq. 59-63 above. Step 1020 may further comprise establishing optimality conditions 865A-D for the valuation model 860, as disclosed herein. The optimality conditions 865A-N may include, but are not limited to: an Euler-Lagrange optimality condition 865A, a transversality condition 865B, a complimentary slackness condition 865C, and an original problem constraint 865D.

Step 1030 may comprise assigning classifications to the PGUs 120A-N during particular time periods of the operating interval T (e.g. PGU classifications 866). PGUs 120A-N may be classified as one of: Unconstrained, Ramp-constrained, and Capacity-constrained, as disclosed herein. A PGU 120A-N ($G_k$) may be assigned a particular classification at time $\tau$ based, inter alia: $G_k(\tau)$, $\dot{G}_k(T)$, generation constraints of the PGU 120A-N, and ramping constraints of the PGU 120A-N. Step 1030 may comprise assigning the Unconstrained classification to the PGU 120A-N ($G_k$) at time $\tau$ in response to determining that the PGU 120A-N ($G_k$) is capable of flexibly changing its generation and ramping trajectory at time $\tau$ (e.g., determining that $G_k(\tau)$ can be flexibly modified within the generation constraints, and $\dot{G}_k(\tau)$ can be flexibly modified within the ramping constraints). Step 1030 may comprise assigning the Ramp-constrained classification in response to determining that the PGU 120A-N ($G_k$) is capable of flexibly changing $G_k(\tau)$ but that $\dot{G}_k(\tau)$ is constrained.

Step 1040 may comprise calculating a continuous-time valuation metric 880 for the power system 100 based on the valuation model 860 and the PGU classifications 866.

Step 1040 may comprise calculating incremental generation metrics 870A-N and incremental ramping cost metrics 872A-N for the PGUs 120A-N in accordance with Eq. 80 and 81 (and the PGU classifications 866), as disclosed above. Step 1040 may further calculating the continuous-time valuation metric 880 as a weighted average of the incremental generation cost metrics 870A-N of: a) the Unconstrained PGUs 120A-N and the Ramp-constrained PGUs 120A-N (per the PGU classifications 866), and b) a weighted average of the incremental ramping cost metrics 872A-N of the Unconstrained PGUs 120A-N during the operating period T (e.g., at each time $\tau$ within T). The marginal valuation metric 880 may be calculated in accordance with Eq. 82, as disclosed herein.

Step 1040 may further comprise communicating the marginal valuation metric 880 within the power system 100 (e.g., to PGUs 120A-N, the power system manager 146, the scheduler 846, and so on). The marginal valuation metric 880 may quantify a value of ramping costs and/or capacity provided by the PGUs 120A-N rather than generation alone. Accordingly, the marginal valuation metric 880 of step 1040 may comprise a transparent, provable, and explicit valuation for ramping costs and/or capacity of the PGUs 120A-N, which may provide the basis for development of additional ramping capacity within the power system 100. Step 1040 may further include determining a marginal ramping valuation metric 881 to explicitly identify a valuation corresponding to ramping capacity.

Step 1040 may comprise using the marginal valuation metric 880 to establish a continuous-time economic pricing model for power generated within the power system during the operating interval T. The continuous-time economic pricing model may the economic value for ramping capacity provided by the PGU 120A-N(in accordance with the ramping trajectories and/or PGU classifications during the operating interval T).

In some embodiments, step 1040 further includes provisioning resources to the PGU 120A-N in accordance with the marginal valuation metric 880. Provisioning resources to the PGUs 120A-N may comprise compensating the PGU 120 in accordance with the marginal valuation metric 880 by, inter alia, determining an economic compensation 892A-N for each PGU 120A-N scheduled during the operating interval T Step 1040 may further comprise determining an economic ramping compensation 893A-N for each PGU 120A-N to explicity identify an economic compensation corresponding to the ramping capacity provided by the PGUs 120A-N.

Figure 11:
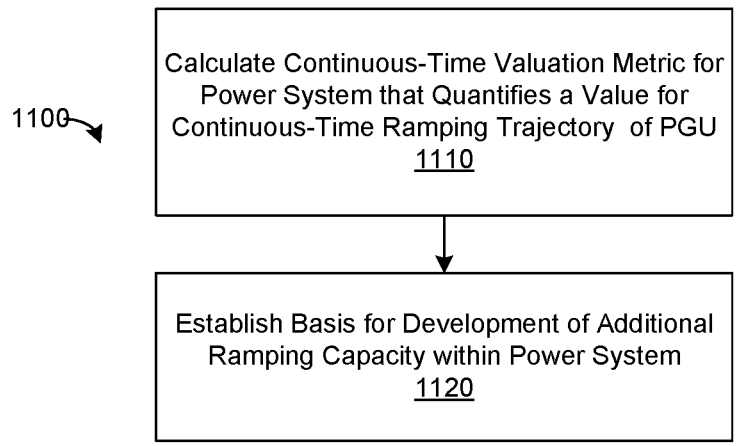
FIG. 11 is a flow diagram of one embodiment of a method for development ramping capacity for a power system.

FIG. 11 is a flow diagram of another embodiment of a method 1100 for managing power generating units of a power system. Step 1100 may comprise determining a continuous time valuation metric for the power system 100 that quantifies a value for continuous-time ramping trajectory of the PGUs 120A-N of the power system 100. Step 1100 may comprise calculating the marginal valuation metric 880 for the power system 100 over a particular operating interval T, as disclosed herein. The marginal valuation metric 880 may quantify a continuous-time cost and/or value associating with the ramping trajectories $\dot{G}_k$ of each PGU 120A-N as opposed to being based exclusively on power generated by the PGUs 120A-N.

Step 1120 may comprise establishing a basis for development of additional ramping capacity within the power system 100. Step 1120 may comprise using the marginal valuation metric 880 of step 1100 as a transparent, provable, and quantifiable basis for establishing a valuation of ramping capacity provided by the PGUs 120A-N. Step 1120 may comprise one or more of a) providing the marginal valuation metric 880 to the PGUs 120A-N, b) using the marginal valuation metric 880 to provision resources to the PGUs 120A-N, c) using the marginal valuation metric 880 to establish economic pricing for power generated for the power system 100 during the operating interval T, d) using the marginal valuation metric 880 to determining economic compensation 892A-N for the PGU 120A-N, and so on. Step 1120 may further comprise determining a marginal ramping valuation metric 881 to explicitly identify a valuation of ramping capacity separate from the overall marginal valuation metric 880 Step 1120 may comprise calculating quantities 875A-N and/or 876A-N, which may quantify the degree to which the optimal cost functional J* depends on minimum and maximum generation and/or ramping capacity of the PGUs 120A-N, as disclosed above. Step 1120 may also include determining ramping economic compensation 893A-N for the PGUs 120A-N, the ramping economic compensation 893A-N indicating an economic compensation corresponding to the ramping trajectory of the PGU 120A-N. The quantities of step 1120 may comprise explicit, transparent, and provable indications of a valuation for ramping capacity in the marginal valuation metric 880. Accordingly, the marginal valuation metric 880 (and the other quantifies disclosed in conjunction with step 1120) may comprise an incentive for development of additional ramping capacity within the power system 100. A PGU 120A-N may use the marginal valuation metric 880 to establish an economic benefit corresponding to resources used to maintain and/or develop additional ramping capacity for the power system 100.

Figure 12:
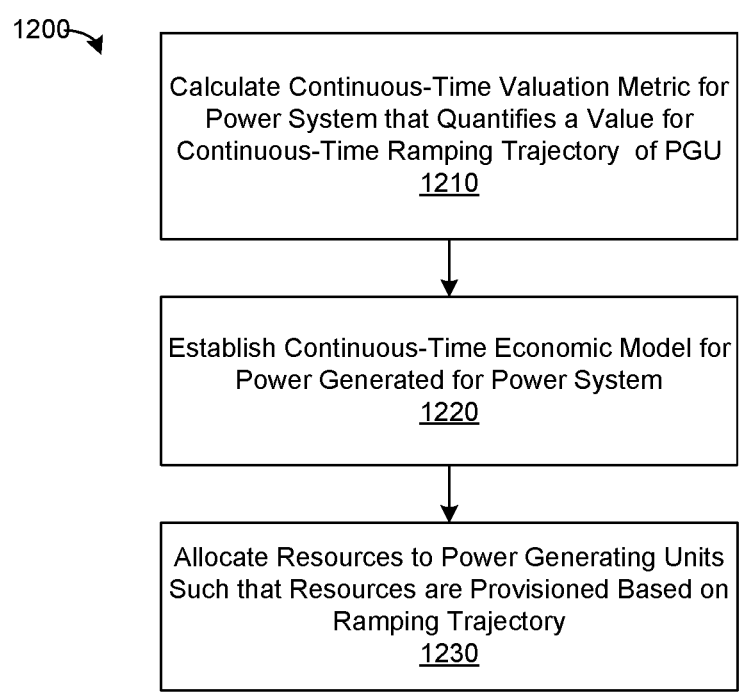
FIG. 12 is a flow diagram of one embodiment of a method for provisioning resources to power generating units of a power system.

FIG. 12 is a flow diagram of another embodiment of a method 1200 for managing power generating units of a power system 100. Step 1210 may comprise calculating the marginal valuation metric 880 for the power system as disclosed herein.

Step 1700 may comprise establishing a continuous-time economic model for power generated for the power system during the operating interval T. Step 1700 may comprise deriving the continuous-time economic model from the marginal valuation metric 880 (and/or using the marginal valuation metric 880 as the continuous-time economic model). Step 1700 may further comprise establishing that the continuous-time economic model is based on ramping trajectories of the PGUs 120A-N(ramping cost and/or capacity) as opposed to generation alone, as disclosed herein.

Step 1230 may comprise allocating resources to the PGU 120A-N such that resources are allocated to the PGUs 120A-N I based on the ramping trajectories of the PGUs 120A-N(e.g., based on ramping costs incurred by the PGUs 120A-N). Step 1230 may comprise allocating resources to the PGU 120A-N in accordance with the continuous-time economic model of Step 1700 (to compensate the PGUs 120A-N for power generated during the operating interval T). Step 1230 may comprise determining an economic compensation 892A-N for each PGU 120A-N, which may compensate the PGUs 120A-N in accordance with its continuous-time ramping trajectory thereof (ramping costs and/or capacity) as opposed to power generation alone. Step 1230 may comprise determining economic payments to each PGU 120A-N. The economic payments may compensate the PGUs 120A-N in accordance with the ramping capacity provide by the PGUs 120A-N and/or the ramping costs incurred by the PGUs 120A-N. Allocating resources to the PGUs 120 in accordance with continuous-time ramping trajectories may ensure that the PGUs 120A-N are adequately compensated for the costs associated with ramping. Therefore, allocating resources in accordance with step 1230 (based on the marginal valuation metric 880 disclosed herein) may obviate the need for inefficient, ad-hoc uplift payments to the PGUs 120A-N.

Figure 13:
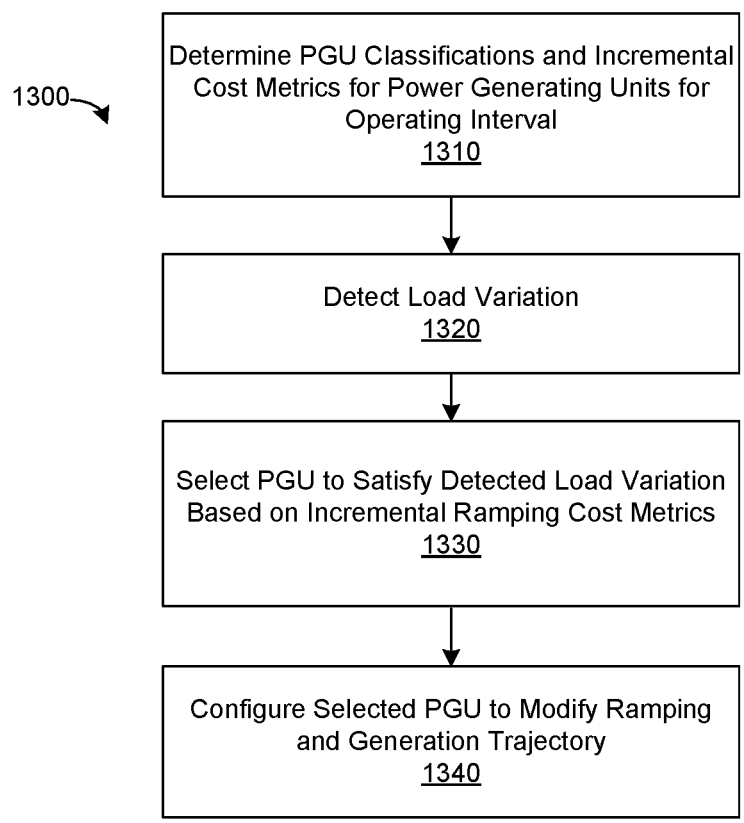
FIG. 13 is a flow diagram of one embodiment of a method for satisfying variations from a load forecast for a power system.

FIG. 13 is a flow diagram of another embodiment of a method 1300 for managing a power system 100. Step 1310 may comprise determining PGU classifications for the PGUs 120A-N of the power system during a particular operating period T. Step 1310 may further comprise determining incremental cost metrics for the PGUs 120A-N(e.g., incremental generation cost metrics 870A-N and/or incremental ramping cost metrics 872A-N) during the operating period T. The PGU classifications and/or incremental cost metrics 870A-N and/or 872A-N may be calculated as disclosed herein, which may comprise, inter alia: calculating an optimal PGU commitment schedule for the PGUs 120A-N based on a continuous-time UC model 660 of the power system 100 ($G^*(t)$, $\dot{G}^*(t)$, and $I^*(t)$); formulating a continuous-time valuation model 860 using the optimal PGU commitment schedule; establishing optimality conditions 865A-D for the valuation model 860; assigning classifications to the PGUs 120A-N during particular time periods of the operating interval T; and calculating the incremental generation metrics 870A-N and incremental ramping cost metrics 872A-N for the PGUs 120A-N in accordance with Eq. 80 and 81 (and the PGU classifications 866). Step 1320 may further comprise configuring the power system 100 to operate in accordance with the optimal PGU commitment schedule during the operating period T, as disclosed herein.

Step 1320 may comprise detecting a variation in the load on the power system 100 at a particular time $\tau$ within the operating period T (e.g., during real-time operation). Step 1320 may comprise detecting the load variation in response to monitoring the power system 100 (by use of the monitor 142 and/or in response to monitoring data 152 acquired thereby).

Step 1330 may comprise selecting a PGU 120A-N to satisfy the detected load variation. The PGU 120A-N may be selected to provide additional power generation resources in order to, inter alia, prevent a scarcity condition within the power system 100. Step 1330 may comprise selecting the PGU 120A-N based on one or more of the classifications assigned to the PGUs 120A-N at time $\tau$ (PGU classifications 866) and the incremental cost metrics 870A-N and/or 872A-N. The classifications assigned to the PGUs 120A-N at time $\tau$ may identify a set of PGUs 120A-N that are available to satisfy the load variation. In particular, the PGUs 120A-N that are classified as either Unconstrained or Rate-constrained may be included in the first set (deemed available to satisfy the load variation), and the PGUs 120A-N that are classified as Capacity-constrained at time r may not be included in the first set. Step 1330 may comprise selecting the PGU 120A-N to satisfy the load variation from the identified set. The PGU 120A-N may be selected in accordance with the incremental cost metrics 870A-N and/or 872A-N of the PGUs 120A-N. For example, the PGU 120A-N could be selected based on lowest generation cost (based on the incremental generation cost metrics 870A-N).

In the FIG. 13 embodiment, step 1330 comprises selecting the PGU 120A-N to satisfy the load variation based on the incremental ramping cost metrics 872A-N. Selecting the PGU 120A-N based on lowest incremental ramping cost metric 872A may minimize the costs associated changes in ramping trajectory. Since the load variation is transient, the ramping costs incurred by the PGU 120A-N selected to satisfy the variation may outweigh its generation costs (the selected PGU 120A-N may only be required to generate additional power for a short time).

The overall cost associated with satisfying the variation may be a combination of generation and ramping (e.g., as defined by incremental generation cost metric 870A-N and the incremental ramping cost metric 872A-N for the PGU 120A-N). The overall generation cost, however, may depend on the duration of the load variation. In some embodiments, step 1330 may comprise estimating a duration for the load variation and, based on the estimated duration, selecting the PGU 120A-N to satisfy the load variation that would result in the lowest overall cost as determined by a) the incremental generation cost metric 870A-N and estimated duration, and b) the incremental ramping cost metric 872A-N.

Step 1340 may comprise configuring the selected PGU 120A-N to satisfy the detected load variation, which may comprise modifying the generation trajectory and/or ramping trajectory of the PGU 120A-N, as disclosed herein.

Figure 14:
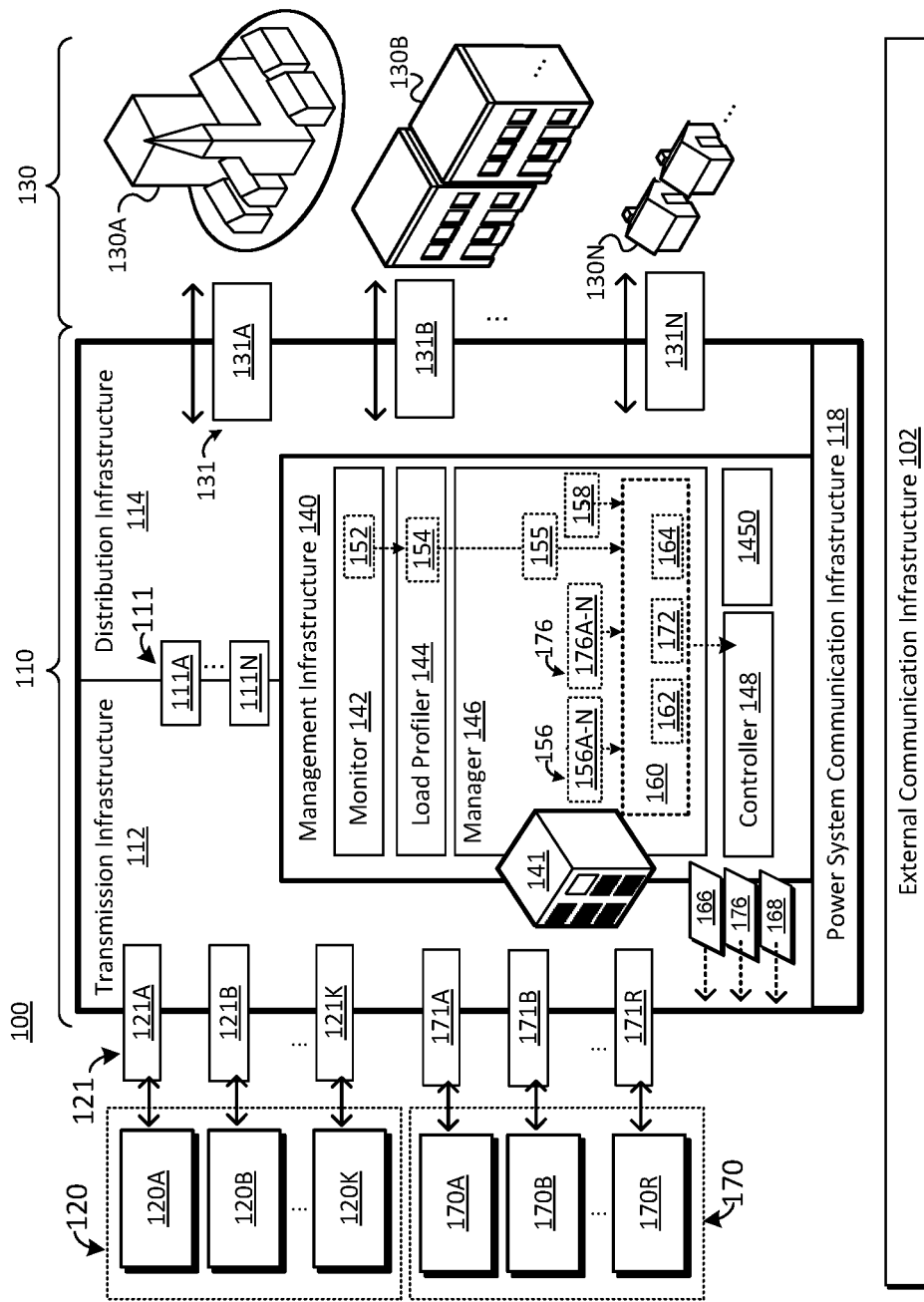
FIG. 14 is a schematic block diagram of one embodiment of a power system comprising management infrastructure configured to control power generation and/or storage resources.

FIG. 14 is a schematic block diagram of another embodiment of a power system 100. The power system 100 may comprise power system infrastructure 110 configured to receive, transmit, and/or distributed electrical power to a load 130 (by use of transmission infrastructure 112 and/or distribution infrastructure 114, as disclosed herein). The power system 100 may comprise one or more PMCD 121, each PMCD 121A-K may be configured to monitor and/or control coupling to respective PGU 120 of N PGU 120A-N.

In the FIG. 14 embodiment, the power system 100 may be capable of being operably coupled to one or more energy storage units (ESU) 170. An ESU 170 may be configured to operate in the power system 100 in one or more states, which may include, but are not limited to: a charging state in which the ESU 170 draws power from the power system 100, a discharging state in which the ESU 170 supplies power to the power system 100, a steady state in which the ESU 170 neither draws power from, nor supplies power to, the power system 100 (and/or is decoupled from the power system 100), and/or the like. The amount of energy stored within an ESU 170 over time may be referred to as the energy trajectory of the ESU 170 (e.g., $E^S(t)$, where $E^S$ is the amount of energy stored with the ESU as a function of time t). The energy trajectory of an ESU 170 may be decomposed into a charge component $D^S(t)$, which may correspond to operation of the ESU 170 in the charging state (during which the ESU 170 stores power drawn from the power system 100, increasing $E^S$), and a discharge component $G^S(t)$, which may correspond operation of the ESU 170 in the discharging state (during which the ESU 170 supplies power to the power system 100, decreasing $E^S$). In the steady state, the amount of energy stored within an ESU 170 may be substantially constant (and/or may decrease at a relatively low rate due to, inter alia, energy storage loss).

The controller 148 may be configured to manage real-time operation of the power system 100 by use of, inter alia, one or more MCD, which may include IMCD 111, PMCD 121, and/or LMCD 131, as disclosed herein. The controller 148 may be further configured to manage operation of ESE 170 by use of ESU monitoring and/or control devices (EMCD) 171 (e.g., each EMCD 171A-R configured to monitor and/or control a respective ESU 170A-R). The controller 148 may configure the PGUs 120A-N and/or ESU 170A-R to supply power sufficient to satisfy a net load on the power system 100. The controller 148 may utilize ESU 170 to store energy drawn from the power system 100, supply power to the power system 100, and/or the like. The controller 148 may be configured to manage real-time operation of the power system 100 during an operating period in accordance with a power system configuration 160, which may comprise an energy configuration 172, which may be configured to, inter alia, schedule PGU 120A-N to supply power to the power system 100 during the operating period. In the FIG. 14 embodiment, energy configuration 172 may be further configured schedule operation of respective ESU 170A-R during the operating period (e.g., configure ESU 170 to store power drawn from the power system 100, supply power to the power system 100, and/or the like). The infrastructure configuration 164 may be adapted to configure the power system infrastructure 110 to receive power supplied by respective PGU 120A-N(and/or ESU 170A-R) during the operating period, supply power to selected ESU 170A-R during the operating period, and/or the like.

The monitor 142 may be configured to acquire monitoring data 152 pertaining to the power system during a current operating period and/or one or more previous operating periods. The monitoring data 152 may comprise information pertaining to the actual net load on the power system. The monitoring data 152 may comprise a series of net load measurements, samples, and/or the like. The monitoring data 152 may correspond to a particular monitoring scheme, periodic monitoring scheme, a discrete monitoring scheme, a synchronized monitoring scheme, an asynchronous monitoring scheme, a continuous-time monitoring scheme, a pseudo continuous-time monitoring scheme, and/or the like. The load profiler 144 may be configured to generate load profile(s) 154 for the power system 100, each comprising a net load forecast for a respective operating period of the power system 100 (e.g., a series of discrete net load forecasts).

The manager 146 may be configured to determine a power configuration 160 for the power system 100, which may comprise determining an ITCT load profile 155 for the operating period, as disclosed herein. The ITCT load profile 155 may be based on a load profile 154 determined by the load profiler 144. Alternatively, or in addition, the ITCT load profile 155 may be derived from, inter alia, monitoring data 152 acquired by the monitor 142. The manager 146 may configure the monitor 142 to obtain monitoring data 152 pertaining to the net load on the power system in accordance with a selected monitoring scheme (e.g., a periodic monitoring scheme, a discrete monitoring scheme, a synchronized monitoring scheme, an asynchronous monitoring scheme, a continuous-time monitoring scheme, a pseudo continuous-time monitoring scheme, and/or the like). Alternatively, or in addition, the manager 146 may configure the monitor 142 to obtain granular net load measurements (e.g., may determine and/or record net load measurements at a higher frequency and/or a shorter measurement intervals than in a conventional load profile 154).

The manager 146 may determine the ITCT load profile 155 by, inter alia, analyzing monitoring data 152 pertaining to a real-time net load on the power system 100, analyzing monitoring data 152 pertaining to a real-time net load on the power system 100 during a current operating period, analyzing monitoring data 152 pertaining to a real-time net load on the power system 100 during one or more previous current operating periods, and/or the like. The manager 146 may determine the ITCT load profile 155 by, inter alia, numerical techniques such as interpolation, function projection, expansion, and/or the like. In some embodiments, the manager 146 may determine the ITCT load profile 155 by expressing the net load samples in continuous-time and/or by use of higher-order function space (e.g., higher order than 1 per the constant and/or piecewise linear view of respective net load forecast quantities). The ITCT load profile 155 may comprise a polynomial, exponential, and/or other type of model of the net load quantities. In some embodiments, and as disclosed in further detail herein, the manager 146 may be configured to model the net load quantities as cubic splines, which may comprise projecting the net load quantities of the load profile 154 into a higher-order function space (e.g., Hermite function space). The ITCT load profile 155 may, therefore, comprise expanding a constant and/or piecewise linear sequence of net load quantities into a higher-order model of net load. The ITCT load profile 155 may be configured to reflect non-linear variations between respective sample periods and/or time intervals of the net load quantities (e.g., within respective time intervals of the load profile 154).

The manager 146 may be configured to power system configuration 160 to satisfy the ITCT load profile 155. The manager 146 may be configured to determine a power system configuration 160 for the operating period, which may comprise a PGU configuration 162 adapted to schedule PGU 120A-N to supply power to the power system sufficient to satisfy the net load forecast over the operating period, as disclosed herein. The manager 146 may be further configured to incorporate ESU 170 into the power system configuration 160. The manager 146 may be configured to configure respective ESU 170A-R to selectively draw power from the power system 100 during the operating period, supply power to the power system 100 during the operating period, and/or the like. The manager 146 may schedule ESU 170 in accordance with ITCT characteristics thereof including, inter alia, cost and/or utility metrics pertaining to charging and/or discharging respective ESU 170A-R during the operating period (e.g., in accordance with ITCT characteristics of the net load forecast, generation and/or ramping trajectories of the PGU 120A-N, cost metrics pertaining to power generation by respective PGU 120A-N, and/or the like.). As disclosed above, the energy trajectory of an ESU may comprise and/or model energy stored within an ESU 170 as a function of time (in accordance with a power trajectory of the ESU 170). The power trajectory of an ESU 170 may be decomposed into: a) charging and charging ramping trajectories of the ESU 170, which may correspond to time(s) during which the ESU 170 is drawing power for storage therein, and b) discharging and discharge ramping trajectories of the ESU 170, which may correspond to time(s) during which power is being discharged therefrom. The charging trajectory of an ESU 170 may comprise and/or model power being stored within the ESU 170 as a function of time (e.g., while the ESU 170 is configured to draw power from the power system 100). The charging ramping trajectory of the ESU 170 may comprise and/or model a derivative of the charging trajectory. The discharging trajectory of an ESU 170 may comprise and/or model the discharge of power from the ESU 170 as a function of time (e.g., may comprise a generation trajectory of the ESU 170 when supplying power to the power system 100). The discharge ramping trajectory of the ESU 170 may comprise a time derivative of the discharging trajectory thereof. The manager 146 may be configured to determine and/or maintain ESU metadata 176 comprising characteristics pertaining to respective ESU 170 (e.g, ESU metadata 176A-R pertaining to ESU 170A-R). As used herein, a characteristic of an ESU 170 (or "ESU characteristic") may refer to any suitable information pertaining to an ESU 170, operation of the ESU 170, capabilities of the ESU 170, and/or the like. The characteristics of an ESU 170 may include, but are not limited to: interface characteristics, energy characteristics, power characteristics, ramping characteristics, cost characteristics, and/or the like. The interface characteristics of an ESU 170 may comprise information pertaining to interface(s) at which the ESU is capable of being electrically coupled to the power system 100, as disclosed herein. The energy characteristics of an ESU 170 may comprise information pertaining to an energy trajectory of the ESU 170 (ITCT characteristics and/or constraints of the power trajectory of the ESU 170). The power characteristics of an ESU 170 may comprise and/or model power trajectory constraints of the ESU 170 (e.g., a maximum amount of power capable of being stored within the ESU 170, charging trajectory constraints, discharging trajectory constraints, and/or the like). The ramping characteristics of an ESU 170 may comprise and/or model ramping constraints of the ESU 170 (e.g., charging ramping constraints, discharging ramping constraints and/or the like). The cost characteristics of an ESU 170 may define, inter alia, cost metrics including a discharge cost metric, for supplying power from the ESU 170 (as a function of discharging power trajectory), a charging utility metric, quantifying a utility of energy storage within the ESU 170 (as a function of charging power trajectory), and/or the like.

The manager 146 may be configured to determine a power system configuration 160 adapted to, inter alia, scheduled power resources (e.g., PGU 120A-N and/or ESU 170A-R) sufficient to satisfy the ITCT net load forecast over the operating interval. The manager 146 may be configured to model scheduled power capacity of the power system 100 as a function of time, as disclosed herein (e.g., determine MSC(t) over the operating period, as disclosed herein). In the FIG. 14 embodiment, the model of the scheduled capacity MSC(t) determined by the manager 146 may comprise a sum of power scheduled to be supplied by respective PGU 120A-N and/or ESU 170A-R, less power scheduled to be drawn by selected ESU 170A-R e.g., MSC(t)=$\Sigma_K G_k^P(t)$+$\Sigma_R G_k^S(t)$−$\Sigma_R D_k^S(t)$, where $G_k^P(t)$ is the scheduled generation trajectory of respective PGU 120A-N(per the commitment schedule(s) thereof), $G_k^S(t)$ are discharging trajectories of respective ESU 120A-R, $D_k^S(t)$ are charging trajectories of respective ESU 170A-R (per the commitment schedules thereof). The manager 146 may configure the scheduled PGU 120A-N and/or ESU 170A-R such that the corresponding MSC(t) satisfies the net load forecast for the power system (e.g., MSC(t)=($\Sigma_K G_k^P$+$\Sigma_R G_k^S(t)$−$\Sigma_R D_k^S(t)$)≥N(t), where N(t) is a ITCT net load forecast for the power system 100 as a function of time. The manager 146 may, therefore determine a power system configuration 160 adapted to satisfy ITCT characteristics of the net load on the power system 100. The power system configuration 160 may incorporate the use of ESU 170A-R. The manager 146 may be configured to adapt the power system configuration 160 to satisfy ITCT characteristics of the net load forecast in accordance with ITCT characteristics of the PGU 120 (e.g., generation and/or ramping constraints of respective PGU 120A-N). The manager 146 may be further configured to adapt the power system configuration 160 to satisfy ITCT characteristics of the net load forecast in accordance with ITCT characteristics of the ESU 170 (e.g., discharging, charging, and/or ramping characteristics of respective ESU 170A-R). The manager may determine the power system configuration 160 to comply with power system constraints (as maintained in power system metadata 158, as disclosed herein).

The power system configuration 160 may comprise PGU configuration 162, which may schedule respective PGU 120A-N to supply power to the power system 100 during the operating period, as disclosed herein. The PGU configuration 162 may comprise a commitment schedule of selected PGU 120A-N, which may comprise and/or correspond to a scheduled generation trajectory of the selected PGU 120A-N. The manager 146 may configure the scheduled generation trajectory of respective PGU 120A-N in accordance with ITCT characteristics of the respective PGU 120A-N(e.g., determined scheduled generation trajectories for respective PGU 120A-N that comply with generation and/or ramping constraints thereof, as disclosed herein). The manager 146 may be further configured to define a ESU configuration 172 over the operating period. The ESU configuration 172 determined by the manager 146 may comprise a commitment and/or operating schedule for respective ESU 170A-R as a function of time. The ESU configuration 172 may, therefore, comprise and/or correspond to scheduled energy and/or power trajectories for respective ESU 170A-R (e.g., an amount of power drawn from and/or supplied to the power system 100 by respective ESU 170A-R as a function of time). The ESU configuration 172 may comprise scheduled charging and/or discharging trajectories of respective ESU 170A-R, which may configured ESU 170A-R to operate in one or charging mode, discharging mode, and steady-state mode as a function of time. The power and/or energy configurations of the ESU 170A-R may comprise respective charging and/or discharging trajectories of the respective ESU 170A-R (for scheduled operation in charging or discharging mode, respectively). The manager 146 may configure the ESU configuration 172 such that the energy and/or power trajectories comply and/or correspond to ITCT charging, discharging and/or ramping characteristics of the ESU 170, such that the energy and/or power trajectories scheduled for the ESU 170A-R comply with charging trajectory constraints, discharging trajectory constraints, charging ramping constraints, and/or discharging ramping constraints of the respective ESU 170A-R. The manager 146 may be configured to determine ITCT energy, power, charging, discharging, and/or ramping characteristics of respective ESU 170A-R by, inter alia, monitoring real-time operation of the ESU 170A-R (by use of the monitor 142 and/or EMCD 171A-R). Alternatively, or in addition, the manager 146 may ITCT characteristics of an ESU 170 from the ESU 170 itself (and/or based on properties and/or other characteristics of the ESU 170).

The power system configuration 160 may further comprise an infrastructure configuration 164, which may be adapted to configure the power system infrastructure 110 to receive power from selected PGUs 120A-N in accordance with the PGU configuration 162, and supply power to, and/or receive power from, selected ESU 170A-RR in accordance with the ESU configuration 172.

The manager 146 may be configured to determine an optimal power system configuration 160 for an operating period, which may comprise scheduling PGU 120A-N and/or ESU 170A-R to satisfy the ITCT load profile 155 for the operating period while minimizing a cost metric (and satisfying constraints of the PGU 120A-N, ESU 170A-R, and/or power system 100). The cost metric may correspond to generation and/or ramping cost metrics associated with scheduled generation trajectories of respective PGU 120A-N over the operating period, cost metrics associated with power and/or energy trajectories scheduled for respective ESU 170A-R over the operating period (e.g., utility metrics associated with drawing power for storage within respective ESU 170A-R, cost metrics associated with discharging power stored within respective ESU 170A-R), and/or the like. As disclosed above, generation and/or ramping cost metrics may be a function of time, demand, and/or the like (e.g., generation and/or ramping trajectory). Accordingly, the cost metric(s) for power generation may increase as a function of the net load on the power system 100. The manager 146 may configure ESU 170A-R to draw power from the power system 100 during low-cost and/or low-load periods (from excess power generation scheduled from selected PGU 120A-N during such periods), and may schedule ESU 170A-R to supply the stored power to the power system 100 during high-cost and/or high-load periods. In one embodiment, the manager 146 may model discharge metrics of ESU 170 as $C^S(G_r^s(t))$, where $G_r^s(t)$ is the discharging trajectory of the ESU 170, and may model charging utility metrics of the ESU as $U^S(D_r^s(t))$, where $D_r^s(t)$ is the charging power trajectory of the ESU 170. The cost metrics of the PGU 120A-N may be a function of generation trajectory, as follows $C_k^P(G_k^P(t), I_k^P(t))$, where $C_k^P$ is a cost metric of PGU 120 $k$ as function of time (and/or generation trajectory of the PGU 120) per the commitment schedule $I_k^P(t)$ thereof. The manager 146 may determine an optimal power system configuration 160 that satisfies an ITCT net load forecast (e.g., satisfies ITCT variations in the net load forecast) at minimal cost over the operating period subject to ITCT generation and/or ramping characteristics of respective PGU 120A-N, ITCT energy, power, and/or ramping characteristics of respective ESU 170A-R, and/or constraints of the power system 100.

The controller 148 may use the power system configuration 160 to manage real-time operation of the power system 100 during the operating period. The controller 148 may use the PGU configuration 162 to schedule PGU 120A-N to supply specified amount(s) of power to the power system 100 during the operating period, configure ESU 170A-R to draw specified amount(s) of power from the power system 100 during the operating period, and/or supply specified amount(s) of power from the power system 100 during the operating period. The controller 148 may be configured to cause respective PGU 120A-N to follow scheduled generation trajectories corresponding to the PGU configuration 162, and to cause respective ESU 170A-R to follow energy and/or power trajectories corresponding to the ESU configuration 172. The manager 146 may be configured to monitor real-time operation of the power system 100, including power generated by respective PGU 120A-N, drawn by respective ESU 170A-R, and/or supplied by respective ESU 170A-R in order to, inter alia, identify deviations between modeled and/or scheduled generation, energy, and/or power trajectories of the PGU 120A-N and/or ESU 170A-R used to determine the power system configuration 160 and actual, real-time characteristics of the PGU 120A-N and/or ESU 170A-R. The controller 148 may configure PGU 120A-N to supply power to the power system 100 in accordance with the PGU configuration 162) by use of, inter alia, PGU requests (and/or PMCD 121). The controller 148 may configure ESU 170A-R to draw power from the power system 100 and/or supply power to the power system in accordance with the ESU configuration 172 by use of, inter alia, ESU requests 176 (and/or EMCD 171). The ESU requests 176 and/or EMCD 171 may configure ESU 170A-R to operate in selected modes (e.g., charging, discharging, and/or steady state), follow scheduled energy and/or power trajectories (e.g., follow scheduled charging trajectories and/or discharging trajectories), and/or the like. The controller 148 may configure the power system infrastructure 110 to receive power supplied by selected PGU 120A-R and/or ESU 170A-R, supply power to the load 130 and/or selected ESU 170A-R, and so on, as disclosed herein (e.g., by use of commands 168 and/or IMCD 111).

Figure 15:
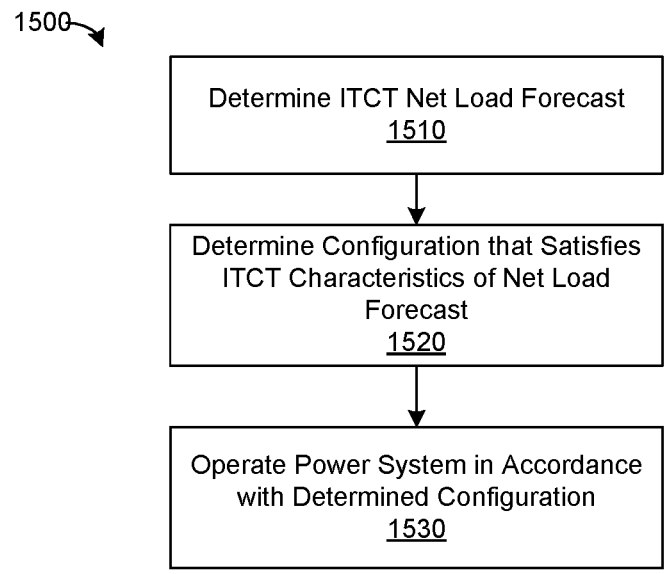
FIG. 15 is a flow diagram of one embodiment of a method for managing power and/or energy storage resources of a power system.

FIG. 15 is a flow diagram of one embodiment of a method 1500 for managing a power system 100 that comprises and/or is capable of being electrically coupled to one or more ESU 170A-R. Step 1510 may comprise determining an inter-interval, inter-temporal, and/or continuous-time net load forecast for the power system 100 during an operating period (e.g., ITCT load profile 155), as disclosed herein. The ITCT load profile 155 may be based on a plurality of net load forecast quantities, each forecasting a net load on the power system 100 at a respective time and/or during a respective interval. Step 1510 may comprise monitoring the power system 100 during a current operating period and/or one or more previous operating periods, maintaining monitoring data 152, determining a load profile 154, and/or the like, as disclosed herein. The monitoring data 152 may comprise a plurality of data samples and/or measurements (e.g., net load measurements). The data samples and/or measurements may correspond to a particular sample period (e.g., every N seconds, every hour, and/or the like). Step 1510 may comprise determining net load quantities to forecast the net load on the power system 100 at respective times and/or during respective time intervals, as disclosed herein.

In some embodiments, step 1510 comprises determining an ITCT load profile 155 corresponding to a sequence of net load forecast quantities (of the load profile 154), each defining a constant, linear, and/or piecewise linear net load on the power system 100 during a respective time interval. Step 1510 may comprise modeling variances to the net load within one or more of the time intervals. Step 1510 may comprise modeling non-linear variances in the net load, as disclosed above. In some embodiments, step 1510 may comprise modeling, expanding, and/or projecting the samples into a higher-order function space (e.g., cubic splines). In some embodiments, step 1510 comprises projecting the net load quantities into a cubic Hermite function space.

Step 1520 may comprise determining a PGU configuration 162 for the power system 100. Step 1520 may comprise determining the PGU configuration 162 to select, configure, and/or schedule PGUs 120A-N supply power to the power system 100 during the operating period. Step 1520 may further comprise scheduling ESU 170A-R to selectively draw and/or supply power to the power system 100. The power system configuration 160 may comprise a PGU configuration 162 adapted to select, configure, and/or schedule PGUs 120A-N during the operating period and an ESU configuration 172 adapted to select, configure, and/or schedule ESU 170A-R during the operating period. Step 1520 may comprise scheduling generation trajectories of respective PGU 120A-N and/or power trajectories of respective ESU 170A-R, such that a model of the scheduled capacity of the power system satisfies the net load forecast for the power system 100 (e.g., MSC(t)=$(\Sigma_K G_k^P + \Sigma_R G_k^S(t) - \Sigma_R D_k^S(t)) \geq N(t)$, as disclosed above). Step 1520 may further comprise determining an optimal power system configuration 160 that minimizes a total cost metric for satisfying the net load forecast of the operating period (subject to ITCT constraints of the PGU 120A-N, ESU 170A-R, and/or power system infrastructure 110).

Step 1530 may comprise operating the power system 100 during the operating period in accordance with the PGU configuration 162 determined at step 1520. Step 1530 may comprise issuing the PGU requests 166 to one or more of the PGUs 120A-N to commit (e.g., schedule) power generation. The PGU requests 166 may further specify an operating configuration of the PGUs 120A-N, such as generation characteristics (e.g., how much power to generate at particular times), ramping characteristics (e.g., how fast to ramp up power generation), and so on. Step 1530 may further comprise configuring ESU 170A-R to selectively draw power from the power system 100 and/or supply power to the power system 100 (in accordance with the ESU configuration 172 of the power system configuration 160). Step 1530 may comprise issuing ESU requests 176 to one or more of the ESU 170A-R to configure the ESU 170A-R to operate in selected states (e.g., charging, discharging, steady state, and/or the like), draw specified amount(s) of power from the power system 100, supply specified amounts of power to the power system 100, and/or the like.

Figure 16:
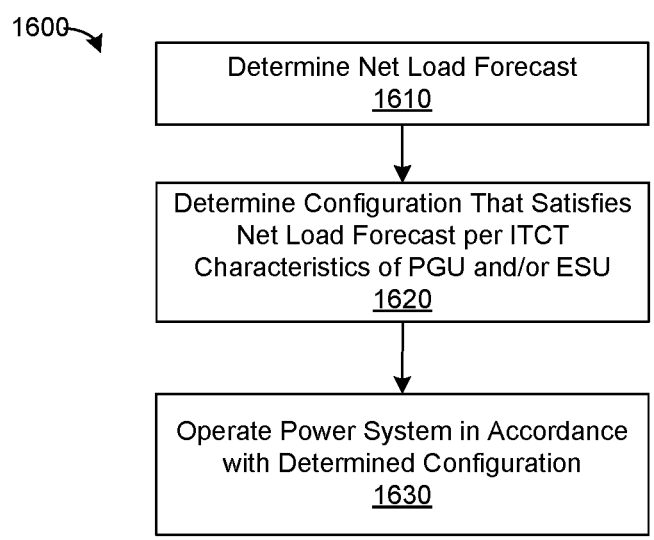
FIG. 16 is a flow diagram of another embodiment of a method for managing power and/or energy storage resources of a power system.

FIG. 16 is a flow diagram of another embodiment of a method 1600 for managing a power system 100 that comprises and/or is capable of being electrically coupled to one or more ESU 170A-R. Step 1610 may comprise determining a load profile 154 for the power system 100 as disclosed herein. The load profile 154 may comprise a sequence of net load quantities, each forecasting a load on the power system 100 at a particular time and/or during a particular time interval. Step 1610 may comprise determining and/or modeling inter-interval variance in the load profile 154, as disclosed herein. The inter-interval variances may comprise non-linear variations of the net load between respective net load quantities. In some embodiments, step 1610 may comprise determining an ITCT load profile 155 for the power system 100, as disclosed herein.

Step 1620 may comprise determining a power system configuration 160 to satisfy the load profile 154 (and/or ITCT load profile 155) determined for the power system 100, as disclosed herein. Step 1620 may comprise selecting, scheduling, and/or configuring PGUs 120A-N and/or ESU 170A-R during the operating period. Step 1620 may comprise accessing generation and/or ramping characteristics of respective PGUs 120A-N, which may define ITCT generation and/or ramping characteristics of respective PGUs 120A-N(e.g., generation and/or ramping constraints). Step 1620 may further comprise accessing energy and/or power trajectory characteristics of respective ESU 170A-R, which may define ITCT power, charging, discharging, and/or ramping characteristics of respective ESU 170A-R (e.g., power, charging, discharging, and/or ramping constraints). Step 1620 may comprise selecting, scheduling, and/or configuring the PGU 120A-N to generate power for the power system 100 in accordance with the generation and/or ramping characteristics thereof. Step 1620 may further comprise selecting, scheduling, and/or configuring the ESU 170A-R to selectively draw power from the power system 100 and/or supply power to the power system in accordance with the power, charging, discharging, and/or ramping characteristics thereof. Step 1620 may comprise modeling a scheduled capacity of the power system 100, such that MSC(t)= $(\Sigma_K G_k^P + \Sigma_R G_k^S(t) - \Sigma_R D_k^S(t)) \geq N(t)$, as disclosed above.

Step 1620 may comprise determining an optimal power system configuration 160, which may comprise determining a PGU configuration 162 and/or ESU configuration 172 that satisfies the net load forecast at minimal cost over the operating period. Step 1620 may comprise determining and/or accessing ITCT cost metrics for power generated by respective PGU 120A-N, utility metrics for power stored by respective ESU 170A-R, and/or cost metrics for power discharged from respective ESU 170A-R. The cost metrics may be a function of demand (e.g., model of the scheduled capacity and/or the net load forecast). Step 1620 may comprise storing energy in ESU 170A-R during low-demand periods (from lower-cost power supplied by respective PGU 120A-N) and/or supplying energy from ESU 170A-R during high-demand periods (rather than using higher-host power supplied from the PGU 120A-N). The cost metrics may incorporate marginal and/or ramping costs of respective PGU 120A-N, as disclosed herein.

Step 1630 may comprise managing real-time operation of the power system 100 in accordance with the power system configuration 160 determined at step 1620, as disclosed herein.

Figure 17:
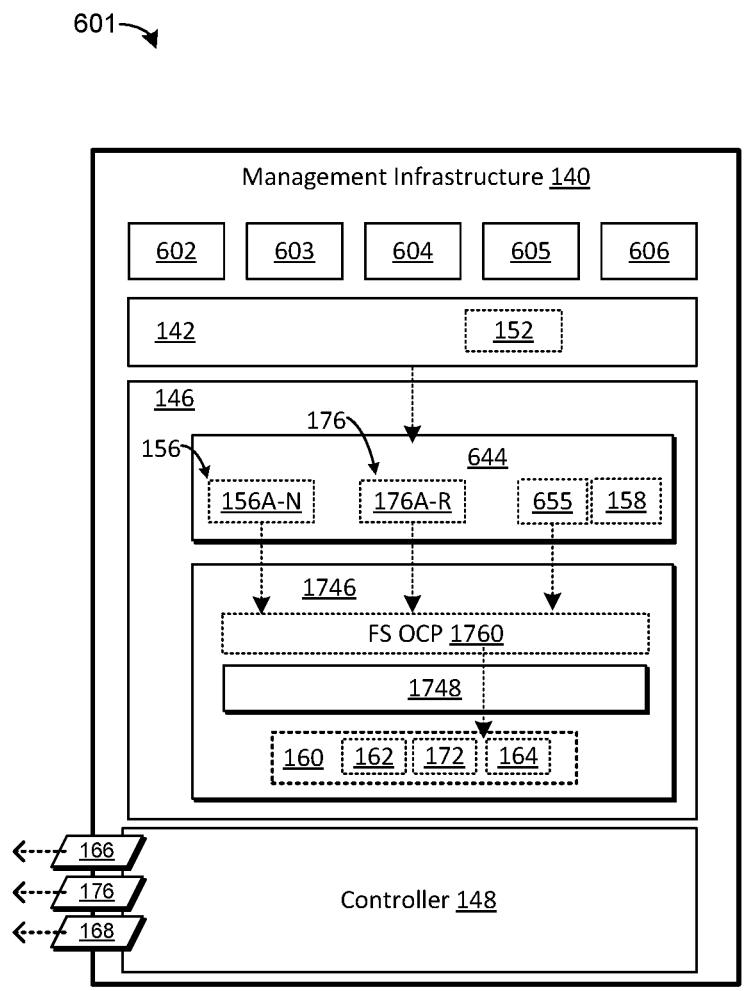
FIG. 17 is a block diagram of one embodiment of an apparatus for managing a power system comprising and/or capable of being electrical coupled to one or more energy storage units.

Determining an optimal power system configuration 160 may comprise determining a continuous-time energy generation and storage schedule that satisfies a continuous-time net load forecast at minimal cost (and subject to various constraints). FIG. 17 is a schematic block diagram of another embodiment of management infrastructure 140 configured to control a power system 100 that comprises and/or is capable of being electrically coupled to K PGU 120A-N and/or R ESU 170A-R. The management infrastructure 140 may comprise and/or be implemented on a computing device (e.g., an MCD). The management infrastructure 140 may comprise processing resources 602, memory resources 603, non-transitory storage resources 604, communication resources 605, HMI components 606, and/the like, as disclosed herein.

The management infrastructure 140 may comprise a monitor 142, a manager 146, and a controller 148. The monitor 142 may be configured to monitor the power system 100, power system infrastructure 110, PGU 120A-N, ESU 170A-R, the load 130 (and/or load regions 132), and/or the like. The monitor 142 may be communicatively coupled to one or more MCD, as disclosed herein (e.g., IMCD 111, PMCD 121, EMCD 171, LMCD 131, and/or the like). The monitor 142 may be configured to determine monitoring data 152, which may comprise measurements, samples, and or quantities pertaining to a real-time net load on the power system 100 during a current operating period and/or one or more previous operating periods.

The manager 146 may comprise a modeler 644, which may be configured to determine an ITCT net load forecast 655 for respective operating periods, as disclosed herein. The modeler may be further configured to determine power system constraints and/or maintain corresponding power system metadata 158, as disclosed herein. The modeler 644 may be further configured to determine and/or maintain PGU metadata 156 pertaining to respective PGU 120 (e.g., PGM metadata 156A-N pertaining to PGU 120A-N), which may comprise, inter alia, generation and/or ramping characteristics of respective PGU 120A-N(e.g., generation and/or ramping constraints of respective PGU 120A-N). The modeler 644 may be further configured to determine and/or maintain ESU metadata 176 pertaining to respective ESU 170 (e.g., ESU metadata 176A-R pertaining to ESU 170A-R), which may comprise, inter alia, power, charging, discharging, and/or ramping characteristics of respective ESU 170A-R (e.g., power, charging, discharging, and/or ramping constraints of respective ESU 170A-R).

In some embodiments, the manager 146 may comprise a processor 1746, which may be configured to formulate the determination of optimal power system configuration 160 for the power system 100 as continuous-time optimal control problem (CT OCP). The processor 1746 may model the continuous-time generation trajectories and commitment variables (e.g., commitment status) of respective PGUs 120A-N over an operating period T as a set of vectors, $G(t)=(G_1(t), \ldots, G_n(t))^T$ and $I(t)=(I_1(t), \ldots, I_k(t))^T$. The ramping trajectories of respective PGU 120A-N may be defined as time derivatives of the corresponding generation trajectories, as follows: $\dot{G}(t)=(\dot{G}_1(t), \ldots, \dot{G}_n(t))^T$. The power trajectory of respective ESU 170 may be decomposed into charging and discharging components, as disclosed above (both of which may be modeled as positive trajectories). In charging state, the charging power and ramping trajectories of ESU 170A-R may be represented as vectors, $D^S(t)=(D_1^S(t) \ldots D_r^S(t))$, and $(\dot{D}^S(t)=(\dot{D}_1^S(t), \ldots \dot{D}_r^S(t))$, where $D^S(t)$ is the charging power trajectory of respective ESU 170A-R. In discharging state, the power generation and ramping trajectories of ESU 170A-R may are represented as vectors, $G^S(t)=(G_1^S(t), \ldots, G_R^S(t))^T$ and $\dot{G}^S(t)=(\dot{G}_1^S(t) \ldots, \dot{G}_R^S(t))^T$, respectively. The continuous-time energy trajectory of ESU 170A-R may be expressed as $E^S(t)=(E_1^S(t), \ldots, E_R^S(t))^T$.

As disclosed above, the instantaneous operating cost function of a PGU 120 may be expressed as $C^G(G_k^P(t), I_k^P(t))$, which may quantify power generation costs as a function of time (and generation trajectory), including startup and shutdown costs (per commitment status of the respective PGU 120A-N, $I_k^P(t)$, as disclosed herein). A continuous-time discharging cost of an ESU 170 may be expressed as $C^S(G_r^S(t))$, which may represent the cost of supplying energy to the power system 100 as a function of the continuous-time discharging power trajectory of the ESU 170. The charging utility of an ESU 170 may be expressed as a continuous-time charging power trajectory, as follows: $U^S(D_r^S(t))$. The cost and utility functions above may be expressed in and/or correspond to any suitable cost metric (e.g., dollars per unit of time).

The processor 1746 may be configured to formulate the CT OCP, such that state variables of the CT OCP include, but are not limited to: generation trajectories of the PGU 120A-N, charging power and/or energy trajectories of ESU 170A-R, discharging power and/or energy trajectories of ESU 170A-R, and/or the like, and the control variables of the CT OCP may include, but are not limited to: the ramping trajectories of PGU 120A-N, charging ramping trajectories of ESU 170A-R, discharging ramping trajectories of ESU 170A-R, and/or the like. The objective function of the CT OCP may be adapted to minimize the total operation cost over the operating period T subject to specified operating constraints. The operation cost over the operating period T may comprise a sum of the operating cost metric(s) of PGU 120A-N, which may be expressed as: $C^G(G(t),I(t))=\Sigma_N C^G (G_n(t),I_n(t))$, plus the total discharging cost metric(s) ESU 170A-R, which be expressed as: $C^S(G^S(t))=\Sigma_R C^S(G_r^S(t))$, minus the total charging utility metric(s) of ESU 170A-R, which may be expressed as: $U^S(D^S(t))=\Sigma_R U^S(D_r^S(t))$. The objective function of the CT OCP 1748 may be formulated per Eq. 87 below:

$$\min_{\dot{G}(t), \dot{G}^S(t), \dot{D}^S(t)} \int_T C^G(G(t), I(t))dt + \int_T C^S(G^S(t))dt - \int_T U^S(D^S(t))dt \qquad \text{Eq. 87}$$

The processor 1746 may define operating constraints for the CT OCP per Eq. 88-100, below:

$$\frac{dG(t)}{dt} = \dot{G}(t), t \in \tau, (\gamma^G(t)), \qquad \text{Eq. 88}$$

$$\frac{dG^S(t)}{dt} = \dot{G}^S(t), t \in \tau, (\gamma^{s,G}(t)), \qquad \text{Eq. 89}$$

$$\frac{dD^S(t)}{dt} = \dot{D}^S(t), t \in \tau, (\gamma^{s,D}(t)), \qquad \text{Eq. 90}$$

$$\frac{dE^S(t)}{dt} = \eta^c D^S(t) - \eta^{d-1} G^S(t), t \in \tau, (\gamma^{s,E}(t)), \qquad \text{Eq. 91}$$

$$1_K^T G(t) + 1_R^T G^S(t) = D(t) + 1_R^T D^S(t), t \in \tau, (\lambda(t)), \qquad \text{Eq. 92}$$

$$\underline{G}I(t) \leq G(t) \leq \overline{G}I(t), t \in \tau, (\underline{\nu}^G(t), \overline{\nu}^G(t)), \qquad \text{Eq. 93}$$

$$0 \leq G^S(t) \leq \overline{G}^s, t \in \tau, (\underline{\nu}^{s,G}(t), \overline{\nu}^{s,G}(t)), \qquad \text{Eq. 94}$$

$$0 \leq D^S(t) \leq \overline{D}^s, t \in \tau, (\underline{\nu}^{s,D}(t), \overline{\nu}^{s,D}(t)), \qquad \text{Eq. 95}$$

$$\underline{E}^s \leq E^s(t) \leq \overline{E}^s, t \in \tau, (\underline{\nu}^{s,E}(t), \overline{\nu}^{s,E}(t)), \qquad \text{Eq. 96}$$

$$\underline{\dot{G}}I(t) + \overline{G}^{SD} \int_{t-\epsilon}^{t+\epsilon} \dot{I}(t')dt' \leq \dot{G}(t) \leq \overline{\dot{G}}I(t) + \overline{G}^{SU} \int_{t-\epsilon}^{t+\epsilon} \dot{I}(t')dt', \qquad \text{Eq. 97}$$
$$t \in \tau, (\underline{\mu}^G(t), \overline{\mu}^G(t)),$$

$$\underline{\dot{G}}^s \leq \dot{G}^s(t) \leq \overline{\dot{G}}^s, t \in \tau, (\underline{\mu}^{s,G}(t), \overline{\mu}^{s,G}(t)), \qquad \text{Eq. 98}$$

-continued $$\underline{\dot{D}}^s \le \dot{D}^s(t) \le \overline{\dot{D}}^s, t \in \tau, (\underline{\mu}^{s,D}(t), \overline{\mu}^{s,D}(t)),$$ Eq. 99

$$G(0) = G^0, G^s(0) = G^{s,0} = D^s(0) = D^{s,0}, E^s(0) = E^{s,0}.$$ Eq. 100

The generation ramping trajectories of respective PGU 120A-N are defined in Eq. 88 (and/or may be maintained in PGU metadata 156). The discharging/charging power ramping trajectories of ESU 170A-R are defined in Eq. 89 and 90, respectively (and may be maintained in ESU metadata 176). The state equation (Eq 91) controls the state of charge of ESU 170A-R in continuous-time over the operating period T ($\eta^c$ and $\eta^d$ may comprise R×R matrices of charging and discharging efficiencies of respective ESU 170A-R). Eq. 92 may define the continuous-time balance constraint, in which $1_K$ and $1_R$ are K- and R-dimensional vectors of ones, respectively (in accordance with the number of PGU 120A-N and ESU 170A-R available within the power system 100). Eq. 93-99 may be configured to constrain the power, ramping, and energy trajectories over the operating period 7 The constant underlined and overline terms therein may represent the minimum and maximum limits of such trajectories. In Eq. 97, $\dot{I}(t) = (\dot{I}_1(t) \ldots \dot{I}_K(t))^T$, which is a time derivative of the PGU 120A-N commitment variables that model startup/shutdown of respective PGU 120A-N, where E is an infinitesimally small positive number. The constraint of Eq. 97 may be configured to facilitate ramping during startup and shutdown periods, where $\overline{G}^{SD}$ and $\overline{G}^{SU}$ are diagonal matrices of startup and shutdown ramping limits. Eq. 100 may enforce initial values of the state trajectories, where $G^0$, $G^{s,0}$, $D^{s,0}$, and $E^{s,0}$ are vectors of constant initial values.

The parenthesis in the right-hand-sides of Eq. 88-99 may show adjoint and Lagrange multiplier trajectories, wherein $\gamma^G(t)$, $\gamma^{s,G}(t)$, $\gamma^{s,D}(t)$, and $\gamma^{e,E}(t)$ denote the adjoint trajectories associated with state equations; $\underline{v}^G(t)$, $\underline{v}^{s,G}(t)$, $\underline{v}^{s,D}(t)$, $\underline{v}^{s,E}$, $\underline{\mu}^G(t)$, $\underline{\mu}^{s,G}(t)$, and $\underline{\mu}^{s,D}(t)$ denote the Lagrange multiplier trajectories associated with the minimum limit constraints, and $\overline{v}^G(t)$, $\overline{v}^{s,G}(t)$, $\overline{v}^{s,D}(t)$, $\overline{v}^{s,E}(t)$, $\overline{\mu}^G(t)$, $\overline{\mu}^{s,G}(t)$, $\overline{\mu}^{s,D}(t)$, represent Lagrange multipliers associated with the maximum limit constraints.

Vectors of the state and control variables x(t) and u(t) of the OCP of Eq. 87-100 may be defined as:

$$x(t) = (G(t); G^s(t); D^s(t); E^s(t)),$$ Eq. 101

$$u(t) = (\dot{G}(t); \dot{G}^s(t); \dot{D}^s(t)).$$ Eq. 102

The processor 1746 may determine an optimal solution of the CT OCP 1748, which may comprise determining optimal commitment variables I*(t) of the PGU 120A-N and/or ESU 170A-R that satisfy the net load forecast at minimum cost (per Eq. 87) subject to the constraints of Eq. 88-100. Valuation metrics for power generation and/or storage resources may be determined based on fixed I*(t) values, as follows:

$$\min_{u(t)} J \int_\tau F(x(t))dt,$$ Eq. 103

$$\dot{x}(t) = Ax(t) + Bu(t), t \in \tau, (\gamma(t)),$$ Eq. 104

$$C^T x(t) = D(t), t \in \tau, (\lambda(t)),$$ Eq. 105

$$\underline{x}(t) \le x(t) \le \overline{x}(t), t \in \tau, (\underline{v}(t), \overline{v}(t)),$$ Eq. 106

$$\underline{u}(t) \le u(t) \le \overline{u}(t), t \in \tau, (\underline{\mu}(t), \overline{\mu}(t)),$$ Eq. 107

$$x(0) = x^0$$ Eq. 108

In Eq. 103, J maybe the objective function defined in Eq. 87 (minimize total operating cost), F(x(t)) may represent the total operation cost of the power system over the period T. In Eq. 105, C may be defined as $(1_K; 1_R; -1_R; 0)$. A and B may be matrices of parameters as follows:

$$A = \begin{pmatrix} 0 & 0 & 0 & 0 \\ 0 & 0 & 0 & 0 \\ 0 & 0 & 0 & 0 \\ 0 & -\eta^{d-1} & \eta^c & 0 \end{pmatrix}, B = \begin{pmatrix} I_K & 0 & 0 \\ 0 & I_R & 0 \\ 0 & 0 & I_R \\ 0 & 0 & 0 \end{pmatrix},$$

The processor 1746 may configure: 1) the power generation trajectories (G(t), $G^s(t)$, $D^s(t)$) to be continuously differentiable functions of t; 2) the cost functions of the PGU 120 and/or ESU 170 to be continuous and convex functions of their arguments; 3) the charging utility functions of the ESU 170A-R to be continuous and concave functions of their arguments; and/or 4) the cost and utility functions not to be explicit functions of t. Hamiltonian and Lagrangian functions may be formulated as follows:

$$H(x(t), u(t), \gamma(t)) = (Fx(t)) + \gamma^T(t)(Ax(t) + Bu(t)),$$ Eq. 109

$$L(x(t), u(t), \gamma(t), \underline{v}(t), \overline{v}(t), \underline{\mu}(t), \overline{\mu}(t)) =$$ Eq. 110
$$H(x(t), u(t), \gamma(t)) + \underline{v}^T(t)(\underline{x}(t) - x(t)) + \overline{v}^T(t)(x(t) - \overline{x}(t)) +$$
$$\underline{\mu}^T(t)(\underline{u}(t) - u(t)) + \overline{\mu}^T(t)(u(t) - \overline{u}(t)) + \lambda(t)(D(t) - C^T x(t)).$$

The first term of Eq. 110 may comprise an instantaneous operation cost metric at time t, and the second term may comprise variations of the total operation cost metric over T with respect to the incremental changes in the state variables within an infinitesimal time interval starting from t. The processor 1746 may define optimality constraints and/or conditions per Eq. 111-123 below. The processor 1746 may define a Pontryagin Minimum Principle (PMP) constraint, in which the optimal control trajectories u*(t) minimize the Hamiltonian, as follows:

$$u^*(t) = \underset{u(t) \in \psi(x(t))}{\operatorname{argmin}} (H(x^*(t), u(t), \gamma^*(t))),$$ Eq. 111

In Eq. 111, $\psi(x(t))$ may be the set of admissible controls that satisfy the constraints of EQ. 18-22 (and/or Eq. 88-99). The processor 1746 may define adjoint equation condition(s) that require the optimal pair x*(t), u*(t) to satisfy Eq. 112 below:

$$\dot{\gamma}^*(t) = -\frac{\partial \Lambda^*}{\partial x(t)} = -\frac{\partial F(x^*(t))}{\partial x(t)} - A^T \gamma^*(t) - \overline{v}^*(t) + \underline{v}^*(t) + \lambda^*(t)C.$$ Eq. 112

The processor 1746 may further define first order conditions wherein, for the optimal pair x*(t), u*(t), the Lagrangian satisfies Eq. 113 below:

$$\frac{\partial \Lambda^*}{\partial u(t)} = B^T \gamma^*(t) + \overline{\mu}^*(t) - \underline{\mu}^*(t) = 0. \qquad \text{Eq. 113}$$

The processor 1746 may further define complimentary slackness conditions per Eq. 114 117 below:

$$\underline{v}^*_i(t)(\underline{x}_i(t) - x^*_i(t)) = 0, \underline{\mu}^*_i(t) \geq 0, i=1, \ldots, K+3R, \qquad \text{Eq. 114.}$$

$$\overline{v}^*_i(t)(\underline{x}_i(t) - \overline{x}^*_i(t)) = 0, \overline{\mu}^*_i(t) \geq 0, i=1, \ldots, K+3R, \qquad \text{Eq. 115.}$$

$$\underline{\mu}^*_i(t)(\underline{u}_i(t) - u^*_i(t)) = 0, \underline{\mu}^*_i(t) \geq 0, i=1, \ldots, K+2R, \qquad \text{Eq. 116.}$$

$$\overline{\mu}^*_i(t)(u^*_i(t) - \overline{u}_i(t)) = 0, \overline{\mu}^*_i(t) \geq 0, i=1, \ldots, K+2R, \qquad \text{Eq. 117.}$$

The processor 1746 may further define jump that require that, if a state trajectory $x_i(t)$ reaches it maximum or minimum limits at $t=\tau$, the associated adjoint function experiences discontinuities at this point, per Eq. 118-120 below:

$$\gamma^*_i(\tau^+) = \overline{\zeta}_i(\tau) - \underline{\zeta}_i(\tau) + \gamma^*_i(\tau^-), i=1, \ldots, K+3R, \qquad \text{Eq. 118.}$$

$$\overline{\zeta}_i(\tau)(x^*_i(\tau) - \overline{x}_i(\tau)) = 0, \overline{\zeta}_i(\tau) \geq 0, i=1, \ldots, K+3R, \qquad \text{Eq. 119.}$$

$$\underline{\zeta}_i(\tau)(\underline{x}_i(\tau) - x^*_i(\tau)) = 0, \underline{\zeta}_i(\tau) \geq 0, i=1, \ldots, K+3R, \qquad \text{Eq. 120.}$$

In Eq. 118-120, $\overline{\zeta}_i$ and $\underline{\zeta}_i$ may be jump values that are governed by Eq. 119 and 120. The processor 1746 may ensure that the Hamiltonian of Eq. 109 is continuous at the jump points (e.g., at r in the non-limiting example above).

The processor 1746 may further comprise transversally conditions, which may require that optimal adjoint functions satisfy the conditions defined in Eq. 121-123 at the end point of the operating period T.

$$\gamma^*_i(T) = \overline{\alpha}_i - \underline{\alpha}_i, i=1, \ldots, K+3R, \qquad \text{Eq. 121.}$$

$$\overline{\alpha}_i(x^*_i(T) - \overline{x}_i(T)) = 0, \overline{\alpha}_i \geq 0, i=1, \ldots, K+3R, \qquad \text{Eq. 122.}$$

$$\underline{\alpha}_i(\underline{x}_i(T) - x^*_i(T)) = 0, \underline{\alpha}_i \geq 0, i=1, \ldots, K+3R, \qquad \text{Eq. 123.}$$

The processor 1746 may define $\overline{\alpha}_i$ and $\underline{\alpha}_i$ of Eq. 121-123 to be equal to the values of the Lagrange multiplier of the maximum and minimum limit constraints at $t=T$.

The CT OCP formulated above of Eq. 88-123 above may comprise a continuous-time optimal control problem with an infinite dimensional decision space, which may be computationally intractable. In some embodiments, the processor 1746 is configured to solve the CT OCP using, inter alia, a function-space technique, as disclosed herein. The processor 1746 may determine a FS OCP 1760, which may comprise reducing the dimensionality of the CT decision and parameter trajectories of the CT OCP by, inter alia, modeling them in a finite-order function space spanned by Bernstein polynomials (Bernstein polynomials of degree Q, including Q+1 polynomials per Eq. 124 below:

$$b_{q,Q}(t) = \binom{Q}{q} t^q (1-t)^{Q-q}, t \in [0, 1). \qquad \text{Eq. 124}$$

Conceptually, developing the FS OCP 1760 may comprise subdividing the operating period T into M intervals $T_m = [t_m, t_{m+1})$, $\rightarrow \cup_{m=0}^{M-1} T_m$, with lengths $T_m = t_{m+1} - t_m$, and then constructing a subset of basis functions formed by the Bernstein polynomials of degree Q in each interval $T_m$. The processor 1746 may be configured to form a spline function space to represent the whole operating T (for m=0, ..., M−1; q=0, ..., Q), such that the vector of basis functions $e^{(Q)}(t) = (e_1^{(Q)}(t), \ldots, e_p^{(Q)}(t))^T$ spanning T may contain P=(Q+1)M functions with components defined per Eq. 124 below:

$$e_{m(Q+1)+q}^{(Q)}(t) = b_{q,Q}\left(\frac{t-t_m}{T_m}\right), t \in [t_m, t_{m+1}), \qquad \text{Eq. 125}$$

For avoid obscuring details to the disclosed embodiments, p is defined as p=m(Q+1)+q, where p does from 0 to (Q+1)M−1.

The processor 1746 may be configured to project the generation trajectories of respective PGU 120A-N in the Bernstein function space $e^{(Q)}(t)$ defined in Eq. 125, as follows:

$$G(t) = Ge^{(Q)}(t), \qquad \text{Eq. 126.}$$

In Eq. 126, G may be a K×P matrix of Bernstein coefficients associated with the generation trajectories of K PGU 120A-N, respectively. The processor 1746 may be configured to incorporate the ITCT net load forecast, generation ramping trajectory, capacity constraints, ramping constraints, continuity constraints, and/or generation cost metric functions of PGU 120A-N into the FS OCP 1760, as disclosed herein (e.g., by projecting into the Bernstein function space as disclosed above in conjunction with, inter alia, Eq. 2-54).

The processor 1746 may be further configured to incorporate the ITCT characteristics of ESU 170 into the FS OCP 1760 (e.g., power, charging, discharging, and/or ramping constraints). The processor 1746 may be configured to project the charging, discharging, and/or ramping trajectories of the ESU 170A-R into the space spanned by $e^{(Q)}(t)$ (Bernstein polynomials of degree Q). The power trajectories (charging and discharging trajectories) of an ESU 170 may be formulated as follows:

$$D^s(t) = D^s e^{(Q)}(t), G^s(t) = G^s e^{(Q)}(t), \qquad \text{Eq. 127.}$$

In Eq. 127, $D^s(t) = (D_1^S, \ldots, D_R^S)$ and $G^s(t) = (D_1^S, \ldots, G_R^S)$ are R×P matricies of Bernstein coefficients of charging and discharging trajectories (of respective ESU 170A-R), with the row vectors $D_r^S$ and $D_r^S$ indicating the Bernstein coreefficients of ESU device 170 r. The processor 1746 may leverage properties of Bernstein polynomials to model ESU 170 ramping and/or energy trajectory as well as operational constraints and cost metric(s), while ensuring continuity of such trajectories.

The processor 1746 may model the time derivatives of Bernstein polynomials of degree Q as a linear combination of two Bernstein polynomials of degree Q−1. The processor 1746 may define ramping trajectories respective ESU 170A-R in the FS OCP 1760, as follows:

$$\dot{D}^s(t) = D^s \dot{e}^{(Q)}(t), D^s \mathcal{M} e^{(Q-1)}(t) = \dot{D}^s e^{(Q-1)}(t), \qquad \text{Eq. 128.}$$

$$\dot{G}^s(t) = G^s \dot{e}(Q)(t), G^s \mathcal{M} e^{(Q-1)}(t) = \dot{G}^s e^{(Q-1)}(t), \qquad \text{Eq. 129.}$$

$\mathcal{M}$ may comprise a P×(P−M) matrix relating $\dot{e}^{(Q)}(t)$ with $\dot{e}^{(Q+1)}(t)$, and $\dot{D}^s$ and $\dot{G}^s$ are R×(P−M) matricies of Bernstein coefficients associated with ESU charge and discharge ramping trajectories, which may be linearly related with the Bernstein coefficients of the corresponding ESU power trajectories, as:

$$\dot{D}^s = D^s \mathcal{M}, \dot{G}^s = G^s \mathcal{M}. \qquad \text{Eq. 130.}$$

The processor 1746 may leverage a P×(P+M) linear mapping $\mathcal{N}$ between Bernstein polynomials of degree Q and Q+1 to relate the integral of $e^{(Q)}(t)$ with $e^{(Q+1)}(t)$. The processor 1746 may, therefore, integrate the state Eq. 91 over t, which may comprise deriving the projection of power trajectories of respective ESU 170A-R into the Bernstein function space (and the FS OCP 1760). The discharging an charging trajectories of ESU 170A-R may be represented in the FS OCP 1760 as follows:

$$E^s(t) = E^{s,0} + (\eta^c D^s - \eta^{d-1} G^s) \int_0^t e^{(Q)}(t')dt' \quad \text{Eq. 131}$$
$$= E^{s,0} + (\eta^c D^s - \eta^{d-1} G^s) \mathcal{N} e^{(Q+1)}(t)$$
$$= (E^{s,0} 1_{P+M} + (\eta^c D^s - \eta^{d-1} G^s) \mathcal{N}) e^{(Q+1)}(t)$$
$$= E^s e^{(Q+1)}(t),$$

In Eq. 130, $E^{s,0} 1_{P+M}^T$ may be the projection of constant initial energy values vector $E^{s,0}$ into the function space, and $E^s$ may be a $R \times (P+M)$ matrix of Bernstein coefficients of energy trajectories of respective ESU 170A-R, which may comprise:

$$E^s = E^{s,0} 1_{P+M} + (\eta^c D^s - \eta^{d-1} G^s) \mathcal{N}. \quad \text{Eq. 132}$$

The processor 1746 may be further configured to determine optimality conditions for the FS OCP 1760 corresponding to the CT OCP (per Eq. 88-99 and/or 103-108 above). The processor 1746 may ensure that the charging and discharging trajectories of ESU 170A-R comply with continuity requirements (are continuously differentiable) by, inter alia, imposing continuity constraints on the Bernstein coefficients of adjacent intervals as follows:

$$G_{r,m(Q+1)+Q}^s = G_{r,(m+1)(Q+1)}^s, m = 0, \ldots M-1, \quad \text{Eq. 133}$$

$$D_{r,m(Q+1)+Q}^s = D_{r,(m+1)(Q+1)}^s, m = 0, \ldots M-1, \quad \text{Eq. 134}$$

$$\frac{1}{T_m}(G_{r,m(Q+1)+Q}^s - G_{r,m(Q+1)+Q-1}^s) =$$
$$\frac{1}{T_{m+1}}(G_{r,(m+1)(Q+1)+1}^s - G_{r,(m+1)(Q+1)}^s),$$
$$m = 0, \ldots M-1, \quad \text{Eq. 135}$$

$$\frac{1}{T_m}(D_{r,m(Q+1)+Q}^s - D_{r,m(Q+1)+Q-1}^s) = \quad \text{Eq. 136}$$
$$\frac{1}{T_{m+1}}(D_{r,(m+1)(Q+1)+1}^s - D_{r,(m+1)(Q+1)}^s), m = 0, \ldots M-1.$$

The processor 1746 may be further configured to leverage the convex hull property of Bernstein polynomials to impose inequality constraints on the energy, power and/or ramping trajectories of respective ESU 170A-R. More specifically, let R be the control polygon formed by the Bernstein coefficients $E_r^S$ of the continuous-time energy trajectory of ESU 170r in the space spanned by $e^{(Q+1)}(t)$. The processor 1746 may utilize the convex hull property that the energy trajectory $E_r^S(t)$ will never be outside of the convex hull of the control polygon R, such that the minimum and maximum of the Bernstein coefficients in interval m represent the lower and upper bound for the continuous-time energy trajectories within that interval. The processor 1746 may, therefore, impose continuous-time inequality constraints on the energy trajectories of respective ESU 170A-R by limiting the Bernstein coefficients at each interval as follows:

$$\underline{E}_r^s \leq E_{r,m(Q+2)+q}^s \leq \overline{E}_r^s, \forall q, \forall m, \forall r. \quad \text{Eq. 137}$$

In Eq. 137, $\underline{E}_r^s$ and $\overline{E}_r^s$ are the minimum and maximum energy capacity of ESU 170r. Similar constraints may be defined for charging and discharging trajectories, as well as ramping trajectories (e.g., for imposing constraints corresponding to the continuous-time power and ramping constraints of the CT OCP in the FS OCP 1760).

Figure 18:
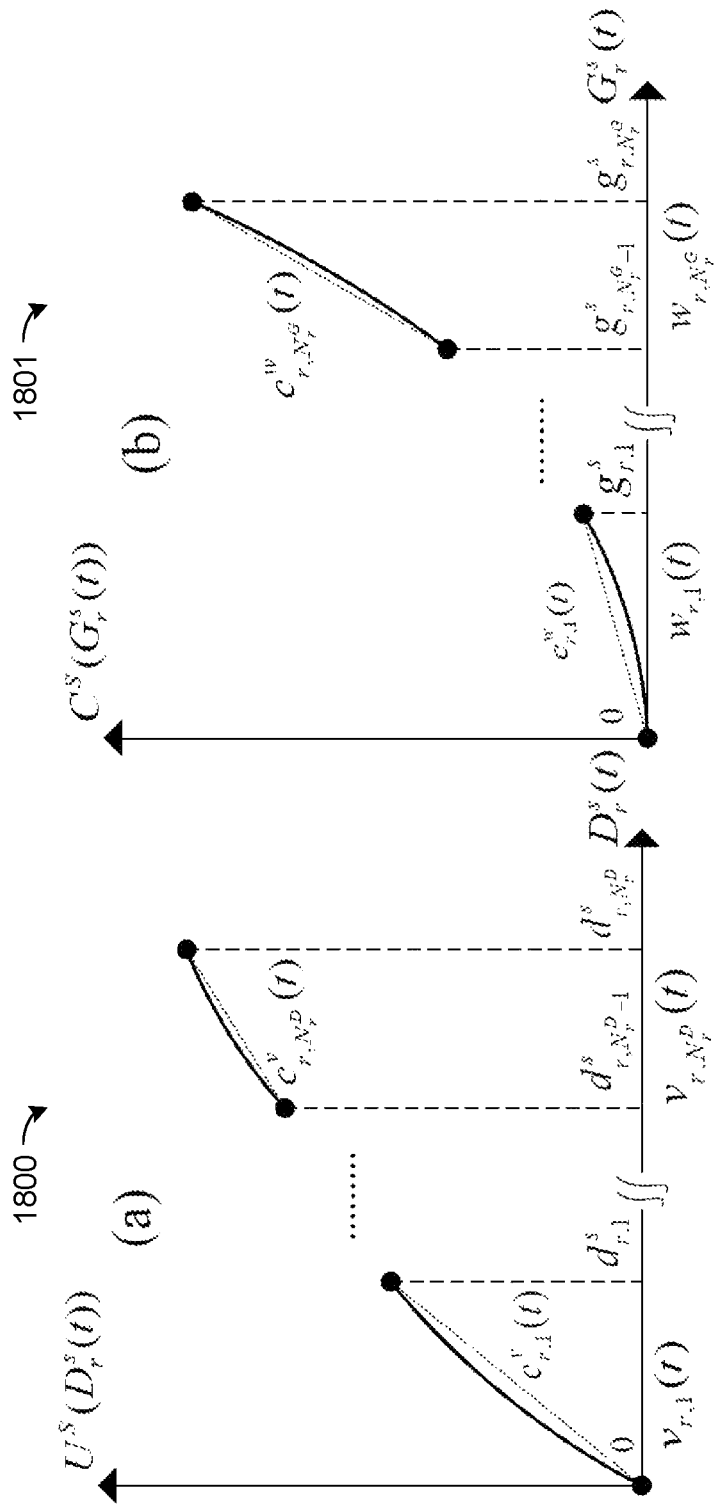
FIG. 18 depicts exemplary discharge utility and charge cost metrics.

The processor 1746 may be further configured to project ESU charging utility and/or discharging cost metrics into the FS OCP 1760. The charging utility and discharging cost functions of the ESU 170A-R are convact and convex nonlinear functions of the of the charging and discharging power trajectories thereof. The processor 1746 may be configured to linearize the nonlinear utility and cost functions of ESU 170A-R for use within the FS OCP 1760 (and/or use for market participation of ESU 170A-R in which ESU 170A-R submit multiple price-quantity pairs for charging and discharging). FIG. 18 comprises a plot 1800 of an exemplary utility function $(U^S(D_r^s(t)))$ of ESU 170r, and a plot 1801 of an exemplary cost function of ESU 170r $(C^S(G_r^s(t)))$. The processor 1746 may divide the charging power capacity to $N_r^D$ segments using intermediate points thereof (e.g., $d_{r,0}^s=0, d_{r,1}, \ldots, {}^s d_{r,N_r^D} = \overline{D}_r^s$), and the discharging power capacity to $N_r^G$ segments using intermediate points thereof (e.g., $d_{r,0}^s=0, d_{r,1}, \ldots, {}^s d_{r,N_r^D} = \overline{D}_r^s$). The processor 1746 may define positive continuous-time auxiliary variables $v_{r,h}(t)$ and $w_{r,h}(t)$ to model charging and discharging power trajectories of ESU 170r as follows:

$$D_r^s(t) = \sum_{h=1}^{N_r^D} v_{r,h}(t) = 1_{N_r^D}^T V_r(t), \quad \text{Eq. 138}$$

$$G_r^s(t) = \sum_{j=1}^{N_r^G} w_{r,j}(t) = 1_{N_r^G}^T W_r(t), \quad \text{Eq. 139}$$

In Eq. 138 and 139, $V_r(t)$ and $W_r(t)$ may be, respectively, $N_r^D$ and $N_r^G$ dimensional vectors of auxiliary variables associated with the changing and discharging power trajectories; and $1_{N_r^D}$ and $1_{N_r^G}$ may be, respectively, $N_r^D$ and $N_r^G$ dimensional vectors of ones. The processor 1746 may approximate the nonlinear charging utility and/or discharging cost functions $U^S(D_r^s(t))$ and $C^S(G_r^s(t))$ with the linearized cost functions $\hat{U}^S(V_r(t))$ and $\hat{C}^S(W_r(t))$, in terms of the auxiliary variables, as follows:

$$U^S(D_r^s(t)) \approx \hat{U}^S(V_r(t)) = \sum_{h=1}^{N_r^D} c_{r,h}^v(t) V_{r,h}(t), \quad \text{Eq. 140}$$

$$C^S(G_r^s(t)) \approx \hat{C}^S(W_r(t)) = \sum_{j=1}^{N_r^G} c_{r,j}^w(t) W_{r,j}(t), \quad \text{Eq. 140}$$

In Eq. 140 and 141, $c_{r,h}^v(t)$ and $c_{r,j}^w(t)$ may be charging and discharging cost coefficients, respectively. The processor 1746 may model the linear functions $\hat{U}^S(V_r(t))$ and $\hat{C}^S(W_r(t))$ in the Bernstein function space (of FS OTC 1760) by, inter alia, expanding the auxiliary variables in the space spanned by the Bernstein basis function of degree Q, as follows:

$$v_{r,h}(t) = v_{r,h} e^{(Q)}(t), W_{r,j}(t) = w_{r,j} e^{(Q)}(t), \quad \text{Eq. 142}$$

In Eq. 142, $v_{r,h}$ and $w_{r,j}$ may be vectors of Bernstein coefficients. In accordance with Eq. 138 and 139 above, the processor 1746 may relate the Bernstein coefficients of charging and discharging power trajectories to the corresponding auxiliary variables, by:

$$D_r^s = \sum_{h=1}^{N_r^D} v_{r,h}, G_r^s = \sum_{j=1}^{N_r^G} v_{r,j}, \quad \text{Eq. 143}$$

In Eq. 143, $G_r^s$ and $D_r^s$ may be the $r^{th}$ rows of matrices $G^s$ and $D^s$ defined in Eq. 127. The processor 1746 may be configured to constrain the limits of the Bernstein coefficients of the auxiliary variables, as:

$$0 \leq v_{r,j} \leq (d_{r,h}^s - d_{r,h-1}^s) 1_P, \forall r, \forall h, \quad \text{Eq. 144}$$

$$0 \leq w_{r,j} \leq (g_{r,j}^s - g_{r,j-1}^s) 1_P, \forall r, \forall j. \quad \text{Eq. 145}$$

In Eq. 144 and 145, $i_P$ may be a P-dimensional vector of ones 1. Substituting the Bernstein representations of auxiliary variables from Eq. 142 in Eq. 140 and 141, and integrating the right-hand sides over the operating period T, we calculate the linear charging utility and discharging cost functions of ESU 170r over T in terms of the Bernstein representation of the auxiliary variables, as:

$$\int_\tau \hat{U}^S(V_r(t))dt = \sum_{m=0}^{M-1} \frac{T_m}{Q+1} \sum_{h=1}^{N_r^D} c_{r,h,m}^v \sum_{q=0}^{Q} v_{r,h,m(Q+1)+q},$$ Eq. 146

$$\int_\tau \hat{C}^S(W_r(t))dt = \sum_{m=0}^{M-1} \frac{T_m}{Q+1} \sum_{j=1}^{N_r^G} c_{r,j,m}^w \sum_{q=0}^{Q} w_{r,j,m(Q+1)+q},$$ Eq. 147

The processor 1746 may set the cost coefficients $C_{r,h,m}^v \equiv c_{r,h}^v(t_m)$ and $C_{r,h,m}^w \equiv c_{r,h}^w(t_m)$ to be constant within each interval m.

The processor 1746 may be further configured to project power balance constraints that incorporate ESU power trajectories into the FS OCP 1760. As disclosed above, the continuous-time net load forecast may comprise a continuous-time net load trajectory. The processor 1746 may represent the net load trajectory spanned over the Bernstein function space of degree Q as:

$$D(t) = De^{(Q)}(t),$$ Eq. 148.

In Eq. 148, D may be a P-dimensional row vector of Bernstein coefficients. The processor 1746 may derive a function space representation of the power balance constraint for the FS OCP 1760 by, inter alia, substituting the Bernstein models of charging and discharging trajectories from Eq. 127-129 and the net load trajectory from Eq. 77 into the continuous-time power balance constraint of Eq. 92, as follows:

$$(1_K^T G + 1_R^T G^s - 1_R^T D^s)e^{(Q)}(t) = De^{(Q)}(t).$$ Eq. 149.

Eliminating $e^{(Q)}(t)$ from both sides yields:

$$1_K^T G + 1_R^T G^s - 1_R^T D^s = D,$$ Eq. 150.

Eq. 150 may comprise a conversion of the continuous-time power balance constraint(s) of Eq. 92 to algebraic equations on the Bernstein coefficients (of the FS OCP 1760). The processor 1746 may, therefore, model charging and discharging trajectories of ESU 170A-R in the FS OCP 1760, along with the Bernstein models of the PGU 120A-N, disclosed above. The processor 1746 may, therefore, be configured to convert the CT OCP of Eq. 87-123 into a FS OCP 1760, which may solved using MILP techniques (with the Bernstein coordinates of decision trajectories, e.g., commitment status of respective PGU 120A-N and/or ESU 170A-R as variables). The processor 1746 may comprise a MILP engine 1748 configured to, inter alia, solve the FS OCP 1760. The optimal solution to the FS OCP 1760 may comprise a power system configuration 160 adapted to schedule PGU 120A-N and/or ESU 170A-R to satisfy the ITCT net load forecast 655 at minimal cost per cost metrics of generation trajectories of respective PGU 120A-N, utility metrics of charging trajectories of respective ESU 170A-R, and/or cost metrics of discharging trajectories of the respective ESU 170A-R. The generation trajectories of the PGU configuration 162 may correspond to the ITCT characteristics of respective PGU 120A-N(e.g., comply with generation and/or ramping constraints of the PGU 120A-N). The power trajectories of the ESU configuration 172 may correspond to the ITCT characteristics of respective ESU 170A-R (e.g., comply with power trajectory constraints, charging constraints, charge ramping constraints, discharging constraints, and/or discharge ramping constraints of the respective ESU 170A-R. The controller 147 may use the optimal power system configuration 160 determined by the MILP engine 148 to manage real-time operation of the power system 100, as disclosed herein.

The function space of Eq. 125 may include $e^{(0)}(t)$ formed by the Bernstein polynomials of degree 0, and which may model the piecewise constant trajectories associated with the conventional, discrete-time scheduling techniques, disclosed above. Accordingly, the processor 1746 may be configured to support conventional, discrete-time, hourly UC modeling by, inter alia, selecting Bernstein polynomials of degree 0 as the function space of the FS OCP 1760.

Figure 19:
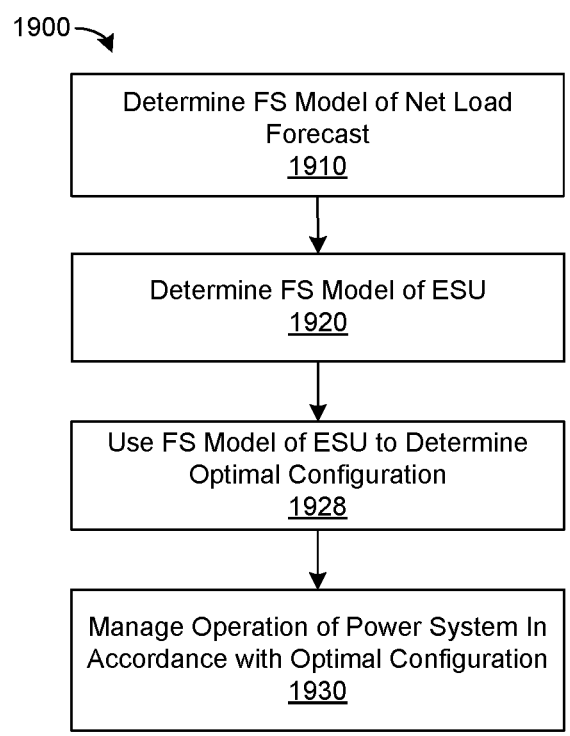
FIG. 19 is a flow diagram of one embodiment of another embodiment method for managing a power system.

FIG. 19 is a flow diagram of another embodiment of a method 1900 for managing a power system that comprises and/or is capable of being electrically coupled to one or more ESU 170A-R. Step 1910 may comprise determining a function space representation of a net load forecast for an operating period T. Step 1910 may comprise determining a ITCT net load forecast, projecting the ITCT net load forecast into a function space (e.g., Bernstein polynomials of degree Q), as disclosed herein.

Step 1920 may comprise determining a function space model of respective ESU 170A-R. Step 1920 may comprise modeling continuous-time energy trajectory characteristics, power trajectory characteristics, charging trajectory characteristics, charge ramping characteristics, discharging trajectory characteristics, and/or discharge ramping characteristics of respective ESU 170A-R into the function space (e.g., Bernstein polynomials of degree Q), as disclosed herein. Step 1920 may comprise expressing charging and discharging trajectories of respective ESU 170A-R in a function space spanned by $e^{(Q)}(t)$ (e.g., as disclosed above in conjunction with Eq. 127). Step 1920 may further comprise determining ramping trajectories of respective ESU 170A-R by, inter alia, expressing time derivatives of the energy trajectories as linear combinations of two Bernstein polynomials of degree Q−1, having respective Bernstein coefficients (e.g., per Eq. 128-130, disclosed above). Step 1920 may further comprise deriving projection(s) of energy trajectories of the ESU 170A-R (having corresponding Bernstein coefficients) by, inter alia, integrating the state Eq. 91 over t (e.g., as disclosed above in conjunction with Eqs. 131-136). Step 1920 may comprise defining and/or enforcing one or more constraints, such as the inequality constraints on energy, charging, discharging, and/or ramping trajectories as disclosed above in conjunction with Eq. 137

Step 1920 may further comprise determining FS utility and/or cost function(s) for respective ESU 170A-R, which may comprise modeling charge utility functions of respective ESU 170A-R in the function space, modeling discharge cost functions of respective ESU 170A-R in the function space, and/or the like. The utility and/or cost functions may be derived from nonlinear functions of the charging and discharging trajectories of respective ESU 170A-R (e.g., as disclosed above in conjunction with FIG. 18 and Eqs. 138-147).

Step 1928 may comprise using the FS model of the ESU 170A-R to determine an optimal power system configuration 160. Step 1928 may comprise formulating a CT OCP configured to minimize cost metrics across the operation period T as a FS OCP. Step 1928 may comprise modifying the continuous-time power balance constraint of Eq. 92 to incorporate the FS model of the net load forecast (as determined at step 1920) and the FS model of the ESU 170A-R (as determined at step 1920). Step 1928 may comprise deriving Eq. 150 above. Step 1928 may further comprise incorporating FS models of the generation and/or ramping trajectories of the PGU 120A-N, cost functions of the respective PGU 120A-N, and/or power system constraints, into Eq. 150. Step 1928 may comprise converting the CT OTP problem of Eq. 87-108 into a FS OCP 1760 in which continuous-time power balance constraint(s) are converted to algebraic equations on Bernstein coefficients. Step 1928 may comprise determining an optimal power system configuration 160 by, inter alia, using MILP techniques to solve the FS OCP 1760.

Step 1930 may comprise using the optimal configuration determined at step 1928 (the optimal power system configuration 160) to manage real-time operation of the power system 100, as disclosed herein.

Figure 20:
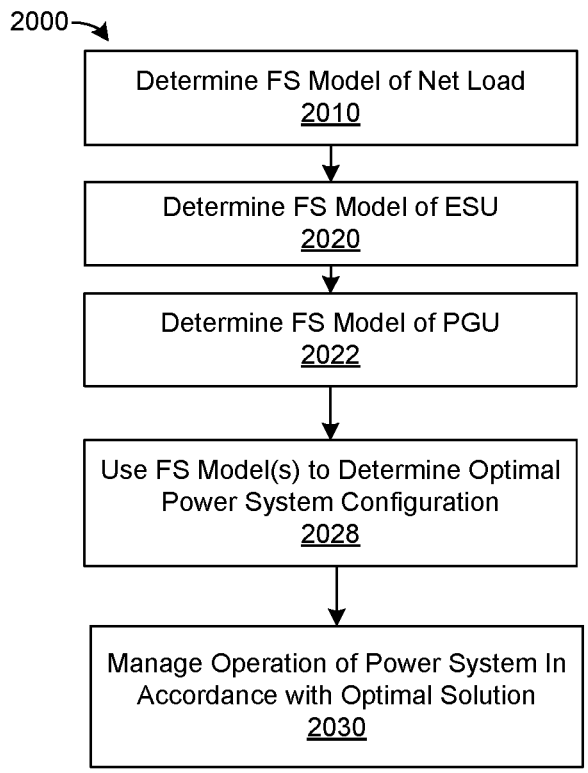
FIG. 20 is a flow diagram of one embodiment of another embodiment method for managing a power system.

FIG. 20 is a flow diagram of another embodiment of a method 2000 for managing a power system that comprises and/or is capable of being electrically coupled to one or more ESU 170A-R. Step 2010 may comprise determining a function space representation of a net load forecast for an operating period T, as disclosed herein. Step 2022 may comprise determining a function space model of respective ESU 170A-R. Step 2022 may comprise modeling continuous-time energy trajectory characteristics, power trajectory characteristics, charging trajectory characteristics, charge ramping characteristics, discharging trajectory characteristics, discharge ramping characteristics, charge utility metrics, and/or discharge cost metrics of respective ESU 170A-R, as disclosed herein.

Step 2022 may comprise determining FS models of PGU 120A-N. Step 2022 may comprise determining FS model(s) of generation trajectories, ramping trajectories, cost metrics, and/or the like, of respective PGU 120A-N, as disclosed herein (e.g., in accordance with Eq. 2-54 above).

Step 2028 may comprise using the FS model(s) determined at steps 2010, 2020, and/or 2022 to, inter alia, determine an optimal power system configuration 160 for the operating period T. Step 2028 may comprise formulating an FS OCP 1760 that incorporates: the FS model of the net load trajectory (determined at step 2010), the FS model(s) of the ESU 170A-R (determined at step 1920), and the FS model(s) of the PGU 120A-N (determined at step 1922). Step 2028 may comprise solving the FS OCP 1760 using MILP techniques (e.g., using MILP engine 1748). Solving the FS OCP 1760 may comprise determining a PGU configuration 162 and/or ESU configuration 172 that satisfies the FS net load profile at minimum cost (subject to constraints pertaining to the power system 100, PGU 120A-N and/or ESU 170A-R).

Step 2030 may comprise managing operation of the power system 100 in accordance with the optimal power system configuration 160 determined at step 2028, as disclosed herein.

Figure 21:
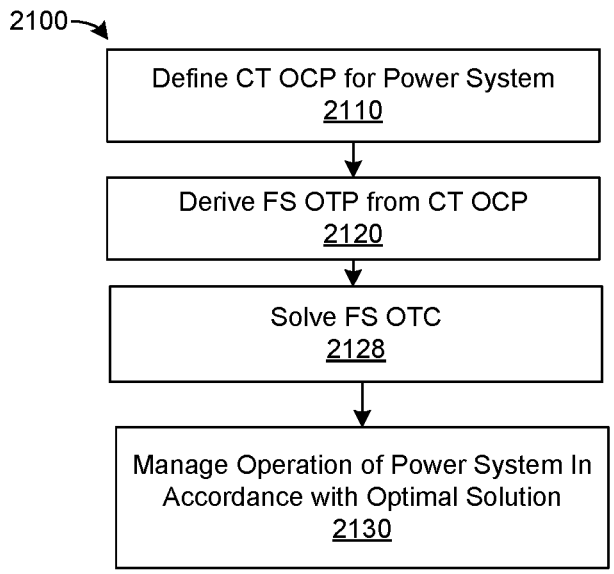
FIG. 21 is a flow diagram of one embodiment of another embodiment method for managing a power system.

FIG. 21 is a flow diagram of another embodiment of a method 2100 for managing a power system that comprises and/or is capable of being electrically coupled to one or more ESU 170A-R. Step 2110 may comprise formulating a continuous-time optimal control problem (CT OCP) configured to minimize operating cost of a power system 100 comprising PGU 120A-N and/or ESU 170A-R over an operating period T in accordance with constraints including, but not limited to, a continuous-time net load trajectory, a power balance constraint, power system constraints, PGU 120 generation trajectory and/or ramping constraints, ESU 170 power trajectory, charging trajectory, discharging trajectory, and/or ramping constraints, and/or the like. Step 2110 may comprise formulating an CT OCP as disclosed above in conjunction with Eq. 87-108. Step 2110 may comprise determining continuous-time generation and/or ramping constraints of respective PGU 120A-N, determining continuous-time power, charging, discharging, and/or ramping constraints of respective ESU 170A-R, and/or the like. Step 2110 may further comprise determining continuous-time cost function(s) for respective PGU 120A-N, and utility and/or cost functions for respective ESU 170A-R.

Step 2120 may comprise deriving a function space optimal control problem (FS OCP 1760) corresponding to the CT OTP. Step 2120 may comprise projecting the continuous-time net load trajectory, continuous-time characteristics of PGU 120A-N, and/or continuous-time characteristics of ESU 170A-R into a function space, such as Bernstein polynomials of degree Q. Step 2120 may comprise projecting PGU 120 generation trajectory constraints, ramping trajectory constraints, PGU cost functions, and/or the like into the function space. Step 2120 may further comprise projecting ESU 170 power trajectory constraints, charging trajectory constraints, charge ramping constraints, chare utility functions, discharging trajectory constraints, discharge ramping trajectory constraints, charge cost functions, and/or the like, into the function space. Step 2120 may comprise converting the CT OCP into an FS OCP 1760, as disclosed herein. Step 2120 may comprise converting the CT OCP of Eq. 87-123 into a FS OCP 1760, which may solved using MILP techniques (with the Bernstein coordinates of decision trajectories, e.g., commitment status of respective PGU 120A-N and/or ESU 170A-R as variables). Step 2120 may comprise substituting FS models of the net load trajectory, PGU 120A-N, and/or ESU 170A-R into the power balance constraint of Eq. 92, to formulate an MILP problem in which the Bernstein coordinates of the decision trajectories are variables (e.g., the commitment status of PGU 120A-N and/or operating state of ESU 170A-R are variables).

Step 2128 may comprise solving the FS OCP 1760 derived at step 2110. Step 2128 may comprise solving the FS OCP 1760 by use of, inter alia, MILP techniques (e.g., an MILP engine 1748). Step 2128 may comprise determining an optimal solution to the FS OCP 1760, which may comprise and/or correspond to an optimal power system configuration 160 for operation of the power system 100 over the operating period T.

Step 2130 may comprise managing real-time operation of the power system in accordance with the optimal solution to the FS OCP 1760 determined at step 2128 (e.g., the optimal power system configuration 160), as disclosed herein.

Referring back to FIG. 14, the manager 146 may be further configured to determine valuation metrics for power generation and/or storage based on, inter alia, the net load trajectory, generation and/or ramping trajectories of PGU 120A-N, power, charging, discharging, and/or ramping trajectories of ESU 170A-R, and/or the like. The manager 146 may comprise a valuation manager 1450 which may be configured to, inter alia, determine a marginal valuation metric of power generation and/or storage, which may be defined as a cost to serve a next increment of load 130 in a power system 100 that is economically operated (e.g., in accordance with an optimal power system configuration 160), as disclosed herein. The marginal valuation may be based on incrementing the load trajectory D(t) of the power system 100 at time $t \in T$ by an infinitesimally small $C^1$ localized trajectory, $\delta D(t)$, which is present in the incremental time interval from t to t+δt and vanishes at the end points of the interval. This incremental variation may be sufficiently small that an optimal solution still exists and involves the same binding inequality constraints. The incremental load variation δD(t) may result in incremental changes to the optimal state and control trajectories x*(t) and u*(t), as well as the total operation cost F(x*(t)). The valuation manager 1450 may define a value function, V(x*(t)), as a cost incurred when starting from state x*(t) at time t and optimally control the system to the end of T, as follows $$V(x^*(t)) = \min_{u(t') | t \in (t,t')} \int_t^T F(x(t'))dt' = \int_t^T \Lambda^* dt', \forall t \in \tau, \quad \text{Eq. 151}$$

In Eq. 151, L* is the optimal value f the Lagrangian. The value function V(x*(t)) may be a $C^2$ function of the state trajectories and a monotonically decreasing differentiable function of time. Thus, the rate of change in the optimal objective functional of Eq. 103-108 in an infinitesimal time period δt may be equal to the minus time derivative of the value function, e.g., $-\dot{V}(x^*(t)) = L^*$. Hence, the rate at which the optimal objective functional changes due to an incremental change at load from time t to t+δt may be the rate of change in the optimal Lagrangian of Eq. 110 with respect to infinitesimal change(s) in load at time t, e.g., $\frac{\partial L^*}{\partial D(t)}$.

The valuation manager 1450 may characterize the continuous-time marginal value metric of energy generation and storage per Eq. 152-155 below. For optimal pair x*(t) and u*(t), the optimal Lagrange multiplier trajectory, λ*(t) defined in Eq. 152 is the continuous-time marginal price of energy generation and storage.

$$\lambda^*(t) = \frac{\partial L^*}{\partial D(t)} \forall t \in \tau, \quad \text{Eq. 152}$$

The valuation manager 1450 may calculate $$\frac{\partial L^*}{\partial D(t)}$$

by taking partial derivative of the optimal Lagrangian of Eq. 110 with respect to the load variation, as follows:

$$\frac{\partial L^*}{\partial D(t)} = \frac{\partial F(x^*(t))}{\partial D(t)} + \frac{\partial \gamma^{*T}(t)}{\partial D(t)}(Ax^*(t) + Bu^*(t)) + \quad \text{Eq. 153}$$
$$\gamma^{*T}(t)A\frac{\partial x^*(t)}{\partial D(t)} + \gamma^{*T}(t)B\frac{\partial u^*(t)}{\partial D(t)} + (\overline{v}^*(t) - \underline{v}^*(t))^T\frac{\partial x^*(t)}{\partial D(t)} +$$
$$\frac{\partial \overline{v}^{*T}(t)}{\partial D(t)}(x^*(t) - \overline{x}(t)) + \frac{\partial \underline{v}^{*T}(t)}{\partial D(t)}(\underline{x}(t) - x^*(t)) +$$
$$\frac{\partial \overline{\mu}^{*T}(t)}{\partial D(t)}(u^*(t) - \overline{u}(t)) + \frac{\partial \underline{\mu}^{*T}(t)}{\partial D(t)}(\underline{u}(t) - u^*(t)) +$$
$$(\overline{\mu}^{*T}(t) - \underline{\mu}^{*T}(t))\frac{\partial u^*(t)}{\partial D(t)} + \lambda^*(t) - \lambda^*(t)C^T\frac{\partial x^*(t)}{\partial D(t)}.$$

Eliminating the zero terms and applying the complimentary slackness conditions (above), Eq. 153 may be reformulated as:

$$\frac{\partial \Lambda^*}{\partial D(t)} = \lambda^*(t) + \frac{\partial \gamma^{*T}(t)}{\partial D(t)}(Ax^*(t) + Bu^*(t)) + \quad \text{Eq. 154}$$
$$(B^T\gamma^*(t) + \overline{\mu}^*(t) - \underline{\mu}^*(t))^T\frac{\partial u^*}{\partial D(t)} +$$
$$\left(\frac{\partial F(x^*(t))}{\partial x(t)} + A^T\gamma^*(t) + \overline{v}^*(t) - \underline{v}^*(t) - \lambda^*(t)C\right)^T\frac{\partial (x^*(t))}{\partial D(t)}.$$

The valuation manager 1450 may derive Eq. 155 by making the following substitutions in Eq. 154: from Eq. 104, the state equation in the second term is replaced by $\dot{x}^*(t)$; from Eq. 113, the third term equals zero; and finally, from Eq. 112, the last term $$-\dot{\gamma}^{*T}(t)\frac{\partial x^*(t)}{\partial D(t)},$$

such that:

$$\frac{\partial \Lambda^*}{\partial D(t)} = \lambda^*(t) + \frac{\partial \gamma^{*T}(t)}{\partial D(t)}\dot{x}^*(t) - \dot{\gamma}^{*T}(t)\frac{\partial x^*(t)}{\partial D(t)} \quad \text{Eq. 155}$$
$$= \lambda^*(t) + \left(\frac{\partial \gamma^*(t)}{\partial x^*(t)}\frac{\partial x^*(t)}{\partial D(t)}\right)^T \dot{x}^*(t) - \dot{\gamma}^{*T}(t)\frac{\partial x^*(t)}{\partial D(t)}$$
$$= \lambda^*(t) + \left(\frac{\partial x^*(t)}{\partial D(t)}\right)^T \frac{\partial \gamma^*(t)}{\partial x^*(t)}\dot{x}^*(t) - \dot{\gamma}^{*T}(t)\frac{\partial x^*(t)}{\partial D(t)}$$
$$= \lambda^*(t) + (\dot{\gamma}^{*T}(t) - \dot{\gamma}^{*T}(t))\frac{\partial x^*(t)}{\partial D(t)}$$
$$= \lambda^*(t).$$

The term $$\frac{\partial \gamma^*(t)}{\partial x^*(t)}$$

may be the symmetric Hessian matrix of the value function, so it is equal to its transpose in the third line thereof, which establishes Eq. 152 above.

The valuation manager 1450 may be configured to determine valuation metric(s) for power generation and storage in accordance with a closed-form formula (per Eq. 152). In Eq. 153 above, the vectors $$\frac{\partial x(t)}{\partial D(t)} \text{ and } \frac{\partial u(t)}{\partial D(t)}$$

may be the generation and ramping variations of PGU 120A-N and ESU 170A-R contributing towards balancing the load variation δD(t). In $$\frac{\partial x(t)}{\partial D(t)},$$

the elements associated with capacity-constrained PGU 120A-N(if any) and ESU 170A-R may be zero, while in $$\frac{\partial u(t)}{\partial D(t)},$$

both capacity- and ramp-constrained PGU 120A-N and/or ESU 170A-R may be assigned zero values. Accordingly, the manager 146 may apply the complimentary slackness conditions of Eq. 114-117 for $$C^T \frac{\partial x(t)}{\partial D(t)}$$

equals 1, Eq. 153 may be recast as:

$$\lambda(t) = \frac{\partial L}{\partial D(t)} = \frac{\partial F(x(t))}{\partial D(t)} + \frac{\partial (\gamma^T(t)\dot{x}(t))}{\partial D(t)}. \quad \text{Eq. 156}$$

Figure 22:
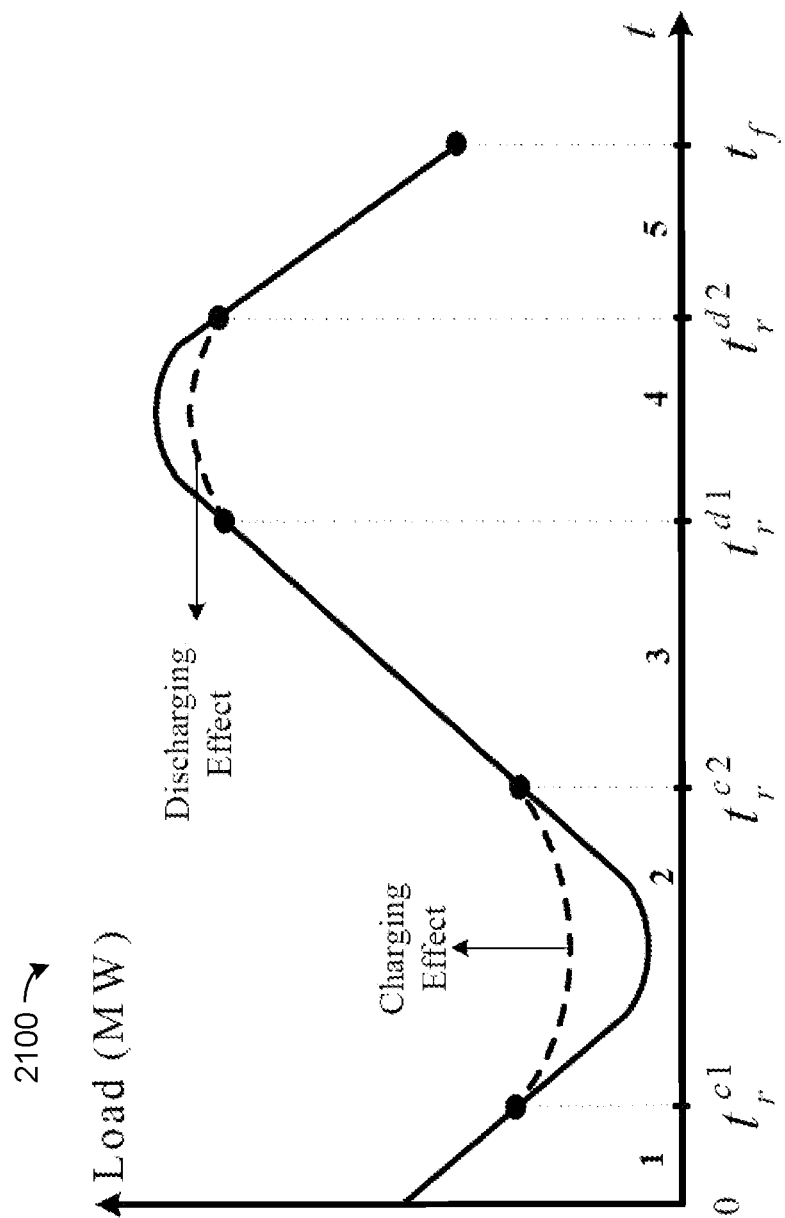
FIG. 22 depicts an exemplary embodiment of an energy charging and discharging trajectory on a load.

The valuation manager 1450 may determine marginal valuations in different valuation modes, including, but not limited to: mode A in which the PGU 120A-N determine the marginal valuation (no ESU 170A-R are charging or discharging); mode B in which PGU 120A-N and ESU 170A-R in the charging state set the marginal valuation; and mode C case in which PGU 120A-N and ESU 170A-R in the discharging state set the marginal valuation. FIG. 22 comprises a plot 2100 illustrating one embodiment of an ESU charge-discharge cycle. The valuation manager 1450 may operate in mode A while ESU 170A-R are in steady state (e.g., neither charging nor discharging), as in intervals 1, 3, and 5 if FIG. 22. During mode A, the vectors of state and control variables on include elements associated with PGU 120A-N(e.g. x(t)=(G(t): 0; 0; 0) and u(t)=(Ġ(t); 0; 0). While operating in mode A, the valuation manager 146 may be configured to set the valuation metric per Eq. 157 below:

$$\lambda(t) = \sum_{k \in (K_t^u \cup K_t^r)} IC_k^G(t) \frac{\partial G_k(t)}{\partial D(t)} + \sum_{k \in K_t^r} \left(\underline{\mu}_k^G(t) - \bar{\mu}_k^G(t)\right) \frac{\partial G_k(t)}{\partial D(t)}, \quad \text{Eq. 157}$$

$$t \in \tau_1^s,$$

In Eq. 157 $K_t^u$ and $K_t^r$ may be sets of unconstrained and ramp-constrained PGU 120A-N at time t, and $$IC_k^G(t) \triangleq \frac{\partial G^G(G_k(t))}{\partial G_k(t)}$$

is the incremental cost rate of PGU 120k. In the special case with a single unconstrained marginal PGU 120, the valuation metric of EQ. 157 would be equal to the incremental cost rate of the PGU 120.

The valuation manager 1450 may operate in mode B when, in addition to PGU 120A-N, one or more ESU 170A-R contribute to the net load by, inter alia, changing their charging power and/or ramping trajectories (e.g., as illustrated in interval 2 in plot 2100). In mode B, x(t)=(G(t): 0; D$^s$(t); E$^s$(t)) and u(t)=(Ġ(t); 0; Ḋ$^s$(t)). In mode B, the valuation manager 1450 may be configured to calculate the marginal valuation metric per Eq. 158 below:

$$\lambda(t) = \sum_{k \in (K_t^u \cup K_t^r)} IC_k^G(t) \frac{\partial G_k(t)}{\partial D(t)} + \quad \text{Eq. 158}$$

$$\sum_{k \in K_t^r} \left(\underline{\mu}_k^G(t) - \bar{\mu}_k^G(t)\right) \frac{\partial G_k(t)}{\partial D(t)} - \sum_{r \in (R_t^u \cup R_t^r)} IU_r^s(t) \frac{\partial D_r^s(t)}{\partial D(t)} +$$

$$\sum_{r \in R_t^r} \left(\underline{\mu}_r^{s,D}(t) - \bar{\mu}_r^{s,D}(t)\right) \frac{\partial D_r^s(t)}{\partial D(t)}, t \in \tau_2^s,$$

In Eq. 158, $R_t^u$ and $R_t^r$ may comprise set of unconstrained and ramp-constrained ESU 170A-R at time t, and $IU_r^S(t)$ may be the incremental charging cost rate of ESU 170r, which may be defined as:

$$IU_r^s(t) \triangleq \frac{\partial U^s(D_r^s(t))}{\partial D_r^s(t)} - \eta_r^c \gamma_r^{s,E}(t_r^{c1}), t \in \tau_2^s, \quad \text{Eq. 159}$$

In Eq. 159, $\gamma_r^{s,E}(t_r^{c1})$ may be the value of adjoint function associated with the ESU state Eq. 91 at the start of the charging interval.

The valuation manager 1450 may operate in mode C when PGU 120A-N and one or more ESU 170A-R contribute to suppling the load variation by changing their discharging power and/or ramping (as illustrated in interval 4 of FIG. 22). In mode C, x(t)=(G(t); G$^s$(t); 0; E$^s$(t)) and u(t)=(Ġ(t); Ġ$^s$(t); 0). In mode C, the valuation manager 1450 may determine the valuation metric per Eq. 160 below:

$$\lambda(t) = \sum_{k \in (K_t^u \cup K_t^r)} IC_k^G(t) \frac{\partial G_k(t)}{\partial D(t)} + \sum_{k \in K_t^r} \left(\underline{\mu}_k^G(t) - \bar{\mu}_k^G(t)\right) \frac{\partial G_k(t)}{\partial D(t)} + \quad \text{Eq. 160}$$

$$\sum_{r \in (R_t^u \cup R_t^r)} IC_r^s(t) \frac{\partial G_r^s(t)}{\partial D(t)} + \sum_{r \in R_t^r} \left(\underline{\mu}_r^{s,G}(t) - \bar{\mu}_r^{s,G}(t)\right) \frac{\partial G_r^s(t)}{\partial D(t)}, t \in \tau_3^s,$$

In Eq. 160, $IC_r^S(t)$ is the incremental discharging cost rate of ESU 170r, which may be defined as:

$$IC_r^s(t) = \frac{\partial C^s(G_r^s(t))}{\partial G_r^s(t)} - \frac{1}{\eta_r^d} \gamma_r^{s,E}(t_r^{d1}), \quad \text{Eq. 161}$$

The valuation manager 1450 may be further configured to monitor and/or determine other quantities, such as a Net Incremental Surplus of Stored Energy (NISSE). The valuation manager 1450 may determine the NISSE to represent the net surplus of incremental change in the energy stored by a particular ESU 170 (e.g., ESU 170r) at time t. The NISSE calculated at the start of charging of an ESU 170 may be equal to the utility of charging one MW of power from the power system 100 per unit of time (defined through charging utility function) minus the marginal valuation of power at that time, divided by the charging efficiency of the ESU 170. For instance, for an ESU 170 with the charging utility function variation of $20/MW per unit of time and charging efficiency of 0.9, the NISSE at a marginal price of $15/MW per unit of time would equal to 5.55, meaning that the ESU 170 would gain $5.55 for each MW of power stored per unit of time. The valuation manager 1450 may set the NISSE of respective ESU 170A-R at the start of charging and discharging intervals, and may maintain the NISSE constant during both intervals. As in Eq. 162 below, the constant value of NISSE during charging and discharging intervals would be the same if the ESU 170 does not reach its energy capacity limit at the end of the charging interval. However, when an ESU 170 device is fully charged, the NISSE experiences a constant jump at the start of discharging interval that equals to integral of the Lagrange multiplier from the end of charging interval to the start of discharging interval, which is consistent with the jump condition of Eq. 118 above. At the end of discharging interval, the energy stored in the ESU 170 may reach its minimum limit. The value of NISSE at the minimum limit is calculated below by taking the integral of the adjoint equation associated with the energy trajectory in Eq. 112, as follows:

$$\gamma_r^{s,E}(t) = \gamma_r^{s,E}(t_r^{d2}) + \int_{t_r^{d2}}^{t} \dot{\gamma}_r^{s,E}(t')dt', \forall t > t_r^{d2}. \qquad \text{Eq. 162}$$

The closed form marginal valuation formulas of Eq. 157, 158, and 160 show that, when a PGU 120A-N or ESU 170A-R reaches it ramping limit, the time derivative of the Lagrange multiplier associated with the binding ramping constraint appears in the valuation formula thereof, causing a valuation increase that reflects the shorting of ramping capacity in the power system 100. The incremental charging utility rate at the start of charging (e.g., Eq. 159) equals the marginal valuation metric at that time, meaning that an ESU 170 starts charging when the incremental charging utility rate intersects with the marginal valuation trajectory. Moreover, an ESU 170 starts discharging when its incremental discharging cost metric intersects with the marginal valuation trajectory, as illustrated in Eq. 163 below, which comprises an expansion of the adjoint equation of discharging power trajectory of the ESU 170 at the start time of discharging ($t_r^{d1}$) by substituting $\dot{\gamma}_r^{s,G}(t)$ from Eq. 113 in Eq. 112, as follows:

$$\vec{\mu}_r^{s,G}(t_r^{d1}) - \underline{\mu}_r^{s,G}(t_r^{d1}) = \frac{\partial C^s(G_r^s(t))}{\partial G_r^s(t)}\bigg|_{t=t_r^{d1}} - \frac{\gamma_r^{s,E}(t_r^{d1})}{\eta_r^d} - \lambda(t_r^{d1}), \qquad \text{Eq. 163}$$

In Eq. 163, $\vec{\mu}_r^{s,G}(t_r^{d1})$ and $\underline{\mu}_r^{s,G}(t_r^{d1})$ are zero, as the $C^1$ continuity of discharging power trajectory requires the ESU 170 to start discharging with zero ramp, and the first two terms in the right-hand side of Eq. 163 are equal to the incremental discharging cost rate at the start of the discharging interval (e.g., Eq. 161).

The incremental charging utility rate of an ESU 170 as defined in Eq. 159 indicates the utility of charging one MW of power per unit of time into the ESU 170. The incremental charging utility rate depends on the charging utility function variation, minus the NISSE of the ESU 170 during charging times the charging efficiency of the ES device. The incremental discharging cost rate the ESU 170 indicates the cost of discharging one MW of power per unit of time from the ESU 170. The incremental discharging cost rate depends on the discharging cost function variation, minus the NISSE of the ESU 170 during discharging divided by the discharging efficiency thereof. Note that the incremental discharging cost rate would also experience a jump when the ESU 170 reaches its maximum capacity at the end of charging interval. This means that the energy stored in the constrained ESU 170 is valued more in the system by having greater incremental discharging cost rate. In turn, the increased incremental discharging cost rate of energy-constrained ESU 170 impacts the marginal price trajectory during the discharging interval through, inter alia, Eq. 160.

In cases in which the charging utility function of an ESU 170 is zero, the incremental charging utility rate of Eq. 159 may be a constant value corresponding to the marginal power valuation metric at time $t_r^{c1}$. In cases where both charging utility and discharging cost functions are zero, the incremental discharging cost rate may be a constant value, as follows:

$$IC_r^s(t) = \frac{\lambda(t_r^{c2})}{\eta_r^d \eta_r^c} + \frac{1}{\eta_r^d} \int_{t_r^{c2}}^{t_r^{d1}} \overline{\nu}_r^{s,E}(t)dt, t \in \tau_3^s. \qquad \text{Eq. 163}$$

Figure 23:
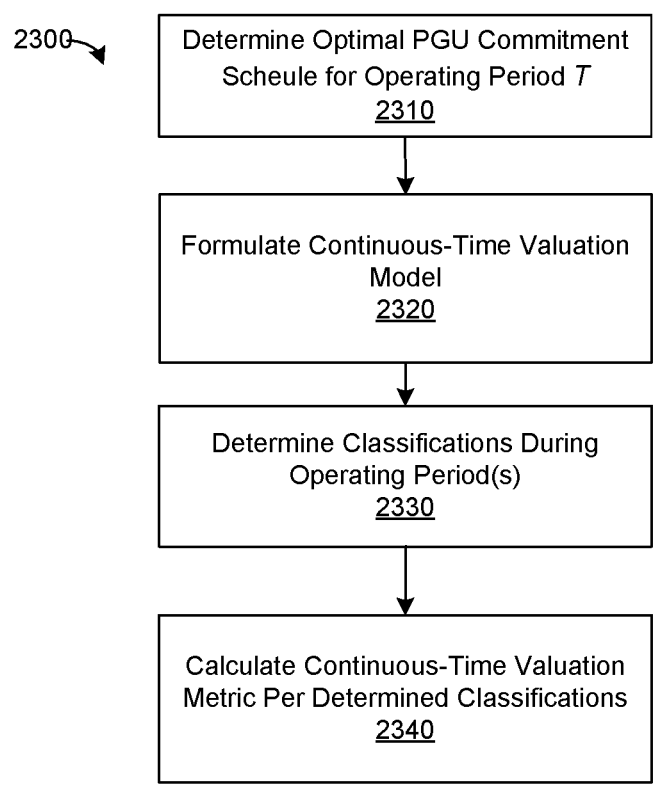
FIG. 23 is a flow diagram of one embodiment of a method for determining valuation metrics for power generation and/or storage resources.

FIG. 23 is a flow diagram of one embodiment of a method 2300 for determining valuation metrics for power generation in a power system 100 comprising PGU 120A-N and/or ESU 170A-R. Step 2310 may comprise determining an optimal power system configuration 160 for the power system 100 and/or operating the power system 100 in accordance therewith.

Step 2320 may comprise formulating a continuous-time valuation model for power generation and storage. Step 2320 may comprise formulating the valuation model in accordance with Eq. 156 above. Step 2320 may comprise modeling cost metrics of PGU 120A-N and/or ESU 170A-R, storage efficiencies of ESU 170A-R, and/or the like.

Step 2330 may comprise determining classifications of respective PGU 120A-N and/or ESU 170A-R. Step 2330 may comprise classifying PGU 120A-N and/or ESU 170A-R as generation constrained, charge constrained, discharge constrained, ramp constrained, and/or the like. Step 2330 may further comprise selecting one of a plurality of valuation modes A-C, as disclosed above. Step 2330 may comprise selecting mode A for time(s) during which the valuation metric is set by PGU 120A-N(ESU 170A-R are neither charging nor discharging). Step 2330 may comprise selecting mode B for time(s) during which the valuation metric is set by PGU 120A-N and/or ESU 170A-R in the charging state (e.g., one or more ESU 170A-R are drawing power from the power system 100). Step 2330 may comprise selecting mode C for time(s) during which the valuation metric is set by PGU 120A-N and/or ESU 170A-R in the discharging state (e.g., one or more ESU 170A-R are supplying power to the power system 100).

Step 2340 may comprise calculating continuous-time valuation metric(s) for power generation and storage in the power system. Step 2340 may comprise determining valuation metrics in different modes during the operating period in accordance with step 2330 above. Step 2340 may comprise determining valuation metrics in accordance with Eq. 157 while operating in mode A, in accordance with Eqs. 158 and/or 159 while operating in mode B, and in accordance with Eqs. 160 and/or 161 while operating in mode C.

Referring to FIGS. 1, 6, 8, 14, and 17 portions of the power system infrastructure 110, such as the power system communication infrastructure 118, management infrastructure 140, monitor 142, load profiler 144, manager 146, manager 646, controller 148, and/or the like, may be embodied as instructions stored on a non-transitory, computer-readable storage medium (e.g., instructions stored on non-transitory storage resources of an MCD). The instructions may be configured to cause a hardware computing device, such as an MCD, to perform operations for managing the power system 100, as disclosed herein. In some embodiments, the instructions may be configured for execution by a processor. Execution of the instructions by the processor may be configured to cause the hardware device to perform certain operations and/or processing steps for managing the power system 100. Alternatively, or in addition, the instructions may be configured for execution within a particular execution environment, such as a virtual machine, a Java virtual machine, a scripting environment, and/or the like. In some embodiments, one or more of the instructions may comprise configuration data of a hardware device, such as FPGA configuration data, device firmware, device settings, and/or the like, which may be configured to cause the hardware device to perform certain operations and/or processing steps for managing the power system 100, as disclosed herein.

Portions of the management infrastructure 140, such as the monitor 142, monitoring devices 111A-N, 121A-N, 131A-N, controller 140 (and corresponding elements 142, 144, 146, and so on), may comprise hardware components, which may include, but are not limited to: circuits, programmable logic devices (e.g., field-programmable gate array devices), application-specific integrated circuits, special-purpose hardware devices, monitoring devices, control devices, communication devices, MCDs, and/or the like.

This disclosure has been made with reference to various exemplary embodiments. However, those skilled in the art will recognize that changes and modifications may be made to the exemplary embodiments without departing from the scope of the present disclosure. For example, various operational steps, as well as components for carrying out operational steps, may be implemented in alternative ways depending upon the particular application or in consideration of any number of cost functions associated with the operation of the system (e.g., one or more of the steps may be deleted, modified, or combined with other steps). Therefore, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Additionally, as will be appreciated by one of ordinary skill in the art, principles of the present disclosure may be reflected in a computer program product on a machine-readable storage medium having machine-readable program code means embodied in the storage medium. Any tangible, non-transitory machine-readable storage medium may be utilized, including magnetic storage devices (hard disks, floppy disks, and the like), optical storage devices (CD-ROMs, DVDs, Blu-ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a machine-readable memory that can direct a computer or other programmable data processing apparatus to function in a particular manner, such that the instructions stored in the machine-readable memory produce an article of manufacture, including implementing means that implement the function specified. The computer program instructions may also be loaded onto a computer or other programmable data processing apparatus to cause a series of operational steps to be performed on the computer or other programmable apparatus to produce a computer-implemented process, such that the instructions that execute on the computer or other programmable apparatus provide steps for implementing the functions specified.

While the principles of this disclosure have been shown in various embodiments, many modifications of structure, arrangements, proportions, elements, materials, and components that are particularly adapted for a specific environment and operating requirements may be used without departing from the principles and scope of this disclosure. These and other changes or modifications are intended to be included within the scope of this disclosure.

What is claimed is:

1. A non-transitory, computer-readable storage medium comprising instructions configured to cause a computing device to perform operations for power system management, the operations comprising:
   modeling energy trajectory characteristics of respective energy storage units, comprising charging, discharging, and ramping constraints of the respective energy storage units;
   determining a schedule for the energy storage units during an operating period of the power system, the schedule comprising:
      configuring the energy storage units to selectively draw power from the power system and supply power to the power system at designated times during the operating period;
      adapting the schedule for the energy storage units to balance a net load forecast for the operating period and generation trajectories of power generating units scheduled to supply power to the power system during the operating period; and
   configuring the energy storage units to operate in accordance with the determined schedule during the operating period.

2. The non-transitory computer-readable storage medium of claim 1, wherein:
   the schedule determined for the energy storage units define energy trajectories of the respective energy storage units, and
   determining the schedule for the energy storage units comprises configuring the energy trajectories of the respective energy storage units to comply with the charging, discharging, and ramping characteristics of the respective energy storage units.

3. The non-transitory computer-readable storage medium of claim 1, further comprising:
   determining generation trajectories for the power generating units that comply with generation and ramping constraints of the respective power generating units.

4. The non-transitory computer-readable storage medium of claim 1, wherein determining the schedule for the energy storage units comprises:

determining utility functions for the continuous-time charging trajectories of the respective energy storage units.

5. The non-transitory computer-readable storage medium of claim 4, wherein determining the schedule for the energy storage units further comprises:
maximizing the utility functions over the operating period while balancing the net load forecast with power being supplied to the power system.

6. The non-transitory computer-readable storage medium of claim 4, wherein determining the schedule for the energy storage units further comprises:
determining cost functions for the continuous-time discharging trajectories of the energy storage units.

7. The non-transitory computer-readable storage medium of claim 6, wherein determining the schedule for the energy storage units further comprises:
minimizing a sum of cost functions determined for the continuous-time generation trajectories of the power generation units and the cost functions for the continuous-time discharging trajectories of the energy storage units less the utility functions for the continuous time charging trajectories of the energy storage units.

8. The non-transitory computer-readable storage medium of claim 7, wherein determining the schedule for the energy storage units further comprises modeling the continuous-time generation trajectories, charging trajectories, and discharging trajectories in a function space.

9. The non-transitory computer-readable storage medium of claim 8, wherein determining the schedule for the energy storage units further comprises determining an optimal solution of a function space optional control problem.

10. A system, comprising:
a computing device communicatively coupled to a plurality of energy storage units, the computing device comprising:
a modeler configured to determine model continuous-time ramping trajectories of the energy storage units in a function space;
a processor configured to:
approximate nonlinear charging utility functions of the energy storage units in terms of first auxiliary variables of the function space,
approximate nonlinear discharging cost functions of the energy storage units in terms of second auxiliary variables of the function space, and
determine an optimal configuration of the energy storage units during an operating period by minimizing the nonlinear discharging cost functions of the energy storage units less the nonlinear charging utility functions of the energy storage units over the operating period; and
a controller configured to operate the energy storage units in accordance with the determined optimal configuration during the operating period.

11. The system of claim 10, wherein the modeler is further configured to:
model a continuous-time net load trajectory in the function space; and
model continuous-time generation trajectories of respective power generating units in the function space.

12. The system of claim 11, wherein the processor is further configured to:
determine an optimal configuration of the power system, comprising the optimal configuration of the energy storage units, the optimal configuration adapted to minimize a total operating cost metric over the operating period, the total operating cost comprising a sum of the approximated nonlinear discharging cost functions and cost functions corresponding to the continuous-time generation trajectories of the respective power generating units less the approximated nonlinear charging utility functions of the energy storage units.

13. The system of claim 10, wherein the system is configured to convert a continuous-time optimization control problem to minimize a sum of generation cost functions of continuous-time generation trajectories of respective power generating units and the nonlinear discharging cost functions of the energy storage units less the nonlinear charging utility functions of the energy storage units over the operating period into a Mixed Integer Linear Programing (MLP) problem.

14. The system of claim 13, wherein the processor is configured to determine an optimal solution to the MILP problem, comprising generation trajectories for the power generation units and the optimal configuration of the energy storage units.

15. A computer-implemented method for managing a power system, comprising:
formulating a continuous-time optimal control problem comprising:
a sum of generation cost functions of continuous-time generation trajectories of respective power generating units, discharge cost functions of continuous-time discharging trajectories of respective energy storage units, and charge utility functions of continuous-time charging trajectories of the respective energy storage units; and
a continuous-time power balance constraint to balance a continuous-time net load trajectory with the generation, discharging, and charging trajectories;
converting the continuous-time optimal control problem into a Mixed Integer Linear Programming (MILP) system;
solving the MILP system to determine an optimal configuration of the power system over the operating period; and
configuring the power system to operate in accordance with the optimal configuration during the operating period.

16. The computer-implemented method of claim 15, further comprising:
projecting the continuous-time net load forecast into a function space corresponding to the MILP system.

17. The computer-implemented method of claim 16, further comprising:
projecting the continuous-time generation trajectories into the function space.

18. The computer-implemented method of claim 16, further comprising:
projecting the continuous-time charging trajectories and the discharging trajectories into the function space.

* * * * *

UNITED STATES PATENT AND TRADEMARK OFFICE
CERTIFICATE OF CORRECTION

PATENT NO. : 10,509,374 B2
APPLICATION NO. : 15/925760
DATED : December 17, 2019
INVENTOR(S) : Masood Parvania and Roohallah Khatami It is certified that error appears in the above-identified patent and that said Letters Patent is hereby corrected as shown below:

In the Specification

Column 1 Line 31 delete:
"This invention was made with government support under Grant Number 1549924 awarded by the National Science Foundation. The government has certain rights in the invention."

And replace it with the following:
--This invention was made with government support under grant 1549924 awarded by the National Institutes of Health and grant no. DE-OE0000882 awarded by the Department of Energy. The government has certain rights in this invention.--

Signed and Sealed this
Thirty-first Day of January, 2023

Katherine Kelly Vidal
*Director of the United States Patent and Trademark Office*